(12) United States Patent
Binder

(10) Patent No.: US 12,502,600 B2
(45) Date of Patent: *Dec. 23, 2025

(54) PUZZLE WITH CONDUCTIVE PATH

(71) Applicant: Sphero, Inc., Boulder, CO (US)

(72) Inventor: Yehuda Binder, Hod-Hasharon (IL)

(73) Assignee: Sphero, Inc., Greenville, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/439,626

(22) Filed: Feb. 12, 2024

(65) Prior Publication Data

US 2024/0367031 A1    Nov. 7, 2024

Related U.S. Application Data

(63) Continuation of application No. 17/240,209, filed on Apr. 26, 2021, now Pat. No. 11,896,915, which is a continuation of application No. 16/220,643, filed on Dec. 14, 2018, now Pat. No. 10,987,571, which is a continuation of application No. 14/607,439, filed on Jan. 28, 2015, now Pat. No. 10,155,153, which is a continuation of application No. 13/668,693, filed on Nov. 5, 2012, now Pat. No. 8,951,088, which is a
(Continued)

(51) Int. Cl.
*A63H 33/04* (2006.01)
*A63F 9/10* (2006.01)
*A63F 9/24* (2006.01)

(52) U.S. Cl.
CPC .............. *A63F 9/10* (2013.01); *A63F 9/1011* (2013.01); *A63F 9/1044* (2013.01); *A63F 9/24* (2013.01); *A63F 2009/1016* (2013.01); *A63F 2009/1066* (2013.01)

(58) Field of Classification Search
None
See application file for complete search history.

(56) References Cited

U.S. PATENT DOCUMENTS

| | | | |
|---|---|---|---|
| 4,893,817 A * | 1/1990 | Shilo | A63F 9/10 434/340 |
| 5,090,701 A * | 2/1992 | Chang | A63F 9/10 273/157 R |

(Continued)

OTHER PUBLICATIONS

Hynix Semiconductor Inc., HMS30C7202 Microprocessor, www.datasheetarchive.com/250--sound+module-datasheet.html; 2002.*

*Primary Examiner* — Sunit Pandya

(57) ABSTRACT

System and method for additional amusement, entertaining and surprising visual or audible reward provided upon completing the reconstructing of a two-dimensional or three-dimensional jigsaw puzzle. The puzzle pieces include conductive pads connected by a conductor such as a wire, a metallic strip or a conductive paint, so that upon assembling the puzzle, the pads are in contact to form a continuous conductive path. The frame or the puzzle pieces include a battery (or an AC adapter) and a visual or audible signaling device operating upon sensing the continuity of the conductive path. Each of the puzzle pieces may include three or more conductive pads, allowing for the forming of two or more isolated or connected distinct conductive paths. The conductive path can further affect a time measurement and its related display for timing the puzzle solving.

20 Claims, 48 Drawing Sheets

Related U.S. Application Data continuation of application No. 12/568,834, filed on Sep. 29, 2009, now Pat. No. 8,602,833.

(60) Provisional application No. 61/236,615, filed on Aug. 25, 2009, provisional application No. 61/231,824, filed on Aug. 6, 2009.

(56) References Cited

U.S. PATENT DOCUMENTS

| | | | | |
|---|---|---|---|---|
| 5,385,344 A * | 1/1995 | Miller | A63H 30/04 | 472/51 |
| 5,547,399 A * | 8/1996 | Naghi | H01R 27/00 | D13/133 |
| 6,979,245 B1 * | 12/2005 | Goodwin | A63F 9/10 | 446/175 |
| 7,238,026 B2 * | 7/2007 | Brown | G09B 5/06 | 434/258 |
| 7,322,873 B2 * | 1/2008 | Rosen | A63H 33/046 | 446/124 |
| 7,371,177 B2 * | 5/2008 | Ellis | A63F 13/52 | 446/175 |
| 7,731,558 B2 * | 6/2010 | Capriola | A63H 33/042 | 446/124 |
| 7,846,002 B1 * | 12/2010 | Mikesell | A63H 33/042 | 446/92 |
| 9,472,112 B2 * | 10/2016 | Schweikardt | A63H 33/04 | |
| 2003/0162160 A1 * | 8/2003 | Horchler | G09B 19/0061 | 434/406 |
| 2005/0049023 A1 * | 3/2005 | Foster | A63F 9/10 | 463/9 |
| 2007/0278740 A1 * | 12/2007 | Mao | A63F 9/10 | 273/156 |
| 2008/0083149 A1 * | 4/2008 | Zebersky | A63F 9/1044 | 40/716 |
| 2011/0151743 A1 * | 6/2011 | Munch | A63H 33/042 | 446/91 |

\* cited by examiner

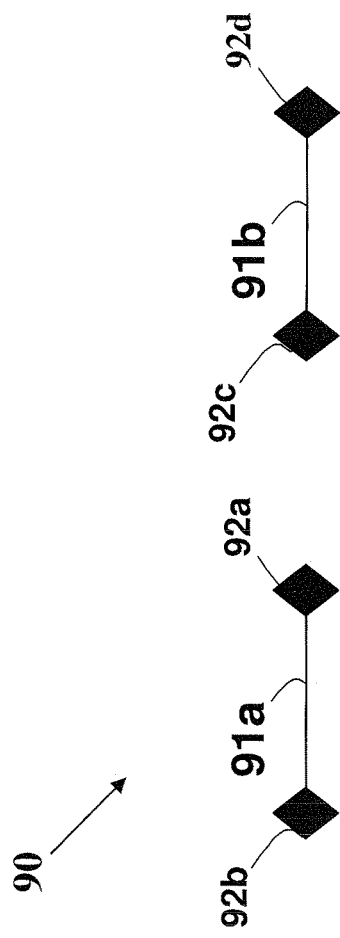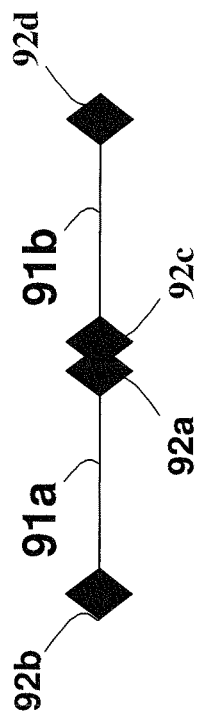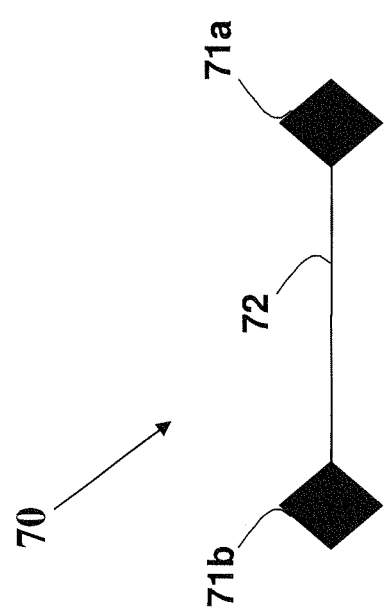
FIG. 9a
FIG. 9b
FIG. 7

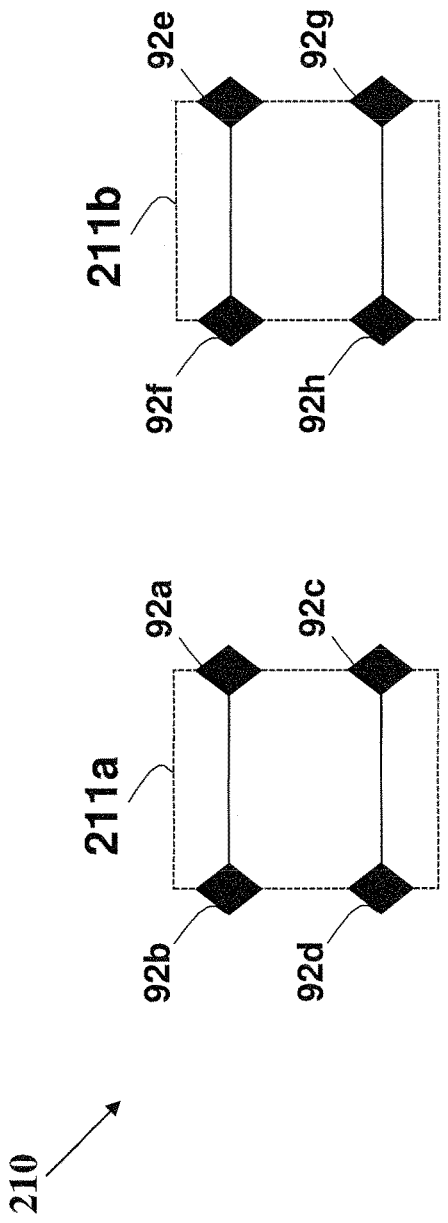
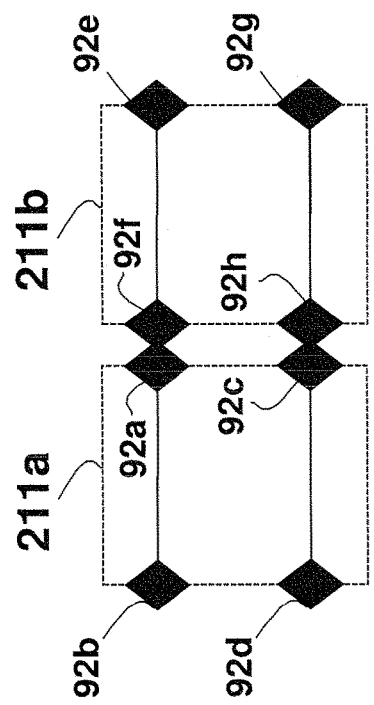
FIG. 21a
FIG. 21b

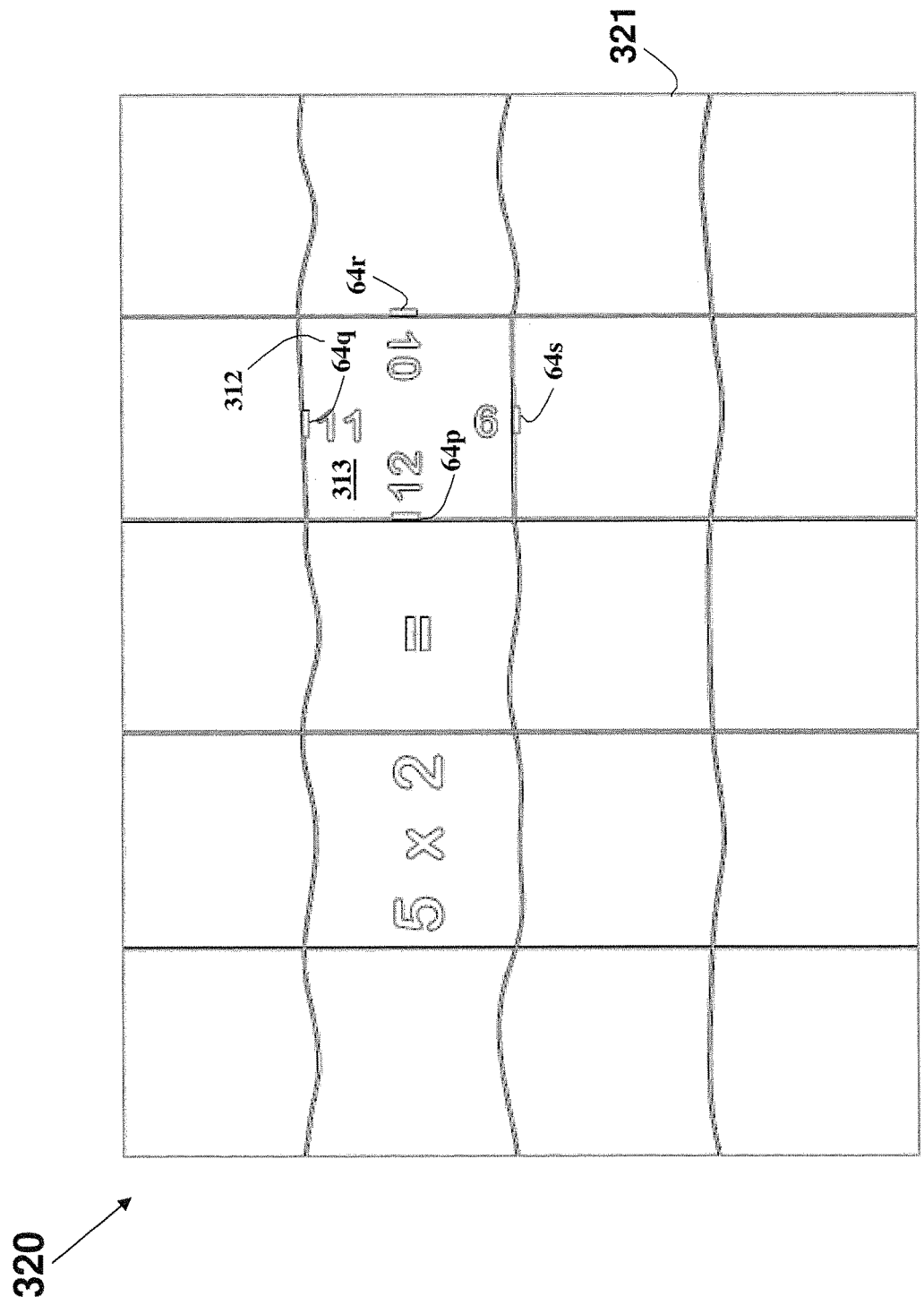

PUZZLE WITH CONDUCTIVE PATH

CROSS-REFERENCE TO RELAYED APPLICATIONS

This application is a continuation of U.S. patent application Ser. No. 4/607,439, filed on Jan. 28, 2015, entitled "Puzzle with Conductive Path," which is a continuation of U.S. patent application Ser. No. 13/668,693, (now U.S. Pat. No. 8,951,088) filed on Nov. 5, 2012, entitled "Puzzle with Conductive Path," which is a continuation of U.S. patent application Ser. No. 12/568,834, (now U.S. Pat. No. 8,602,833) filed on Sep. 29, 2009, entitled "Puzzle with Conductive Path," which claims priority to and the benefit of U.S. Provisional Application No. 61/231,824, filed on Aug. 6, 2009, and U.S. Provisional Application No. 61/236,615, filed Aug. 25, 2009, the disclosure of each of which is incorporated herein by reference in its entirety.

FIELD OF THE INVENTION

The present invention relates generally to a game set such as a jigsaw puzzle and, more particularly, to a game that when correctly assembled forms an electrical circuit for activating an electrical annunciator such as for producing illumination or audible sounds.

BACKGROUND OF THE INVENTION

In a basic puzzle one is intended to piece together objects (puzzle pieces) in a logical way, in order to come up with the desired shape, picture or solution. Puzzles are often contrived as a form of entertainment, but they can also stem from serious mathematical or logistical problems. Jigsaw puzzles are known in the art aiming to reconstruct a picture that has been cut (originally, with a jigsaw) into many small interlocking pieces. In a jigsaw puzzle, the objective to fit together and inter-engage a number of parts in a predetermined manner according to visual indicia so as to form a coherent picture or mage. The intellectual challenge involves assembly of numerous small, often oddly shaped, interlocking and tessellating pieces. Each piece usually has a small part of the picture on it; when completed by correct mating of the pieces, a jigsaw puzzle produces a complete picture, typically of a recognizable image. Typical images found on jigsaw puzzles include scenes from nature, buildings, and repetitive design. However, any kind of picture can be used to make a jigsaw puzzle, and some companies offer to turn personal photographs into puzzles. While originally made of wood, most modern jigsaw puzzles are made out of cardboard. In most cases the puzzle pieces are connected in a tight and a fully interlocking way, such that moving one piece will move all pieces attached to it.

The direction 'up' or 'front' hereinafter refers to the puzzle piece side (and the respective frame side), which include the part of the picture. Similarly, the direction 'down', 'rear' or 'back' hereinafter refers to the puzzle piece side (or the respective frame side), which does not include the part of the picture, and is typically hidden upon completing the puzzle. All directional references used herein (e.g., upper, lower, upwards, downwards, left, right, leftward, rightward, top, bottom, above, below, vertical, horizontal, clockwise, and counterclockwise, etc.) are only used for identification purposes to aid the reader's understanding of the present invention, and do not create limitations, particularly as to the position, orientation, or use of the invention.

An example of a prior art jigsaw puzzle, puzzle pieces and the assembly process is shown in FIGS. 1-5. FIG. 1a shows a front view 10 of a puzzle piece 11a, having a front surface 12. FIGS. 1b and 1c respectively show perspective front views 13 and 14 of the puzzle piece 11a. FIG. 2 shows a perspective front view 20 of four puzzle pieces 11a, 11b, 11c and 11d partly engaged as part of the process of assembly, using rounded tabs inserted into corresponding blanks cut. In most cases, the puzzle pieces are assembled into a puzzle frame commonly consisting of a stiff support surface serving as the puzzle base surrounded by a peripheral stepped flange. The puzzle frame typically includes a raised peripheral rim and a bottom wall defining a well therewith having a planar plate serving as the playing field for receiving the partially assembled or completed jigsaw puzzle. The four tiles 11a, 11b, 11c and 11d are shown in the perspective front view 30 of FIG. 3 being assembled in a rectangular shaped puzzle frame 31 for enclosing and holding the assembled array. As part of solving the puzzle, more pieces are added. FIG. 4a shows a front view 40 and FIG. 4b shows a perspective front view 45 of the frame 31 with twelve puzzle pieces 11a-111 fitted into. A completed puzzle showing a revealed 'teddy bear' picture is shown in front view 50 in FIG. 5a, and in front perspective view 55 in FIG. 5b, illustrating 20 puzzle pieces forming a complete puzzle assembled in the frame 31. In most cases, each of the mechanical connections between the puzzle pieces can be easily disconnected by pulling the parts apart, thus allowing for assembly and disassembly using reusable puzzle pieces.

Some examples of prior-art jigsaw puzzle frames are disclosed in U.S. Pat. No. 4,053,159 to Kulak entitled: "Method for Framing a Jig-Saw Puzzle", U.S. Design Pat. No. D267,895 to Petrie entitled: "Puzzle", U.S. Design Pat. No. D339,613 to Pirnat entitled: "Puzzle", U.S. Patent Application 2009/0189348 to Kucharski entitled: "Game Apparatus and Method", and U.S. Pat. No. 5,409,227 to Walker entitled: "Puzzle", which are all incorporated in their entirety for all purposes as if fully set forth herein.

A successful solving of a puzzle is indicated and rewarded by revealing a completed picture of the puzzle, which is typically a recognizable image.

In consideration of the foregoing, it would be an advancement in the art to provide a method and system that is simple, cost-effective, faithful, reliable, has a minimum part count, minimum hardware, or uses existing and available components for providing additional amusement, education, entertainment and a better user experience relating to solving a jigsaw puzzle, preferably without departing from the conventional 'look and feel' of common jigsaw puzzle. Further, it would be advantageous if such a puzzle provides added stimulus for attempting to solve the puzzle, adding more curiosity and excitement, as well as added pleasure and amusement, while being easy to construct and manufacture, robust and consistent in aesthetic appearance and function, and preferably without significantly departing from the conventional 'look and feel' of jigsaw puzzle.

SUMMARY OF THE INVENTION

In one aspect of the present invention, a method and apparatus for improved a puzzle set in general and a jigsaw puzzle set in particular is described. The puzzle set adds electrically announcing of the proper solving of a two-dimensional jigsaw puzzle that comprises a plurality of inter-engaged puzzle pieces, each having front and rear planar surfaces and a side surface, which can be assembled together into a one assembled puzzle revealing an image, where each piece is having on a front surface thereof a part of the image which is shown as a whole in the assembled puzzle, and a frame provided to surround the puzzle pieces, having a raised peripheral rim and a bottom wall defining a well therewith having a planar plate for receiving the partially or fully assembled jigsaw puzzle. Each of the puzzle pieces comprises two electrically connected conductive pads attached to the side surface, such that when assembled together the pads of adjacent puzzle pieces are in contact, and thus forming a continuous conductive path. The puzzle set further comprises an annunciator for announcing using visual or audible signaling and a power source for powering said annunciator, and the proper solving of the puzzle form an electric circuit so that electrical current flows from the power source via said conductive path to the annunciator for activating thereof.

In one aspect of the invention, a clip is attached to a puzzle piece for providing conductivity. The clip comprises an elongated strip of a conductive material having two opposed ends, first and second opposed attachment parts, each disposed at a respective end of the strip and each configured to be attached to the puzzle piece, and first and second conductive connecting elements extending transversely to the strip, each of the connecting elements being carried by a respective one of said attachment parts and being conductively connected to the strip. The first connecting element having a protruding form and said second connecting element having a recessed form that is complementary to said protruding form to provide a conductive connection between one of the connecting elements of said clip attached to a first puzzle piece, and the other one of the connecting elements of an identical clip attached to a second puzzle piece when the two puzzle pieces are correctly assembled together.

In one aspect, two clips are used for attachment to a respective one of two puzzle pieces for providing conductivity. The clip comprises an elongated strip of a conductive material having two opposed ends, first and second opposed attachment parts, each disposed at a respective end of the strip and each configured to be attached to one of the puzzle pieces, and first and second conductive connecting elements extending transversely to the strip, each of said connecting elements being carried by a respective one of said attachment parts and being conductively connected to said strip. The first connecting element having a protruding form and said second connecting elements having a recessed form that is complementary to the protruding form, and the clips are providing a conductive connection between one of said connecting elements of one of the clips attached to one of the puzzle pieces and the other one of the connecting elements of the other one of the clips attached to the other one of the puzzle pieces when the two puzzle pieces are correctly assembled together.

In one aspect of the present invention, a method and apparatus for improved game set is described including toy blocks components having protrusions and indentations that allow multiple blocks to be combined with, and affixed to, one another (e.g. to assemble and disassemble larger toy entities) and for electrically announcing a proper solving of the game. In this case, the game set may comprise a plurality of inter-engaged game pieces, each game piece having one or more indentations and one or more protrusions, wherein the game is solved by the game pieces can be assembled together in a single way using mating indentations and protrusions into a single one pre-defined structure, and wherein each of said game pieces comprises two or more conductive pads attached thereto, such that when properly assembled together the pads of engaged game pieces are in contact such that the assembly of the plurality of the game pieces form a continuous conductive path. As described above, the conductive path formed upon proper solving of the game allows electrical current to flow from the battery (or any other power source) via said conductive path to the annunciator for activating thereof. Alternatively, all the side surface of the puzzle piece may be conductive by a conductive coating or a conductive strip attached or adhesive thereto.

The two conductive pads of part or the entire set of puzzle pieces are electrically connected using a wire attached to the rear surface or hidden inside the puzzle piece. Alternatively, a conductive paint is used on the rear surface or on the front surface under the printed image. In one aspect of the invention, three or four pads are used in the puzzle pieces. The pads in the puzzle pieces can be electrically connected to each other, or alternatively can form isolated connections. Hence multiple conductive paths can be formed, being connected or isolated from each other. Further, the puzzle frame may include multiple conductive pads, wherein each pair may fit different puzzle, as a non-limiting example for activating or energizing different puzzles. Hence, a single frame can be used as a base for different puzzle pieces to construct and display different puzzle pictures or shapes.

The power source can be a battery, either primary or rechargeable type, which may reside in a battery compartment. Alternatively, power can be supplied from AC power outlet via common AC/DC adapter containing a step-down transformer and an AC to DC converter (rectifier).

Each of the power source and the annunciator may be part of the frame or of a puzzle piece. Further, the conductive path may be wholly contained in the assembled puzzle pieces only or may include the frame. In the latter case, the frame includes two or more conductive pads for connecting to the puzzle pieces respective conductive pads.

The puzzle set may also include an ON/OFF switch, such as sliding or pushbutton, which allows for connecting or disconnecting the conductive path and thus controlling the annunciator activation. The switch can be part of the frame or in a puzzle piece. The location of the switch relating to the puzzle image may be associated with the puzzle theme or shape.

The annunciator may include one or more of each of a visual or an audible signaling device, operated upon 'solving' the puzzle. The annunciator may further contain a smoke generator.

The visual signaling device may contain a visible light emitter based on a semiconductor device (e.g. LED—Light Emitting Diode), an incandescent lamp or a fluorescent lamp. The illumination may be blinking or steady, and can further be used to illuminate part of the puzzle image or the frame or both. The visible light emitter positioning, appearance, type, color or steadiness are associated with the image theme or image shape, and can be part of a puzzle piece or of the frame.

The audible signaling device may be based on electromechanical or piezoelectric means capable of generating single or multiple tones, and can be a buzzer, a chime or a ringer. In one aspect of the invention, the audible signaling device comprising a loudspeaker and a digital to analog converter coupled to the loudspeaker. The wherein the volume, type, steadiness, pitch, rhythm, dynamics, timbre or texture of the sound emitted from the audible signaling device is associated with the image theme or image shape, and may correspond to the sound generated by a member shown as part of the image, such as a household appliance, a vehicle, an emergency vehicle, an animal or a musical instrument. Alternatively, the sound emitted from the audible signaling device is a song or a melody, wherein the song or melody name or content relates to the theme of the image or shape. In one aspect, the sound emitted from the audible signaling device is a human voice talking sounding of a syllable, a word, a phrase, a sentence, a short story or a long story, using speech synthesis or being pre-recorded.

In one aspect of the invention, a controller is used to sense the status of the conductive paths and to control the annunciator. The control may use controlling the annunciator powering or via a dedicated control port of the annunciator. The controller may be located in the puzzle frame or as part of a puzzle piece, and may be based on a discrete logic or an integrated device, such as a processor, microprocessor or microcomputer, and may include a general-purpose device or may be a special purpose processing device, such as an ASIC, PAL, PLA, PLD, Field Programmable Gate Array (FPGA), Gate Array, or other customized or programmable device, and may include a memory that may include a static RAM (random Access Memory), dynamic RAM, flash memory, ROM (Read Only Memory), or any other data storage medium. The memory may include data, programs, and/or instructions and any other software or firmware executable by the processor. The control logic can be implemented in hardware or in software, such as a firmware stored in the memory.

In one aspect of the present invention, a coin or any other round item having a conductive surface, as well as any other item which is partially conductive and is an everyday item (e.g. a metal key), is used in the puzzle and form part of the conductive path. The coin can be assembled into a hole or a recess in a puzzle piece, wherein the hole walls include conductive pads for contacting the coin. Alternately, the coin is placed between puzzle pieces and connects to conductive pads of two or more puzzle pieces surrounding the coin. The coin type, numeration, location or picture on one of the coin (or other item) faces may be associated or part of the puzzle picture or shape.

In one aspect of the present invention, the annunciator includes means for measuring the assembly time, such that the time metering device stops counting upon forming the conductive path hence the puzzle is completed.

The above summary is not an exhaustive list of all aspects of the present invention. Indeed, the inventor contemplates that his invention includes all systems and methods that can be practiced from all suitable combinations and derivatives of the various aspects summarized above, as well as those disclosed in the detailed description below and particularly pointed out in the claims filed with the application. Such combinations have particular advantages not specifically recited in the above summary.

It is understood that other embodiments of the present invention will become readily apparent to those skilled in the art from the following detailed description, wherein are shown and described only embodiments of the invention by way of illustration. As will be realized, the invention is capable of other and different embodiments and its several details are capable of modification in various other respects, all without departing from the scope of the present invention as defined by the claims. Accordingly, the drawings and detailed description are to be regarded as illustrative in nature and not as restrictive.

The above and other features and advantages of the present invention will become more fully apparent from the following description, drawings and appended claims, or may be learned by the practice of the invention as set forth hereinafter. It is intended that all such additional apparatus and advantages be included within this description, be within the scope of the present invention, and be protected by the accompanying claims.

The preferred embodiments of the invention presented here are described below in the drawings and detailed specification. Unless specifically noted, it is intended that the words and phrases in the specification and the claims be given the plain, ordinary and accustomed meaning to those of ordinary skill in the applicable arts. If any other special meaning is intended for any word or phrase, the specification will clearly state and define the special meaning.

Likewise, the use of the words "function" or "means" in the Specification or Description of the Drawings is not intended to indicate a desire to invoke the special provisions of 35 U.S.C. 112, Paragraph 6, to define the invention. To the contrary, if the provisions of 35 U.S.C. 112, Paragraph 6 are sought to be invoked to define the inventions, the claims will specifically state the phrases "means for" or "step for," and will clearly recite a function, without also reciting in such phrases any structure, material or act in support of the function. Even when the claims recite a "means for" or "step for" performing a defined function, if the claims also recite any structure, material or acts in support of that means or step, or that perform the function, then the intention is not to invoke the provisions of 35 U.S.C. 112, Paragraph 6. Moreover, even if the provisions of 35 U.S.C. 112, Paragraph 6 are invoked to define the claimed inventions, it is intended that the inventions not be limited only to the specific structure, material or acts that are described in the preferred embodiments, but in addition, include any and all structures, materials or acts that perform the claimed function, along with any and all known or later-developed equivalent structures, material or acts for performing the claimed function.

BRIEF DESCRIPTION OF THE FIGURES

The invention is herein described, by way of non-limiting example only, with reference to the accompanying figures and drawings, wherein like designations denote like elements. Understanding that these drawings only provide information concerning typical embodiments of the invention and are not therefore to be considered limiting in scope:

FIG. 7 illustrates the electrical schematic diagram of a puzzle piece according to an aspect of the invention;

FIG. 9a illustrates the electrical schematic diagram of two puzzle pieces according to an aspect of the invention;

FIG. 9b illustrates the electrical schematic diagram of engaged two puzzle pieces according to an aspect of the invention;

FIG. 21a illustrates the electrical schematic diagram of two puzzle pieces according to an aspect of the invention;

FIG. 21b illustrates the electrical schematic diagram of two engaged puzzle pieces according to an aspect of the invention;

FIG. 32a depicts a front view of an assembled puzzle according to an aspect of the invention;

DETAILED DESCRIPTION OF EMBODIMENTS

Figure 1C:
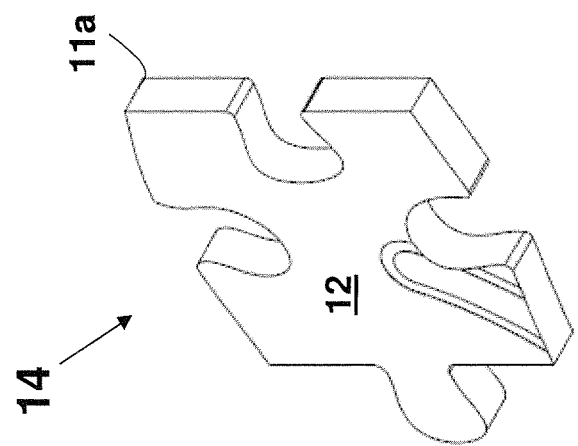
FIG. 1c depicts a perspective front view of a prior-art puzzle piece.

The principles and operation of an apparatus according to the present invention may be understood with reference to the figures and the accompanying description wherein similar components appearing in different figures are denoted by identical reference numerals. The drawings and descriptions are conceptual only. In actual practice, a single component can implement one or more functions; alternatively, each function can be implemented by a plurality of components and devices. In the figures and descriptions, identical reference numerals indicate those components that are common to different embodiments or configurations. Identical numerical references (even in the case of using different suffix, such as 5, 5a, 5b and 5c) refer to functions or actual devices that are either identical, substantially similar or having similar functionality. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in the figures herein, is not intended to limit the scope of the invention, as claimed, but is merely representative of embodiments of the invention.

According to the invention, the assembling of a puzzle results in a closed electrical circuit. The electrical circuit may be used to operate an electrical device such as a visual or sound-based indicator. The operation of the annunciator attracts the player attention and provides another reward for completing the puzzle, other than reconstructing the picture of the puzzle. In addition to recreational purposes, the invention may provide educational and therapeutic benefits as motor skills, art, music and creative thinking skills are employed. Preferably, the external shape of a puzzle piece and puzzle frame according to the invention will not significantly depart from the 'look and feel' of conventional jigsaw puzzle.

Examples of electrically conductive toys such as conductive LEGO®, bricks are disclosed in U.S. Pat. No. 6,805,605 to Reining et al. entitled: "Electrically Conductive Block Toy", in U.S. Pat. No. 4,883,440 to Bolli entitled: "Electrified Toy Building Block with Zig-Zag Current Carrying Structure", and in U.S. Pat. No. 5,848,503 to Toft et al. entitled: "Constructional Building Set Having an Electric Conductor", which are all incorporated in their entirety for all purposes as if fully set forth herein. Three-dimensional conductive building block toy is disclosed in U.S. Patent Application 2007/0184722 to Doherty entitled: "Powered Modular Building Block Toy", which is incorporated in its entirety for all purposes as if fully set forth herein.

Figure 6:
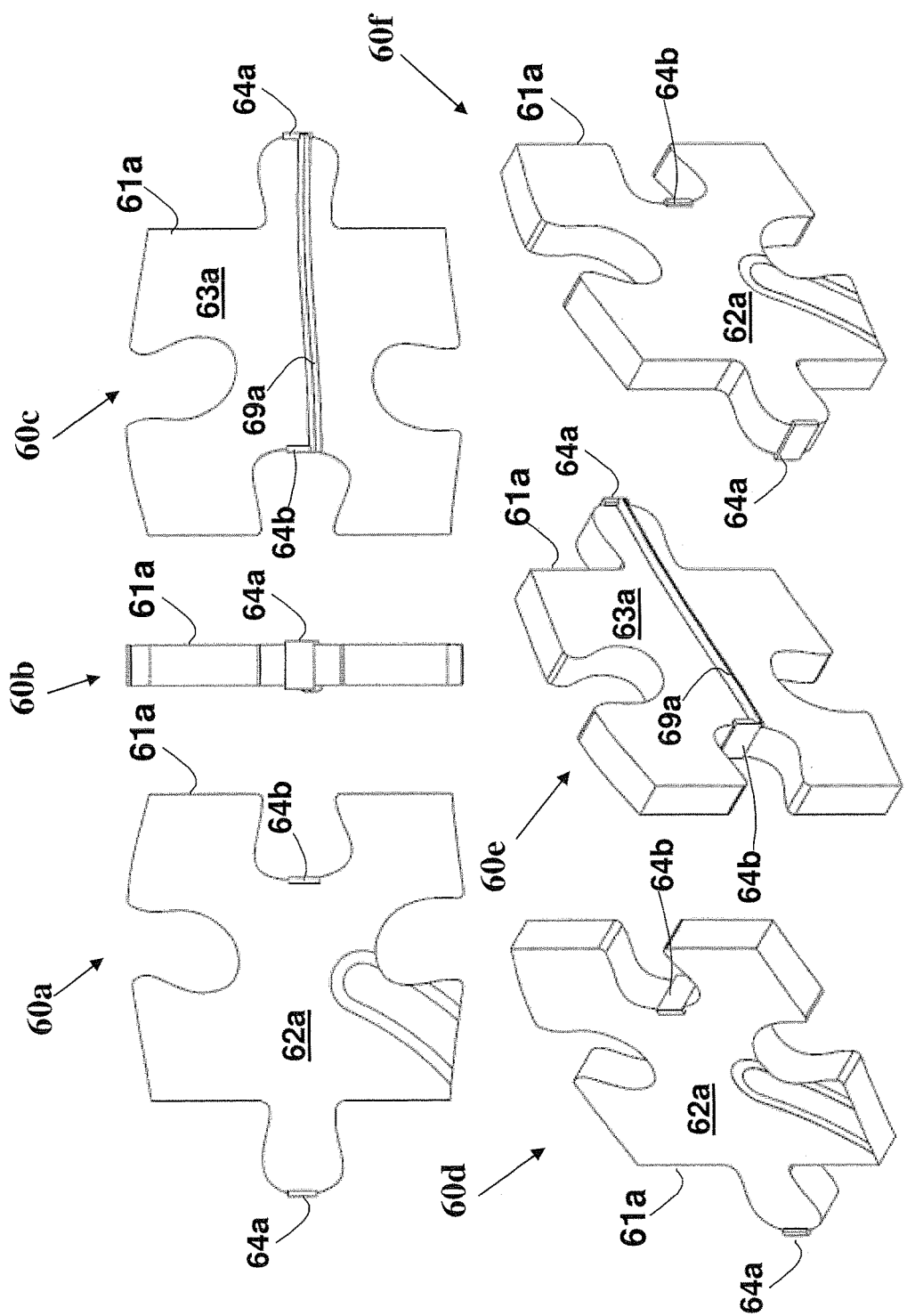
FIG. 6 depicts various views of a puzzle piece according to an aspect of the invention.

Various views of an exemplary puzzle piece $61a$ are shown in FIG. 6. View $60a$ is a front view, view $60b$ is a side view and view $60c$ is a rear view of the puzzle piece $61a$. Similarly, views $60d$ and $60f$ are perspective front views and view $60e$ is perspective rear view of the puzzle piece $61a$. The puzzle piece $61a$ includes a front surface $62a$ showing part of the puzzle picture, and a rear surface $63a$ to be laid on the puzzle frame. Two electricity conductive pads $64a$ and $64b$ (e.g. metallic pads) are mounted on the side surface of the puzzle piece $61a$. The pads are preferably made of a flexible metal material. A conductor $69a$ (such as a wire or any other electricity conductive material) electrically connects the two pads $64a$ and $64b$, thus providing an electricity conductive path between the pads $64a$ and $64b$. The wire $69a$ is attached to the rear surface $63a$ of the puzzle piece. Alternatively, the wire $69a$ can be attached to the front surface $62a$. Preferably, the conductor $69a$ can be inside the puzzle piece $61a$, and thus not visualized externally, thus providing better look of the puzzle piece $61a$, and further providing 'look and feel' as any common prior-art puzzle piece.

A schematic electrical diagram 70 of the circuit of the puzzle piece $61a$ is shown in FIG. 7. The diamond shaped contours $71a$ and $71b$ represents the electricity conductive surfaces of the pads $64a$ and $64b$. The conductor $69a$, connecting the two pads $54a$ and $64b$, is represented in the diagram as the line 72.

Figure 8:
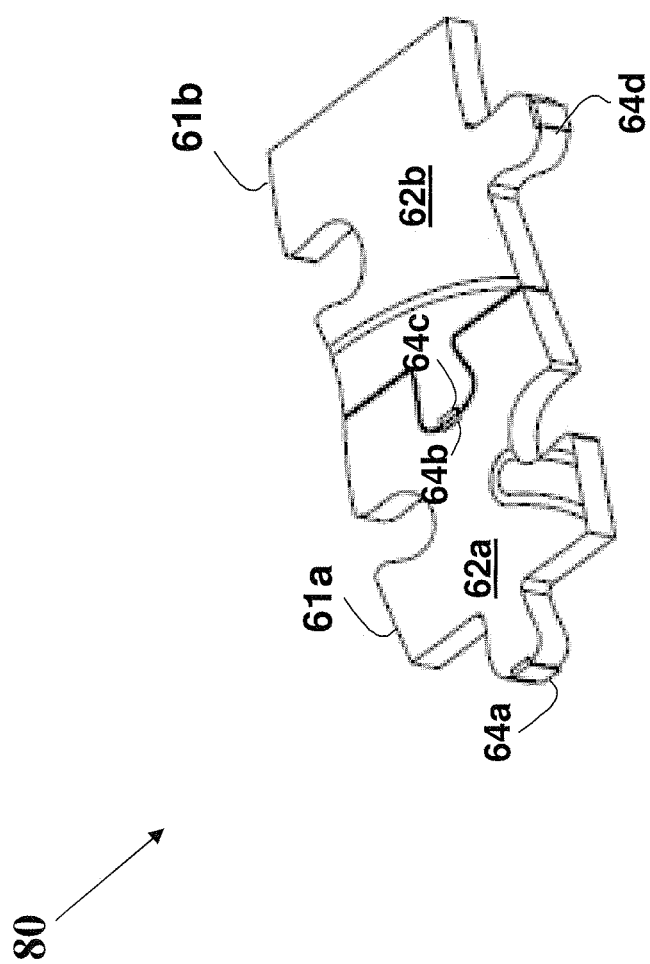
FIG. 8 depicts a perspective view of two engaged puzzle pieces according to the invention.

A perspective front view 80 of two engaged puzzle pieces $61a$ and $64b$ is shown in FIG. 8. The parts are mechanically connected to one another via mating knobs and cavities. Puzzle piece $61a$ is shown having two conductive pads $64a$ and $64b$ and a front surface $62a$, and puzzle piece $61b$ is shown having two conductive pads $64c$ and $64d$ and a front surface $62b$. A schematic electrical diagram 90 of the circuit of the two puzzle pieces $61a$ and $61b$ is shown in FIG. $9a$, wherein the electrical symbols $91a$ and $91b$ corresponds to puzzle pieces $61a$ and $61b$, respectively. The pad symbols $92a$ and $92b$, respectively, correspond to pads $64b$ and $64a$ of puzzle piece $61a$. Similarly, the pad symbols $92c$ and $92d$ respectively correspond to pads $64c$ and $64d$ of puzzle piece $61b$. Upon engaging puzzle pieces $61a$ and $61b$ as part of assembling the puzzle, an electrical contact is made between pad $64b$ of puzzle piece $61a$ and pad $64c$ of puzzle piece $61b$ as shown in FIG. 8. The result is a conductive path along the engaged puzzle pieces, between pad $64a$ (of piece $61a$) and pad $64d$ (of piece $61b$). The resulting electrical diagram 95 is shown in FIG. $9b$, which shows the pad symbols $92a$ and $92c$ overlapping, representing being in electrical contact, thus allowing a conductive path between pads $92b$ and $92d$.

Figure 10A:
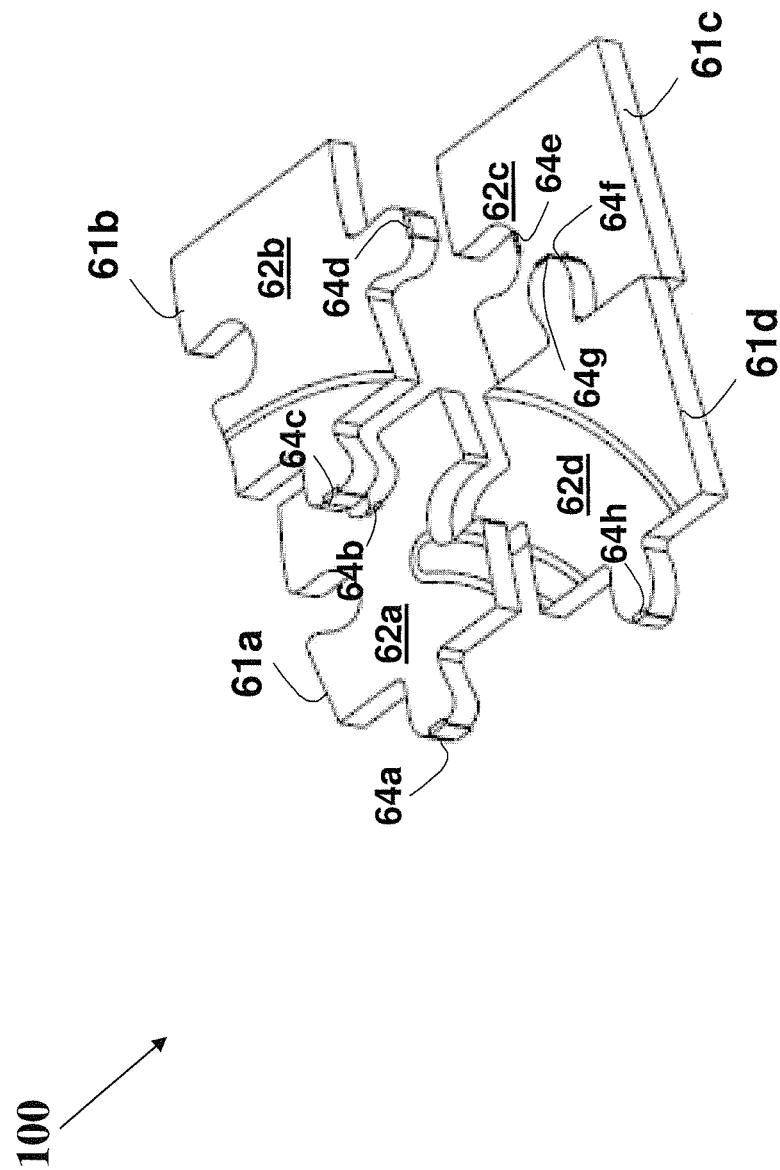
FIG. 10a depicts a front perspective view of engaging four puzzle pieces according to an aspect of the invention.
Figure 10B:
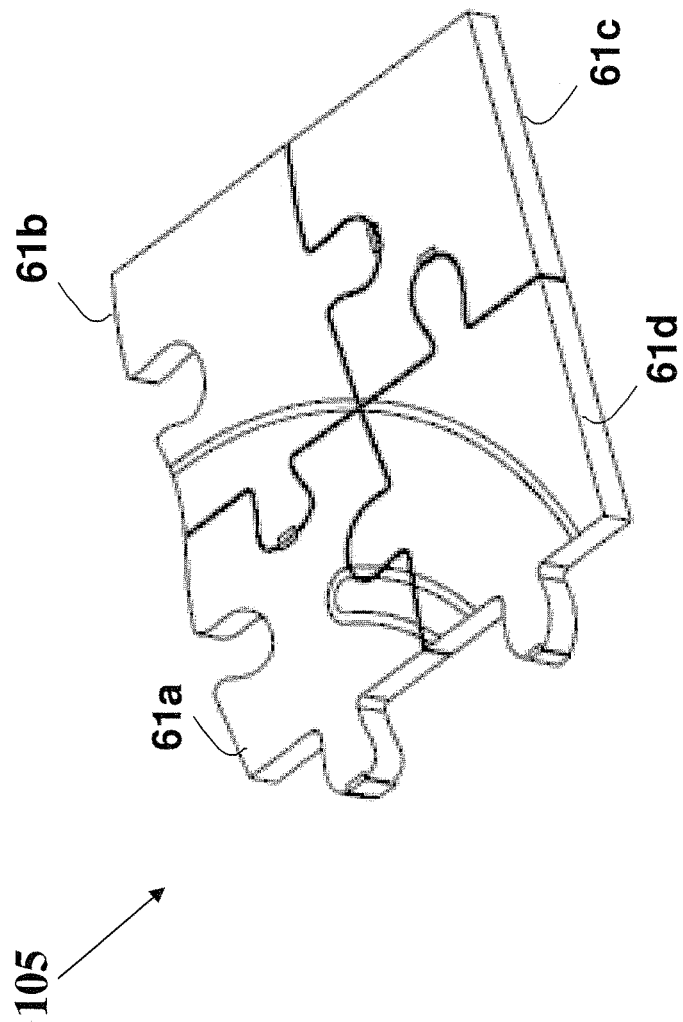
FIG. 10b depicts a front perspective view of assembled four puzzle pieces according to an aspect of the invention.
Figure 11:
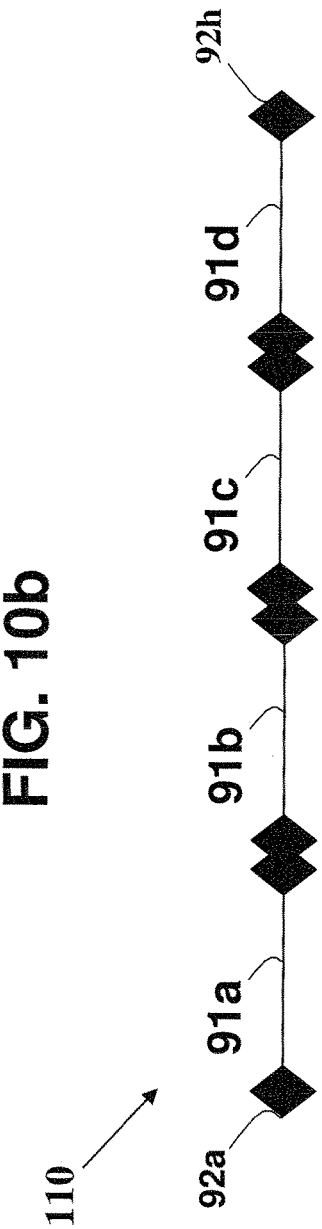
FIG. 11 illustrates the electrical schematic diagram of engaged four puzzle pieces according to an aspect of the invention.

FIGS. 8-9 demonstrate the engagement of two puzzle pieces, wherein such engagement provides for both a puzzle assembly step towards completing the puzzle and reconstructing the image, as well as creating a conductive path along the engaged puzzle pieces. Similarly, any number of puzzle pieces may include individual conductive paths, such that, when inter-engaged, form a conductive path. A non-limiting example of four puzzle pieces $61a$, $61b$, $61c$ and $61d$ in the process of being engaged to assemble the puzzle image and to form a conductive path is shown in FIGS. 10-11. FIG. $10a$ shows a front perspective view 100 of the four puzzle pieces during assembly, and FIG. $10b$ shows a view 105 of the four pieces engaged. Puzzle pieces $61c$ and $61d$ are added to pieces $61a$ and $61b$ described above, having respective planar front surfaces $62c$ and $62d$. Puzzle piece $61c$ is shown having two conductive pads $64e$ and $64f$, and puzzle piece $61d$ is shown having two conductive pads $64g$ and $64h$. As part of the engagement, an electrical contact is made between pad $64b$ of puzzle piece $61a$ and pad $64c$ of puzzle piece $61b$, between pad $64d$ of puzzle piece $61b$ and pad $64e$ of puzzle piece $61c$ and between pad $64f$ of puzzle piece $61c$ and pad $64g$ of puzzle piece $61d$. The result is a conductive path along the engaged puzzle pieces, between the pads $64a$ (of piece $61a$) and pad $64h$ (of piece $61d$). The resulting electrical diagram 110 is shown in FIG. 11, which shows the electrical connection between the pieces symbols $91a$, $91b$, $91c$ and $91d$ (connected in series), which respectively corresponds to pieces $61a$, $61b$, $61c$ and $61d$, thus allowing a conductive path between pad $92a$ (corresponding to pad $64a$ of piece $61a$) and pad $92h$ (corresponding to pad $64h$ of piece $61d$).

Figure 13:
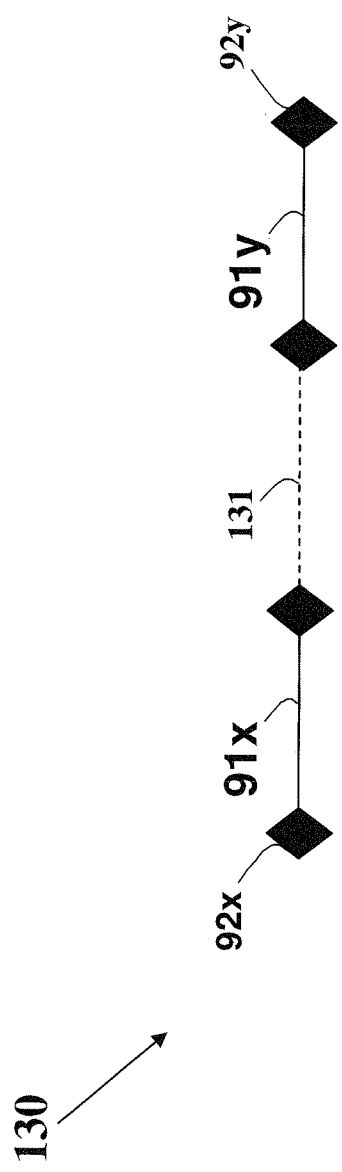
FIG. 13 illustrates the electrical schematic diagram of fully assembled puzzle pieces according to an aspect of the invention.

In one embodiment all the puzzle pieces include pads, and upon fully assembling the puzzle and reconstructing its image, all puzzle pieces are also part of the conductive path. A fully assembled puzzle 120 consisting of 20 puzzle pieces is shown in FIGS. $12a$ and $12b$. All the puzzle pieces forming puzzle 120 are in contact with each other, to yield a continuous conductive path (shown in dashed line 122) as described in FIG. $12b$. The ends of the conductive path are pad $64x$ being part of puzzle piece $61x$ (having a surface $62x$) and pad $64y$ being part of puzzle piece $61y$ (having a surface $62y$). The resulting electrical diagram 130 is shown in FIG. 13, which shows the one end of the electrical path being pad symbol $92x$ of symbol piece $91x$ (respectively corresponding to pad $64x$ of piece $61x$), and the other end of the electrical path being pad symbol $92y$ of symbol piece $91y$ (respectively corresponding to pad $64y$ of piece $61y$). The dashed line 131 represents the conductive path created by all the other puzzle pieces.

In one alternative embodiment, only part of the puzzle pieces participate as part of the conductive path and thus are including pads and connecting conductor, such that only these pieces are part of the formed electrical conductive path.

Figure 14:
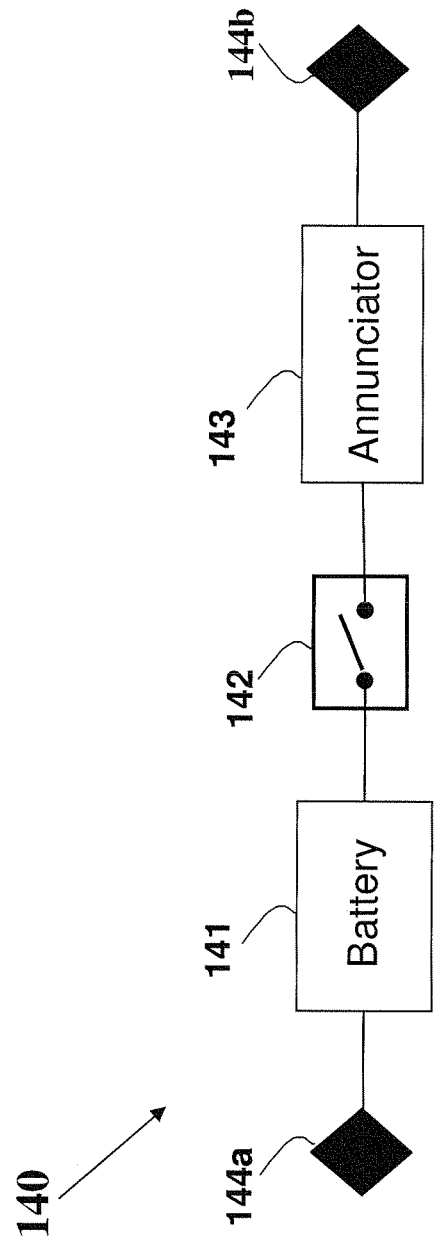
FIG. 14 illustrates the electrical schematic diagram of a puzzle frame according to an aspect of the invention.
Figure 15A:
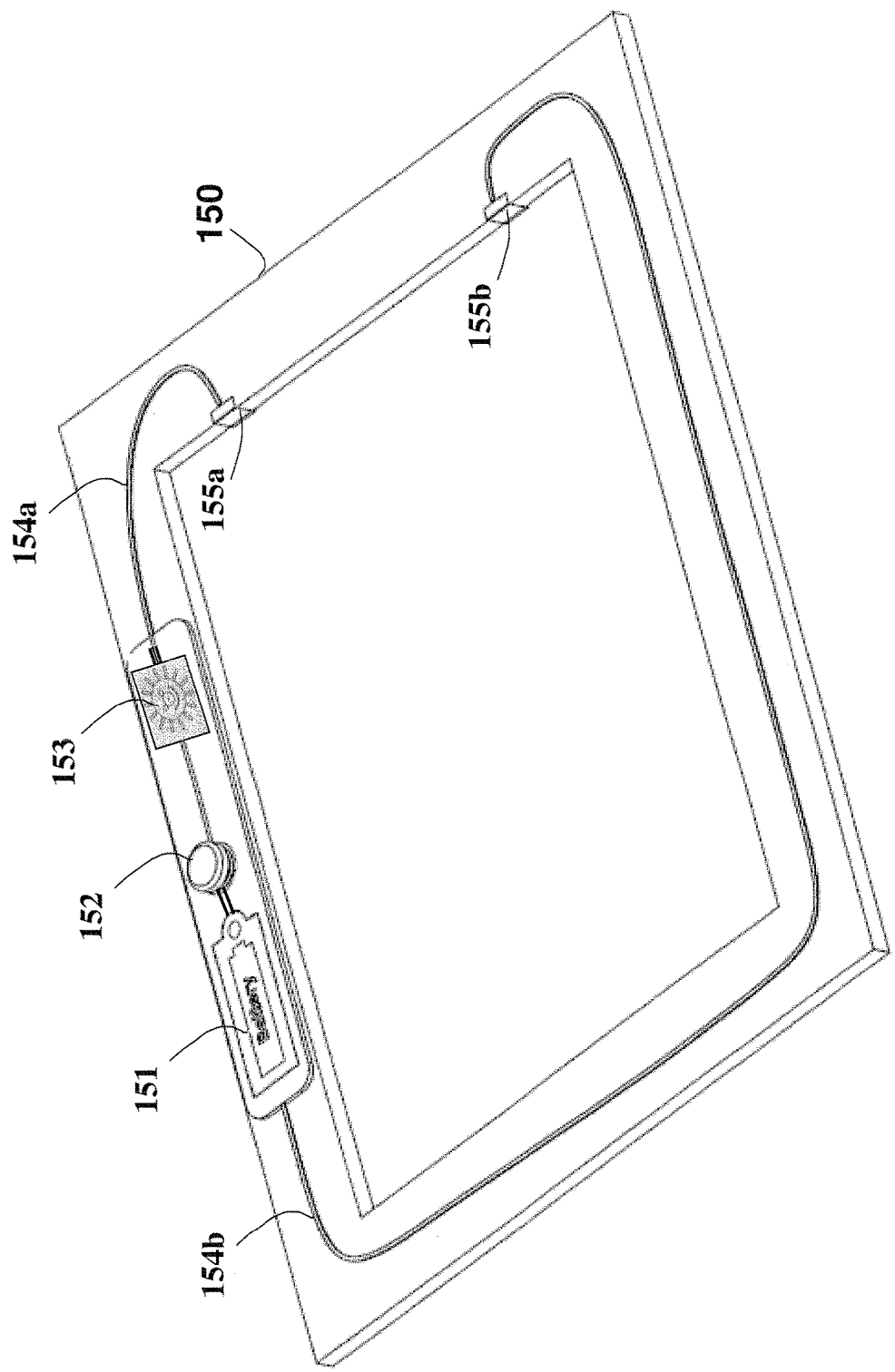
FIG. 15a depicts a front perspective view of a puzzle frame according to an aspect of the invention.
Figure 15B:
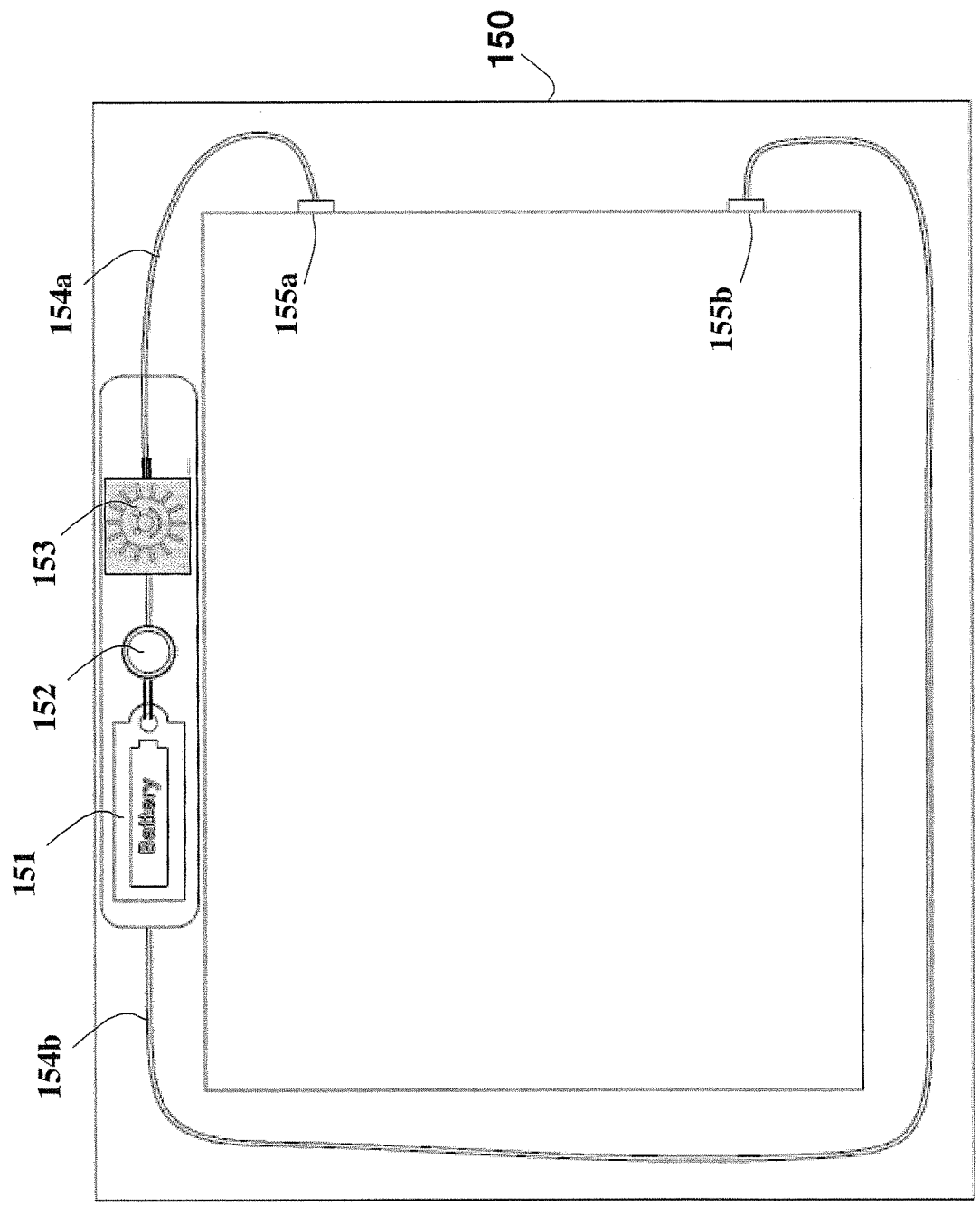
FIG. 15b depicts a front view of a puzzle frame according to an aspect of the invention.

According to one embodiment, the conductive path formed by the assembled puzzle pieces is used to close an electrical circuit in the puzzle frame or anywhere external to the assembled puzzle. A non-limiting example of an electrical circuit 140 of a puzzle frame 150 is shown in FIG. 14 and a non-limiting example of a perspective and front pictorial views of a puzzle frame 150 are respectively shown in FIGS. $15a$ and $15b$. The frame 140 includes a battery source such as a battery 141, a switch 142 (e.g., sliding switch) and an annunciator 143. The annunciator 143 indicates the closing of the electrical circuit (hence the completing of part or whole of the puzzle assembling), and consists of any visual or audible signaling device, or any other device which indicate a status to the person. The frame further includes two conductive pads 144a and 144b (e.g., metallic pads) which are conductive surfaces (may be similar to the pads in the puzzle pieces described above) and designed to be in contact with the mating pads in the assembled puzzle, which are the ends of the conductive path formed by correctly assembling all (or part) the puzzle pieces. A pictorial view of frame 150 is shown in FIGS. 15a and 15b, illustrating a battery 151 (corresponding to battery 141 shown in electrical diagram 140 in FIG. 14), connected to a push-button switch 152 (corresponding to battery 142 shown in electrical diagram 140 in FIG. 14), which is connected to the LED 153 serving as visual indicator (corresponding to annunciator 143 shown in electrical diagram 140 in FIG. 14). The LED 153 serves as a visual indicator, and further illuminates the 'smiley sun' around it, thus providing a further enjoyment. The frame 150 further comprises pads 155a and 155b (corresponding to pads 144a and 144b shown in electrical diagram 140 in FIG. 14) mounted on the inside wall of the frame 150, thus being in contact with the puzzle pieces upon assembling the puzzle inside the frame 150. The pads 155a and 155b respectively connect to LED 153 and to the battery 151 via the respective wires 154a and 154b (or any other conductors). The wires 154a and 154b are shown exposed in FIGS. 15a and 15b, but can alternatively and preferably be installed hidden inside the frame 150 heightened rim hence provided better aesthetics. Pads 155a and 155b are located to mate mechanically and be in electrical contact with the pads 64x and 64y of the assembled puzzle.

Figure 16:
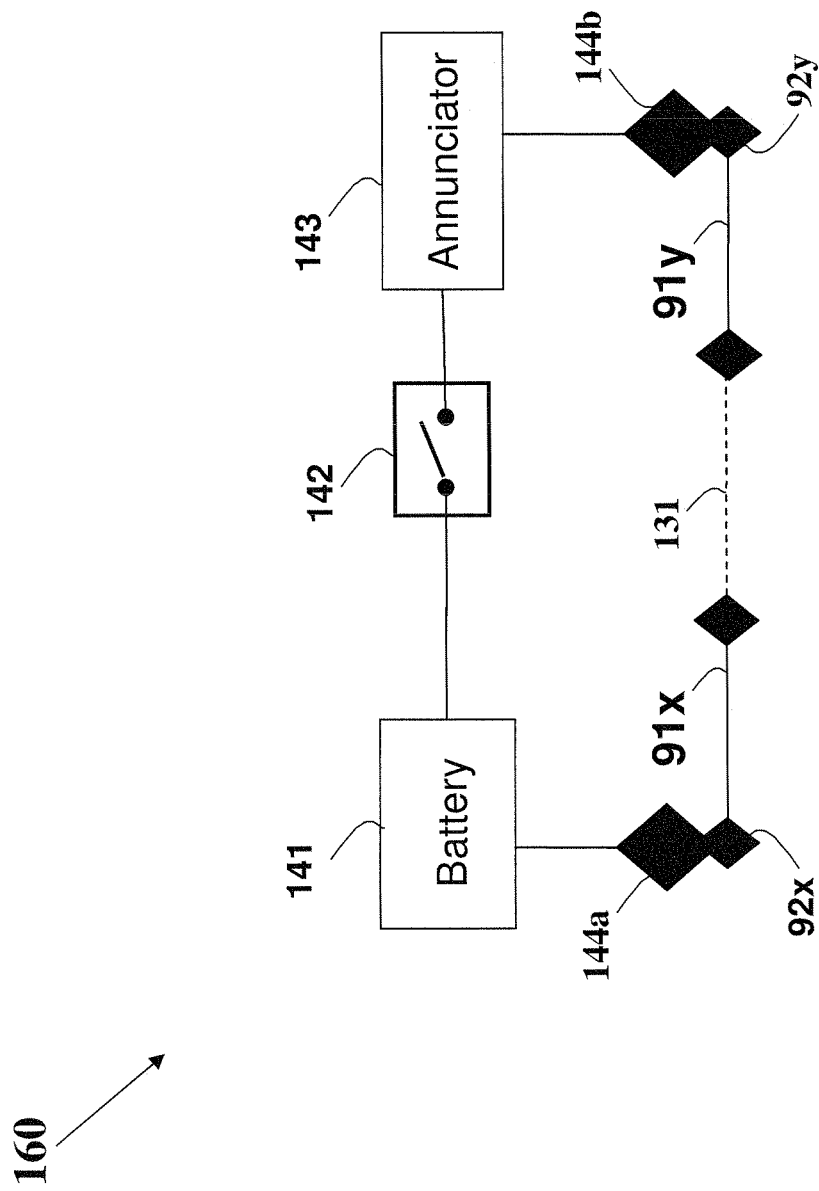
FIG. 16 illustrates the electrical schematic diagram of an assembled puzzle in a puzzle frame according to an aspect of the invention.

Upon completing the assembling process of the puzzle pieces and reconstructing the puzzle in the puzzle frame 140, a complete electrical circuit 160 is formed as shown in FIG. 16. The end pads 92x and 92y of the conductive path 130 are respectively in contact with pads 144a and 144b of the puzzle frame 140. At this situation, closing switch 142 will allow electrical current to flow from the battery 141 to the annunciator 143, notifying the user (preferably the puzzle assembler) of a successful solution of the puzzle, thus offering an additional, entertaining and surprising reward as part of the solving the puzzle.

Figure 17:
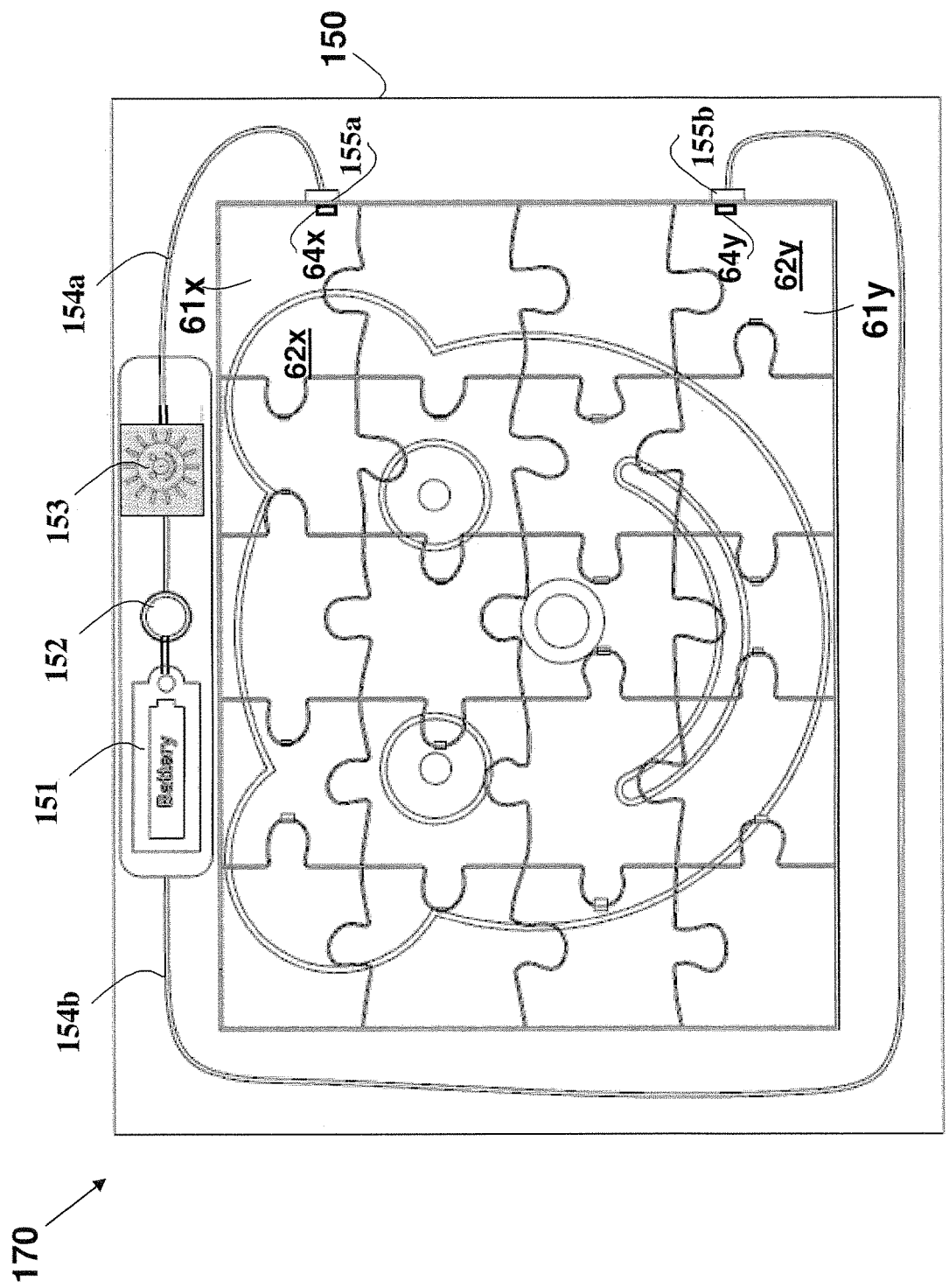
FIG. 17 depicts a front view of a completed puzzle in a frame according to an aspect of the invention.

A pictorial front view of a completed puzzle is shown as view 170 in FIG. 17. The frame 150 is shown to hold the assembled puzzle 120 described above. The pads 64x and 64y in the respective puzzle pieces 61x and 61y, which are the end pads of the conductive path 122 in the engaged puzzle pieces, are shown in contact respectively with pads 155a and 155b of the puzzle frame 150, thus closing the electrical circuit and allowing current flow and illumination of the LED 153 when pressing the pushbutton 152.

Figure 18:
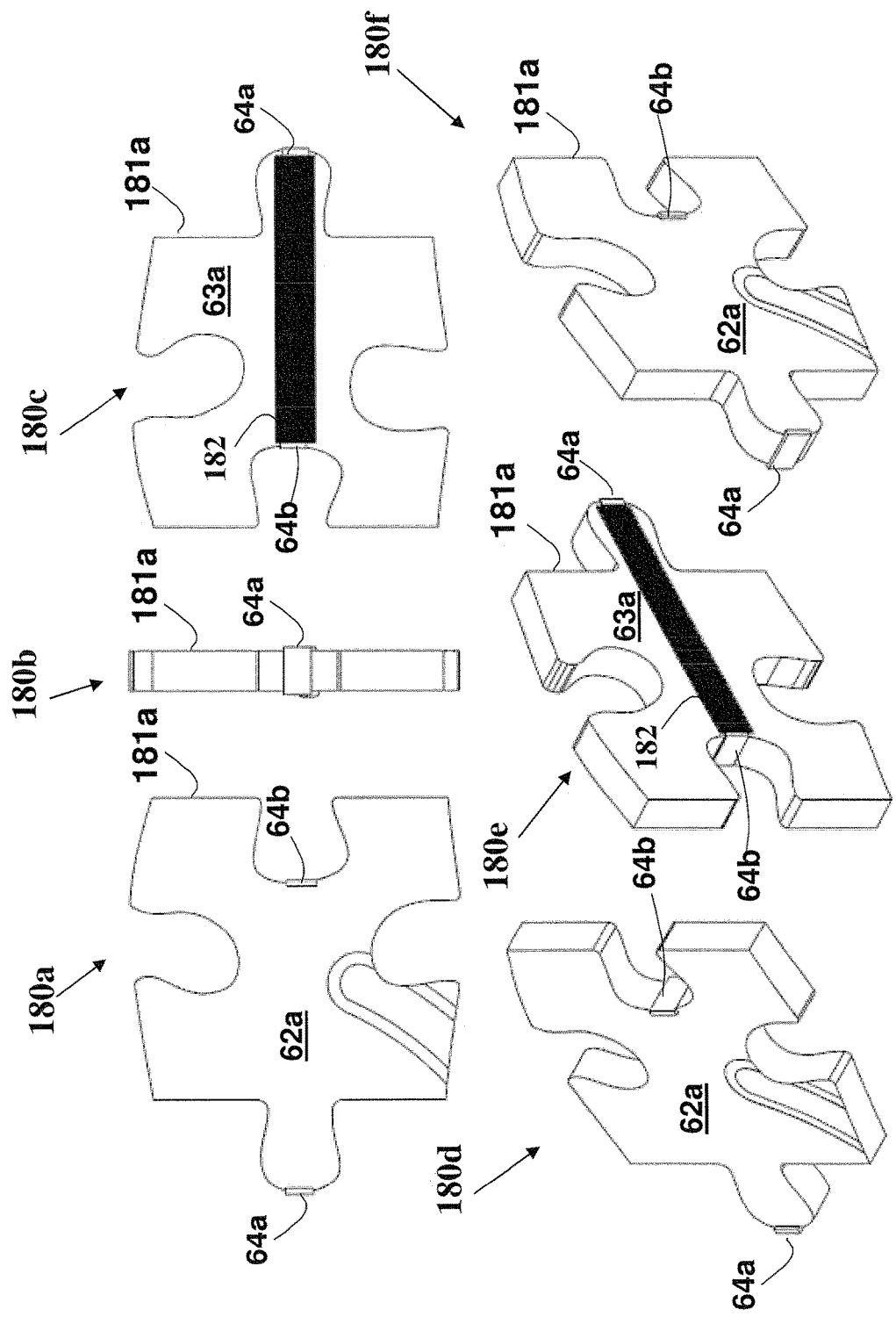
FIG. 18 depicts various views of a puzzle piece according to an aspect of the invention.

In one embodiment the electrical conductive path connecting the pads in the puzzle piece is based on a metallic strip. In another embodiment the electrical conductive path connecting the pads in the puzzle piece is formed by a conductive paint or ink, allowing the circuit to be drawn or printed. Conductive paints are known in the art and usually contain a powder of a conductive material such as silver and carbon. Various views of an exemplary puzzle piece 181a are shown in FIG. 18, having a conductive paint strip 182 as a substitute to the wire 69a used in puzzle piece 61a as shown in FIG. 6. View 180a is a front view, view 180b is a side view and view 180c is a rear view of the puzzle piece 181a. Similarly, views 180d and 180f are perspective front views and view 180e is perspective rear view of the puzzle piece 181a. The puzzle piece 181a includes a front surface 62a showing part of the puzzle picture, and a rear surface 63a to be laid on the puzzle frame. Two electricity conductive pads 64a and 64b are mounted on the side surface of the puzzle piece 181a. The pads are preferably made of a flexible metal material. A conductive painted strip 182 is painted on the rear surface 63a using conductive paint and electrically connects the two pads 64a and 64b, thus providing an electricity conductive path between the pads 64a and 64b. Alternatively, conductive painted strip 182 can be used on the front surface 62a. In one embodiment, the conductive strip is located on the front surface 62a but below the picture printed (or glued) on that side, thus the strip 182 is hidden and cannot be visualized by the user, further providing 'look and feel' as any conventional prior-art puzzle piece.

Figure 19:
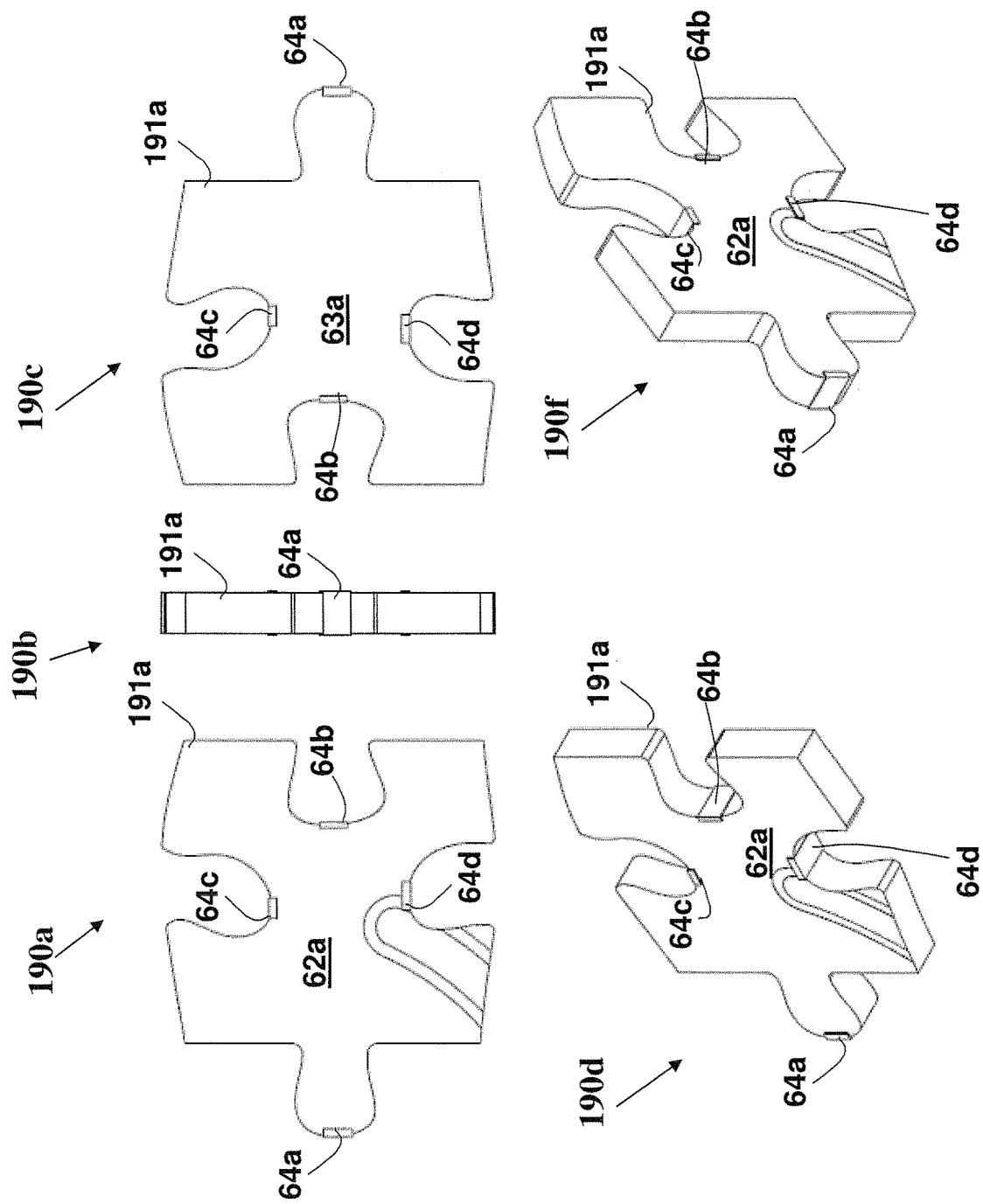
FIG. 19 depicts various views of a puzzle piece according to an aspect of the invention.

While the embodiments have been exampled above with regard to rectangular shaped puzzle pieces having two conductive pads and a single conductive path, it will be appreciated that the invention equally applies to puzzle pieces having three or more pads and for cases wherein two or more conductive paths are formed. A non-limiting example of a puzzle piece 191a having four conductive pads is shown in FIG. 19. View 190a is a front view, view 190b is a side view and view 190c is a rear view of the puzzle piece 191a. Similarly, view 190d is a perspective front view and view 190f is a perspective rear view of the puzzle piece 191a. The puzzle piece 191a includes a front surface 62a showing part of the puzzle picture, and a rear surface 63a to be laid on the puzzle frame. Added to the two electricity conductive pads 64a and 64b described above relating to puzzle piece 61a in FIG. 6, two additional conductive pads 64c and 64d are also mounted on the side surface of the puzzle piece 191a. The pads are interconnected by one or more conductive paths, which can be implemented using a wire (similar to wire 69a in FIG. 6) or a conductive paint (similar to conductive strip 182 in FIG. 18).

Figure 20A:
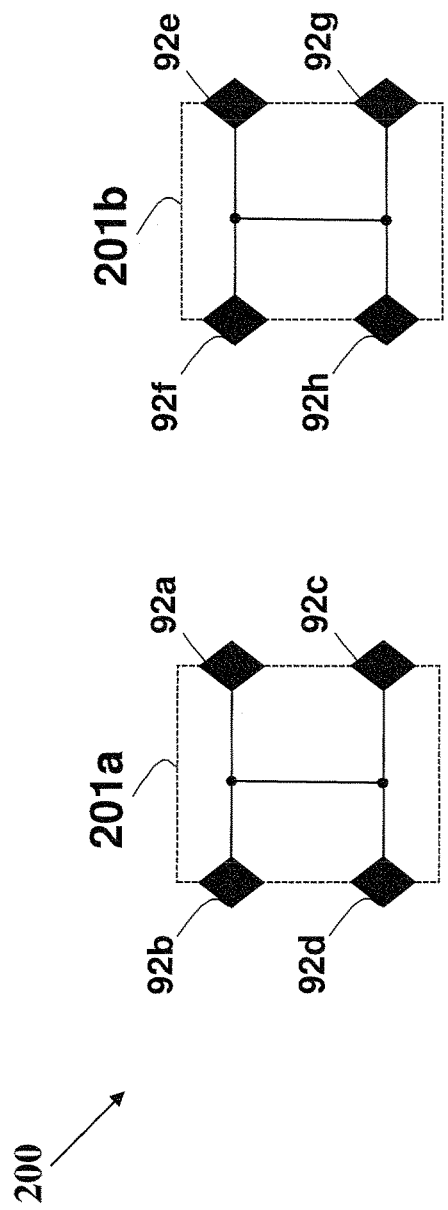
FIG. 20a illustrates the electrical schematic diagram of two puzzle pieces according to an aspect of the invention.
Figure 20B:
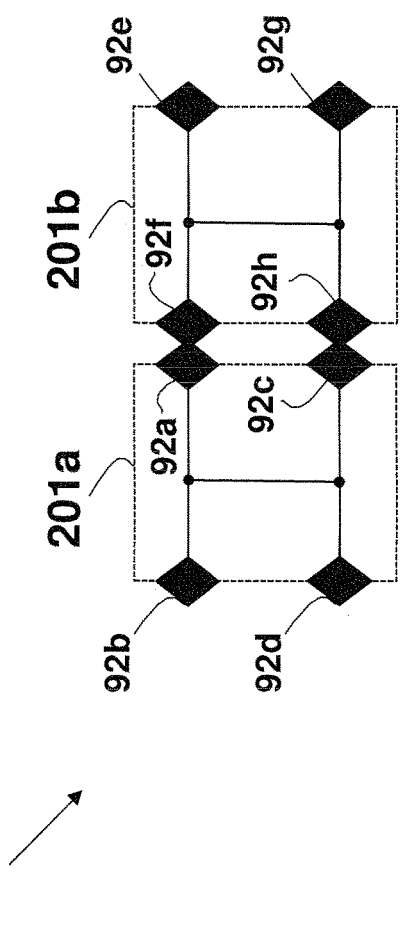
FIG. 20b illustrates the electrical schematic diagram of two engaged puzzle pieces according to an aspect of the invention.

In one embodiment all pads are electrically connected forming a single electric circuit. Such configuration is illustrated in the electrical diagram 200 in FIG. 20a, showing two puzzle pieces 201a and 201b, each having four conductive pads, as described in FIG. 19. Puzzle piece 201a is having pads 92a, 92b, 92c and 92d, and puzzle piece 201b is having pads 92e, 92f, 92g and 92h (each four pad sets corresponding to the four pads 64a-d in piece 191a in FIG. 19). In one non-limiting example, upon engaging the two pieces 201a and 201b, contact is made between both pad pair 92f (of puzzle piece 201b) and 92a (of puzzle piece 201a), as well as pad pair 92h (of puzzle piece 201b) and 92c (of puzzle piece 201a), as shown in electrical diagram 205 shown in FIG. 20b. Such configuration can be beneficial in the case wherein the contacts in one pad pair is damaged or faulty (e.g., due to dirt, corrosion or mechanical deformation) and no electrical connection is made. Since the other pad pair is operative, the conductive path will be completed and the system will operate correctly.

In an alternative embodiment, the pads are electrically connected to form two distinct and isolated conductive paths by the puzzle piece. Such configuration is illustrated in the electrical diagram 210 in FIG. 21a, showing two puzzle pieces 211a and 211b, each having four conductive pads, as described in FIG. 19. Puzzle piece 211a is having pads 92a, 92b, 92c and 92d, and puzzle piece 211b is having pads 92e, 92f, 92g and 92h (each four pad set corresponding to the four pads 64a-d in piece 191a in FIG. 19). Conductive pad 92b is connected only to pad 92a, while pad 92d is connected to pad 92c, with no electrical connection between the pad pairs. Similarly, conductive pad 92f is connected only to pad 92e, while pad 92h is connected to pad 92g, with no electrical connection between the pad pairs. In one non-limiting example, upon engaging the two pieces 211a and 211b, contact is made between both pad pair 92f (of puzzle piece 211b) and 92a (of puzzle piece 211a), as well as pad pair 92h (of puzzle piece 211b) and 92c (of puzzle piece 211a). As shown in the electrical diagram 215 in FIG. 21b, the electrical circuit formed includes two conductive paths, one extending from pad 92e to pad 92b via the contact made by pads 92f and 92a, while the other one, isolated from the first one, is extending from pad 92g to pad 92d via the contact made by pads 92h and 92c. Thus two distinct and isolated conductive paths are formed. Such configuration can be beneficial in the case wherein the contacts in one pad pair is faulty (e.g., due to dirt or mechanical deformation) and no electrical connection is made, since only one of the conductive paths will be affected. Since the other conductive path is operative, the system will operate correctly. Further, each such conductive path may be used to activate a distinct annunciator.

Figure 22:
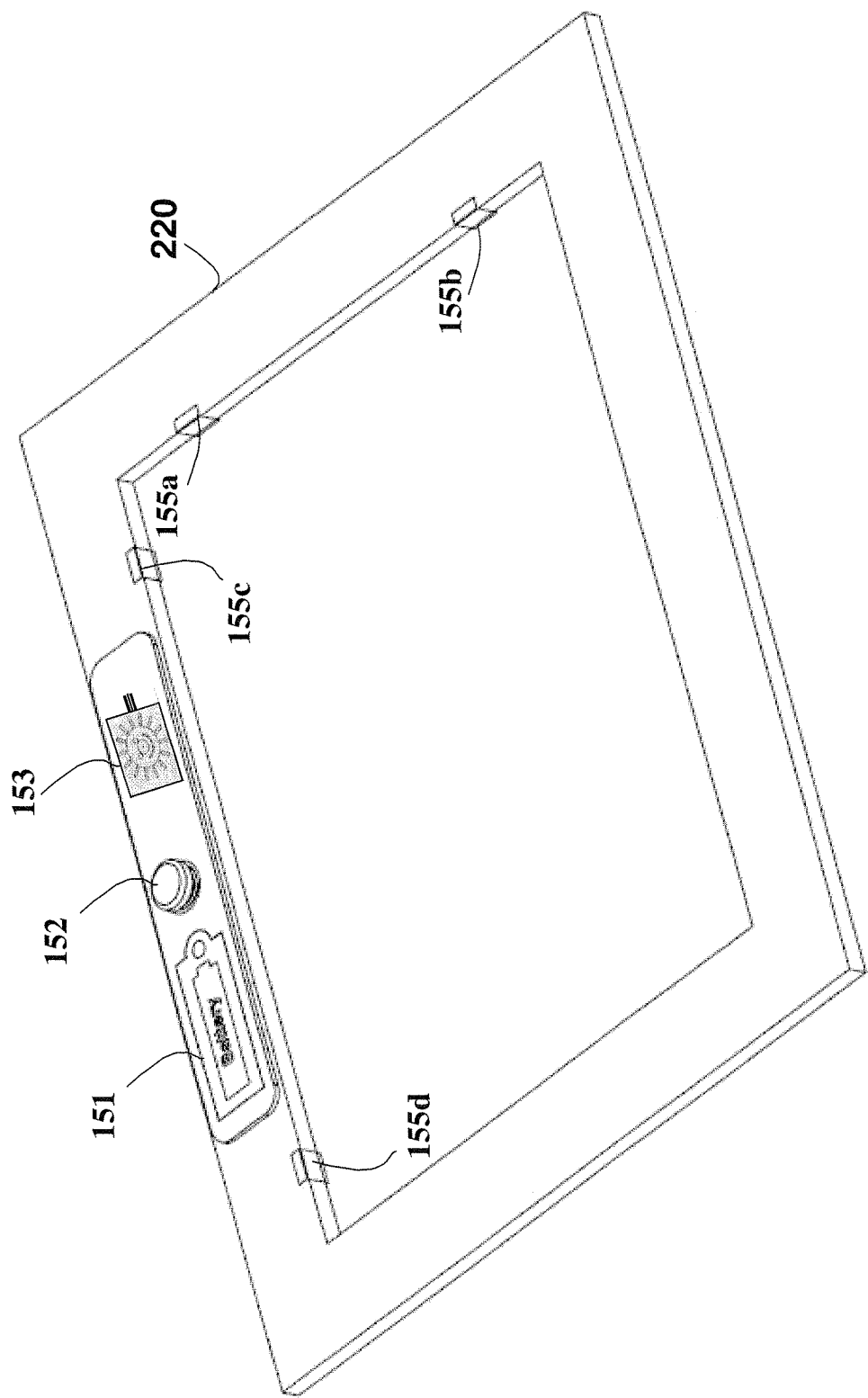
FIG. 22 depicts a front perspective view of a puzzle frame according to an aspect of the invention.

While the invention has been exampled above in FIGS. 15a and 15b with regard to a puzzle frame having two conductive pads for a single conductive path, it will be appreciated that the invention equally applies to a puzzle frame having three or more pads for connecting to assembled puzzle pieces. The added puzzle frame conductive pads may be used for redundancy in order to improve reliability and overcome faulty pads or conductive paths, or can be used for added functionality such as supporting different puzzle assemblies or in relation with multiple annunciators. FIG. 22 shows a puzzle frame 220 having four conductive pads. Two conductive pads 155c and 155d are shown in addition to pads 155a and 155b shown in FIG. 15 above. While the two conductive pad pairs are shown each in a different side of the frame, the pads 155a-d can be distributed in any manner along the frame 220 inside side walls.

Figure 23:
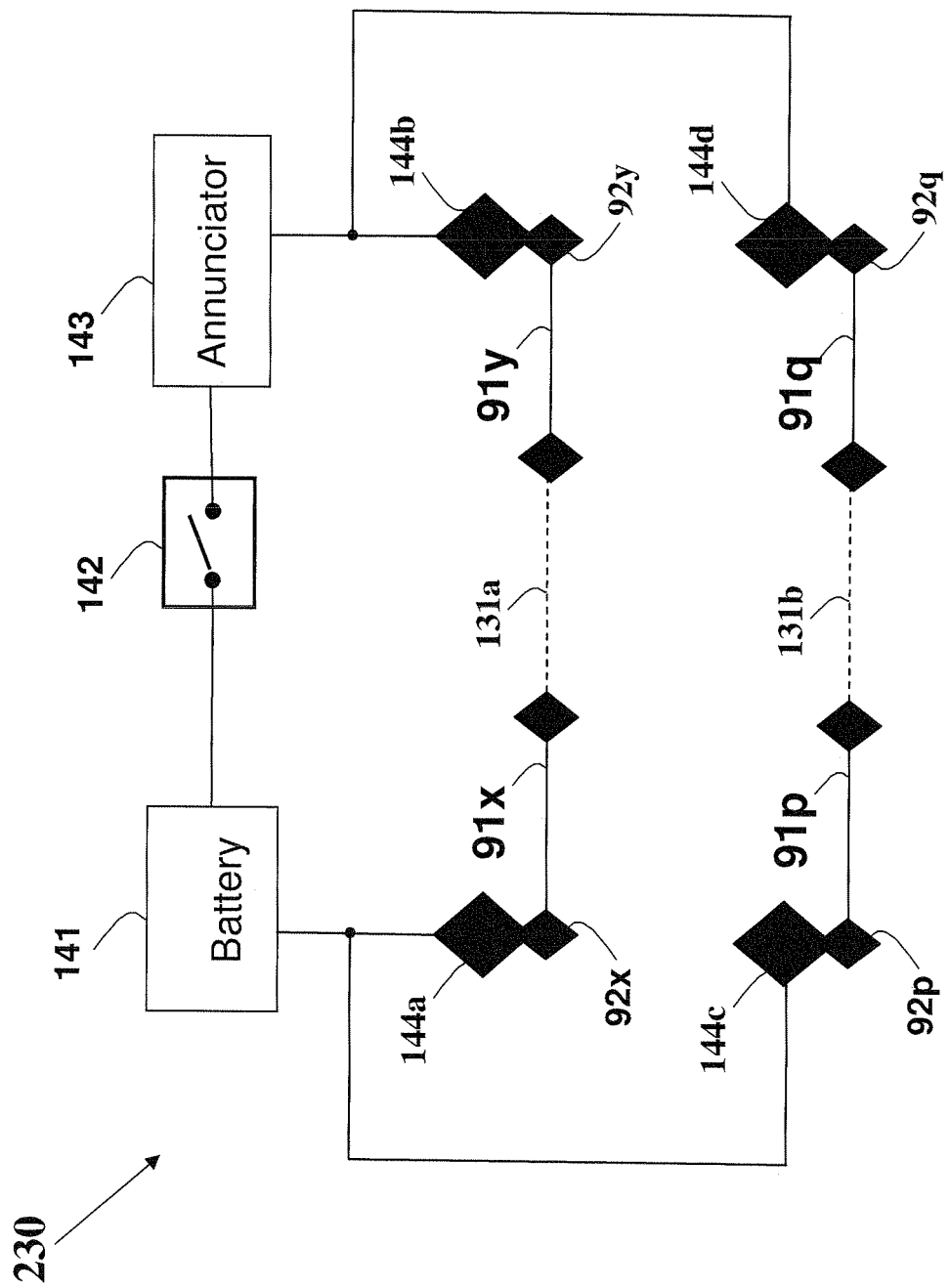
FIG. 23 illustrates the electrical schematic diagram of an assembled puzzle in a puzzle frame according to an aspect of the invention.

In one embodiment according to the invention, the additional frame pads are electrically connected to the pads shown in FIG. 15 to form parallel electrical paths. The electrical schematic diagram 230 in FIG. 23 shows such a configuration. Similar to the description above with regard to FIGS. 15 and 16, the electrical circuit is formed by the connection of pads 92x and 92y (respectively of puzzle pieces 91x and 91y and the ends of the formed conductive path 131a), to the respective frame conductive pads 144a and 144b (representing respective frame pads 155a and 155b). The added frame conductive pads 144c and 144d (representing respective frame pads 155c and 155d), connect to puzzle pieces pads 92p and 92q (respectively of puzzle pieces 91p and 91q at the ends of the formed conductive path 131b). Frame conductive pads 144a and 144c are connected, as well as frame pads 144b and 144d. In this case, two distinct and isolated electric paths are formed: one extending from frame pad 144a, via puzzle piece pad 92x, path 131a, puzzle piece pad 92y to frame pad 144b, and the other extending from frame pad 144c, via puzzle piece pad 92p, path 131b, puzzle piece pad 92q to frame pad 144d. Since the electric paths are connected in parallel, any single failure in one of the electric paths still render the system operative, hence increasing the system reliability and survivability. The conductive paths 131a and 131b may be isolated or connected, as described above.

Figure 24:
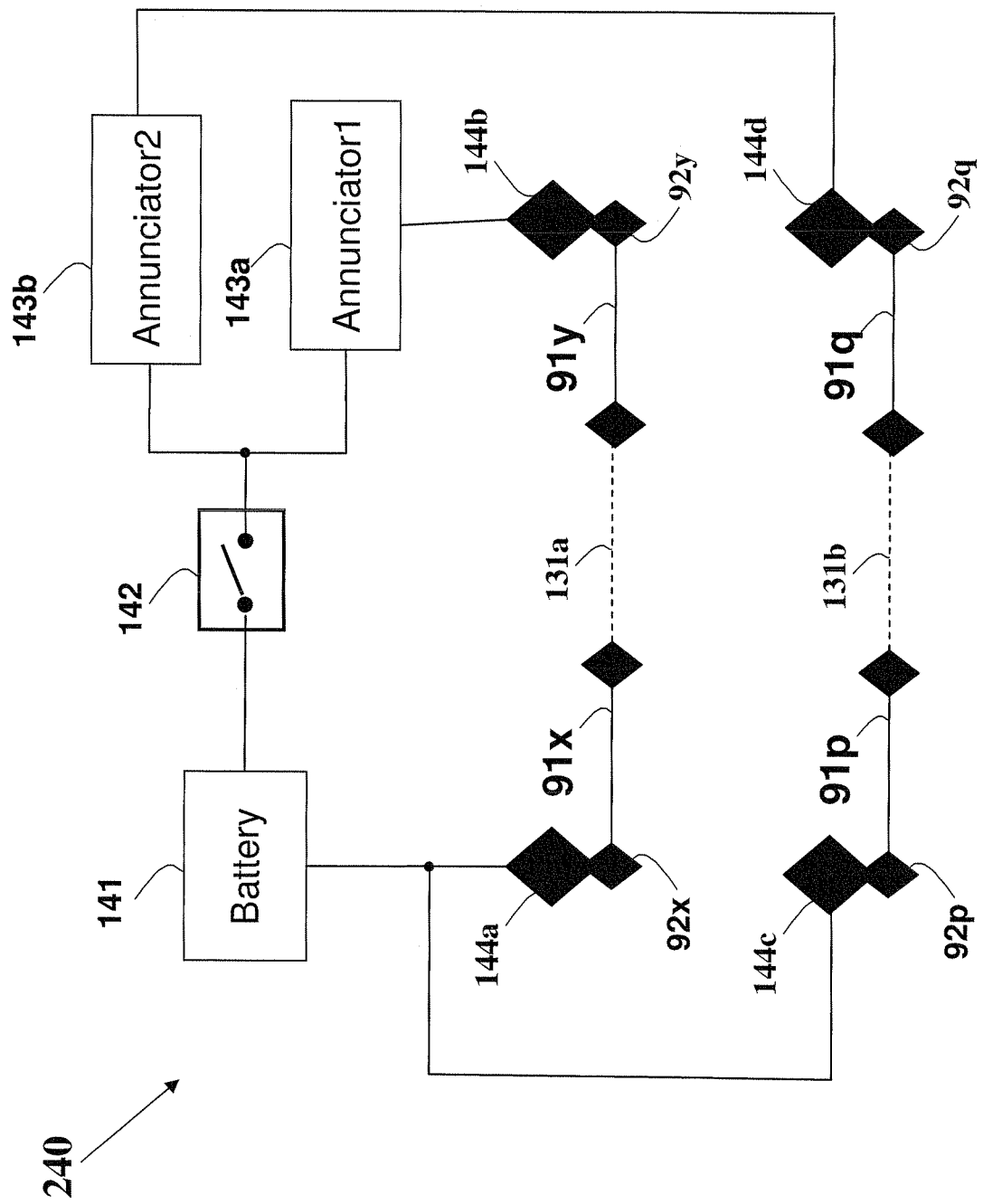
FIG. 24 illustrates the electrical schematic diagram of an assembled puzzle in a puzzle frame according to an aspect of the invention.

In an alternative embodiment, part or all of the additional frame pads are electrically isolated from the pads shown in FIG. 15 to form distinct and isolated electrical paths. The electrical schematic diagram 240 in FIG. 24 shows such a configuration. Two distinct annunciators, namely annunciator1 143a and annunciator2 143b are used. The first annunciator 143a is connected only to frame pad 144b (which is isolated from the other frame pads), and thus will be operated only upon the forming of an electrical conductive path extending from frame pad 144a, via puzzle piece pad 92x, path 131a, puzzle piece pad 92y to frame pad 144b. Similarly, the second annunciator 143b is connected only to frame pad 144b (which is isolated from the other frame pads), and thus will be operated only upon the forming of electrical conductive path extending from frame pad 144c, via puzzle piece pad 92p, path 131b, puzzle piece pad 92q to frame pad 144d. In one non-limiting example, each of the two paths relates to a different associated function in the assembled puzzle (e.g., two switches in the puzzle pieces, each corresponding to distinct paths 131a and 131b, and thus each affecting a different annunciator). In another non-limiting example, the same single frame 220 can be used as a base for two different assembled puzzle pieces. One of the assembled puzzles will connect only pads 144a and 144b, and thus activating only annunciator1 143a, while the assembled puzzle will connect only pads 144c and 144d, and thus activating only annunciator2 143b. Hence a single frame can be used for multiple puzzle assemblies, providing the savings in cost and space to use multiple puzzle frames, and further providing the excitement and amusement of providing the operation of multiple annunciators. A non-limiting example of a puzzle with both illumination and audible sound is disclosed in U.S. Patent Application 2007/0278740 to Mao entitled: "Puzzle Device with Illumination and Audible Sounds", which is incorporated in its entirety for all purposes as if fully set forth herein.

Figure 25A:
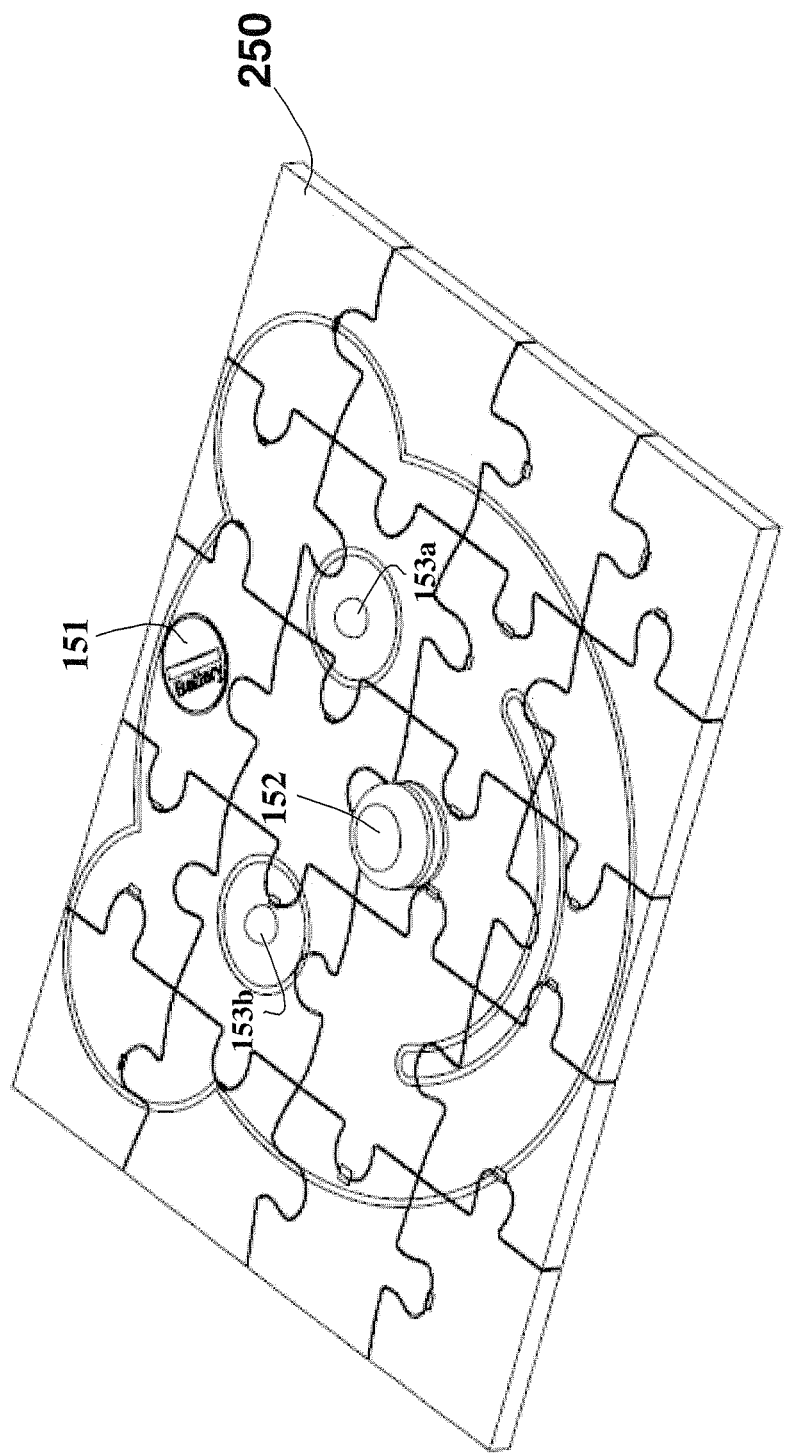
FIG. 25a depicts a front perspective view of an assembled puzzle with no frame according to an aspect of the invention.
Figure 25B:
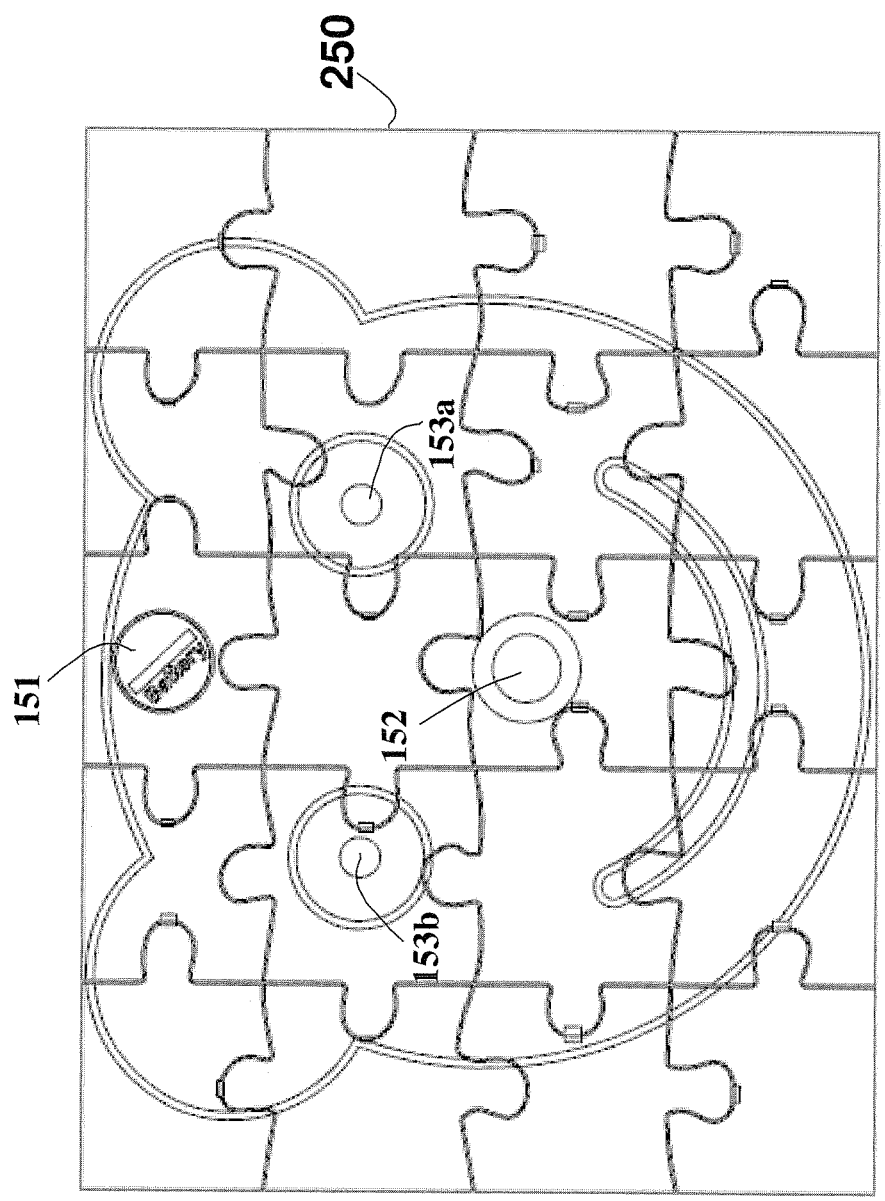
FIG. 25b depicts a front view of a of an assembled puzzle with no frame according to an aspect of the invention.
Figure 25C:
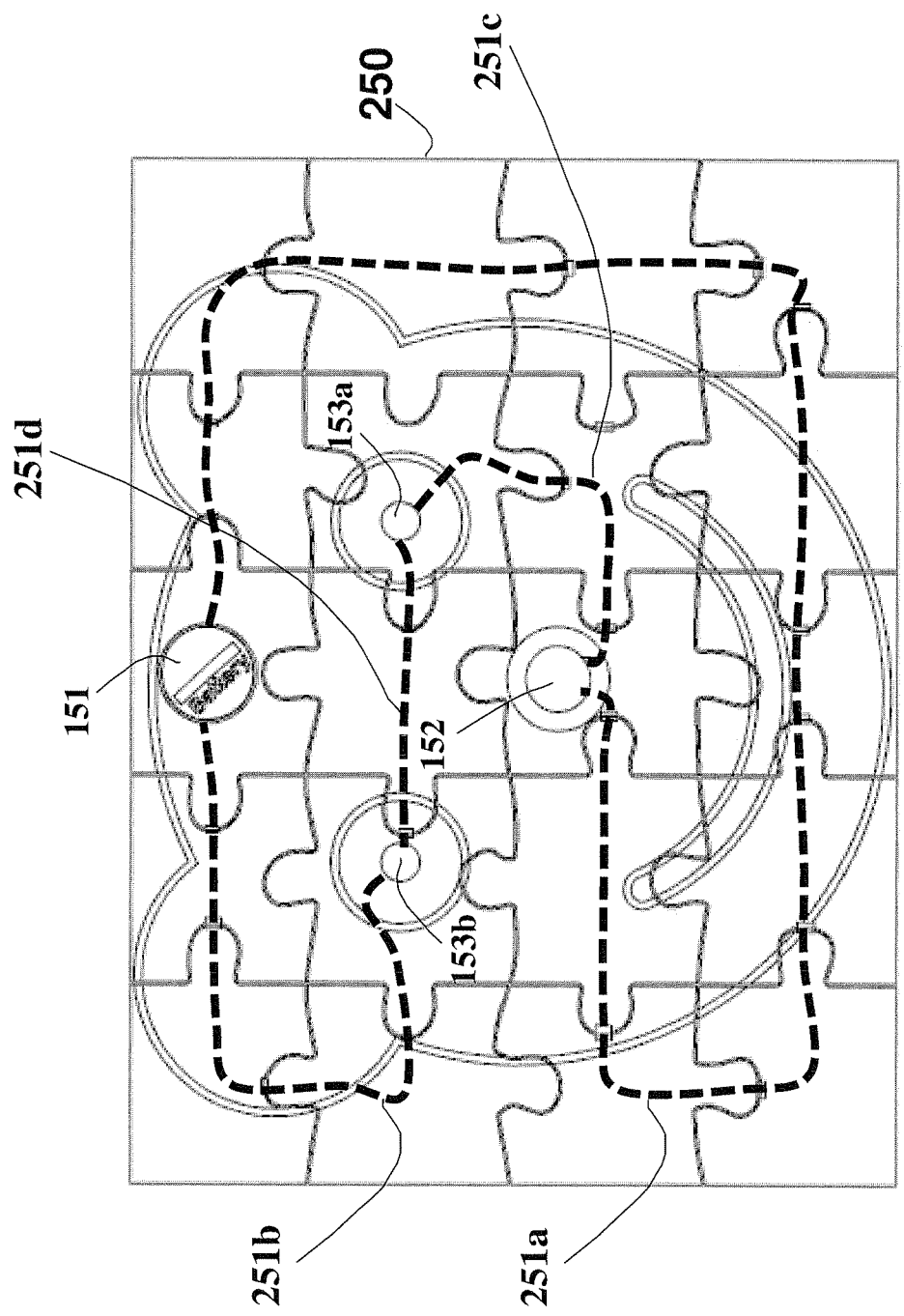
FIG. 25c depicts the electricity conductive paths of an assembled puzzle with no frame according to an aspect of the invention.

While the embodiments above exampled a conductive path being formed which includes the puzzle frame, it will be appreciated that the invention equally applies to the case wherein the puzzle frame is not part of the conductive path. As such, the puzzle can be assembled and the annunciator operated without the need of a puzzle frame, or by using a conventional frame having no electric conductors and pads. A non-limiting example of an assembled puzzle 250 with no frame is shown in FIGS. 25a-c, wherein the electrical circuit is formed (and the annunciator may be activated) without the need for any additional external components or for a puzzle frame. FIG. 25a shows a perspective front view and FIG. 25b shows a front view of the assembled puzzle 250. The assembled puzzle 250 includes a pushbutton 152 mounted and as part of a puzzle piece, and located corresponding to the teddy-bear nose in the puzzle image. A coin type battery 151 is shown mounted and part of another puzzle piece. Two LEDs 153a and 153b, serving as the annunciator in this embodiment, are shown mounted and as part of the respective associated puzzle pieces. The LEDs 153a and 153b are located corresponding to the teddy-bear eyes in the puzzle image. The assembled puzzle 250 conductive paths are illustrated in FIG. 25c. Four distinct conductive paths are shown, each using respective puzzle pieces conductive pads and connecting conductors as described above. The conductive path 251a connects one battery 151 pole (e.g., 'plus' side) to the pushbutton switch 152, the conductive path 251c connects the pushbutton switch 152 to the LED 153a, the conductive path 251d connects the LED 153a to LED 153b, and the conductive path 251b connects the LED 153b to the battery 151 other pole (e.g., 'negative' side). Thus, upon completing the assembly of the puzzle 250, the electrical circuit is completed, and pressing the pushbutton 152 will cause current flow from the battery 151 via the LEDs 153*a* and 153*b*, activating their illumination capability.

Figure 26:
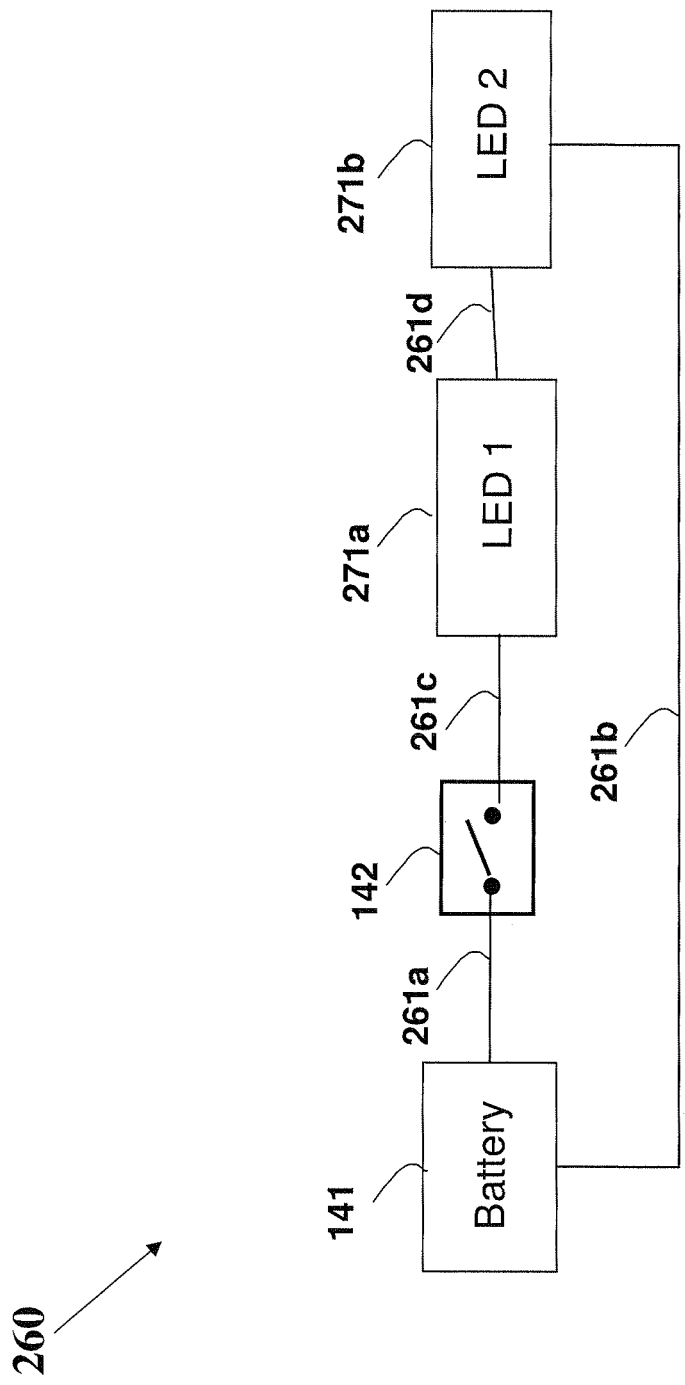
FIG. 26 illustrates the electrical schematic diagram of an assembled puzzle with no frame according to an aspect of the invention.

The respective schematic electrical circuit 260 of the assembled puzzle 150 is shown in FIG. 26. The battery 141 (corresponding to the coin battery 151 in FIGS. 25*a-c*) is connected via connection 261*a* (corresponding conductive path 251*a* in FIG. 25*c*) to switch 142 (corresponding to the pushbutton switch 152 in FIG. 25*c*), which is connected to LED 1 271*a* (corresponding to LED 153*a* in FIGS. 25*a-c*) via connection 261*c* (corresponding conductive path 251*c* in FIG. 25*c*). LED 1 271*a* is connected to LED 2 271*b* (corresponding to LED 153*b* in FIGS. 25*a-c*) via connection 261*d* (corresponding conductive path 251*d* in FIG. 25*c*). The circuit is closed by LED 2 271*b* connected to the battery 141 via connection 261*b* (corresponding conductive path 251*b* in FIG. 25*c*).

Figure 27A:
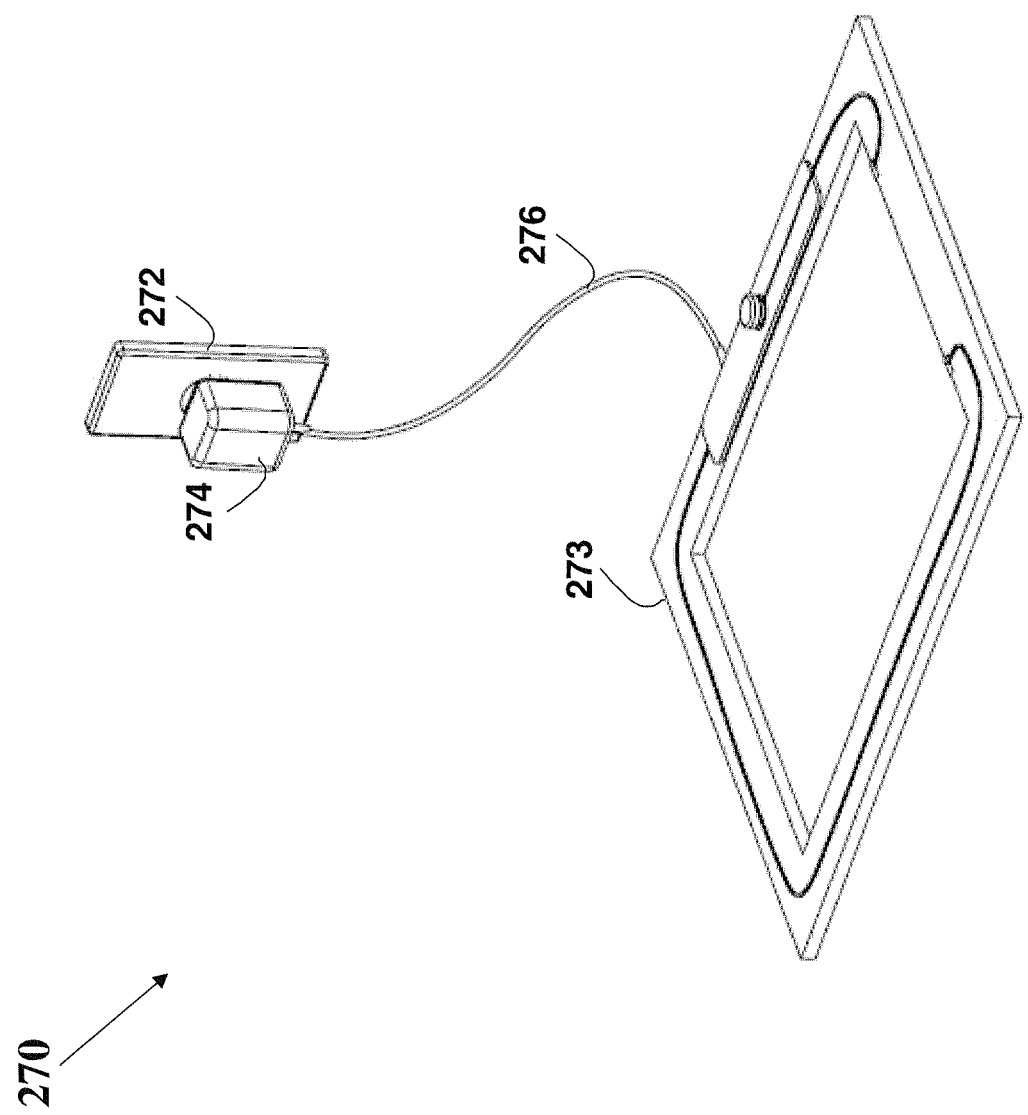
FIG. 27a depicts a perspective view of a puzzle frame connected to AC power according to an aspect of the invention.
Figure 27B:
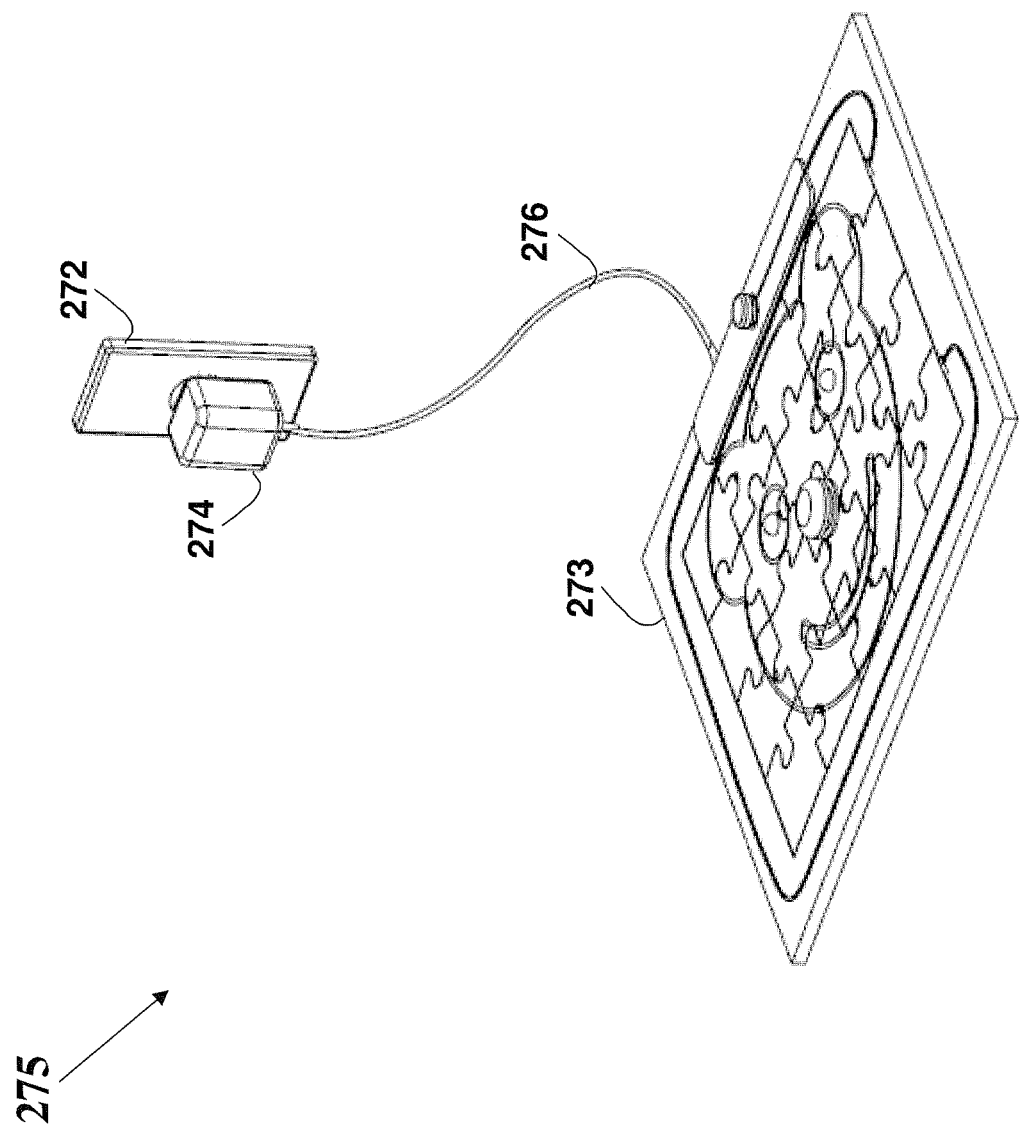
FIG. 27b depicts a perspective view of a populated puzzle frame connected to AC power according to an aspect of the invention.

FIGS. 15*a-b* above exampled the case wherein all the electrical elements (other than the puzzle pieces formed conductive path) such as the battery 151, the switch 152 and the annunciator (LED 153) are mounted on and are part of the puzzle frame 150. FIGS. 25*a-b* above exampled the case wherein all the electrical elements such as the battery 151, the switch 152 and the annunciators (LEDs 153*a* and 153*b*) are mounted on and are part of only the puzzle pieces, thus a puzzle frame is not required to be part of the system. In other embodiments, part of the electrical elements is mounted as part of the puzzle frame and other electrical elements are mounted as part of the puzzle pieces. Further, one or more electrical functions may be duplicated to have similar or identical electrical element on both the puzzle frame and as part of the puzzle pieces. For one non-limiting example, the battery 151 may be mounted on the puzzle frame as shown in FIG. 15*a*, while the switch 152 and the annunciator (e.g., LED 153*a*) are part of puzzle pieces as shown in FIG. 25*a*. Similarly, each of the switch 152 and an annunciator such as LED 153 may be located independently either on the puzzle frame or on a puzzle piece. A non-limiting example is shown in view 275 in FIG. 27*b* below, wherein the assembled puzzle 250 is shown to be power supplied not by the battery 151, but rather by an AC power via AC/DC adapter 274. Further, added to the switch 152 on the assembled puzzle 250, an additional switch is shown as part of the puzzle frame 273 in a manner described above.

The battery 141 may be a primary or a rechargeable (secondary) type, may include a single or few batteries, and may use various chemicals for the electro-chemical cells, such as lithium, alkaline and nickel-cadmium. Common batteries are manufactured in defined output voltages (1.5, 3, 4.5, 9 Volts, for example), as well as defined standard mechanical enclosures (usually defined by letters "A", "AA", "B", "C" sizes etc. and 'coin' type). In one embodiment the battery 141 (or batteries) is held in a battery holder, and thus can be easily replaced.

As an alternative or as addition to using battery as a power source, the system can be power fed from the AC power supply, and thus may include an AC/DC converter, for converting the AC power (commonly 115 VAC/60 Hz in North America and 220 VAC/50 Hz in Europe) into the required DC voltage or voltages. AC powering is exampled in a non-limiting way in perspective view 270 in FIG. 27*a* and perspective view 275 in FIG. 27*b*. Frame 273 is shown to be connected via cable 276 to a small AC/DC adapter 274 plugged to AC outlet 272. Such small outlet plug-in step-down transformer shape can be used (also known as wall-wart, "power brick", "plug pack", "plug-in adapter", "adapter block", "domestic mains adapter", "power adapter", or AC adapter) as known in the art and typically involves converting 120 or 240 volt AC supplied by a power utility company to a well-regulated lower voltage DC for electronic devices. Adapter 274 commonly includes a step down transformer for reducing to non-hazardous potential such as 12V or 9V, connected to a DC rectifier to supply a DC voltage (such as 12 VDC or 9 VDC). View 275 in FIG. 27*b* examples the frame 273 housing an assembled puzzle (similar to assembled puzzle 250 above).

Switch 142 may be simple on/off (single pole, single throw) switch for breaking or making the electrical connection, thus allowing the activating of the annunciator only in the 'on' state. The switch 142 may be a slide or pushbutton switch, the latter requiring a person to press it for its activation. In one embodiment, the switch 142 is obviated, thus allowing the annunciator to be activated only upon forming the required electrical conductive path by the puzzle pieces.

Figure 28:
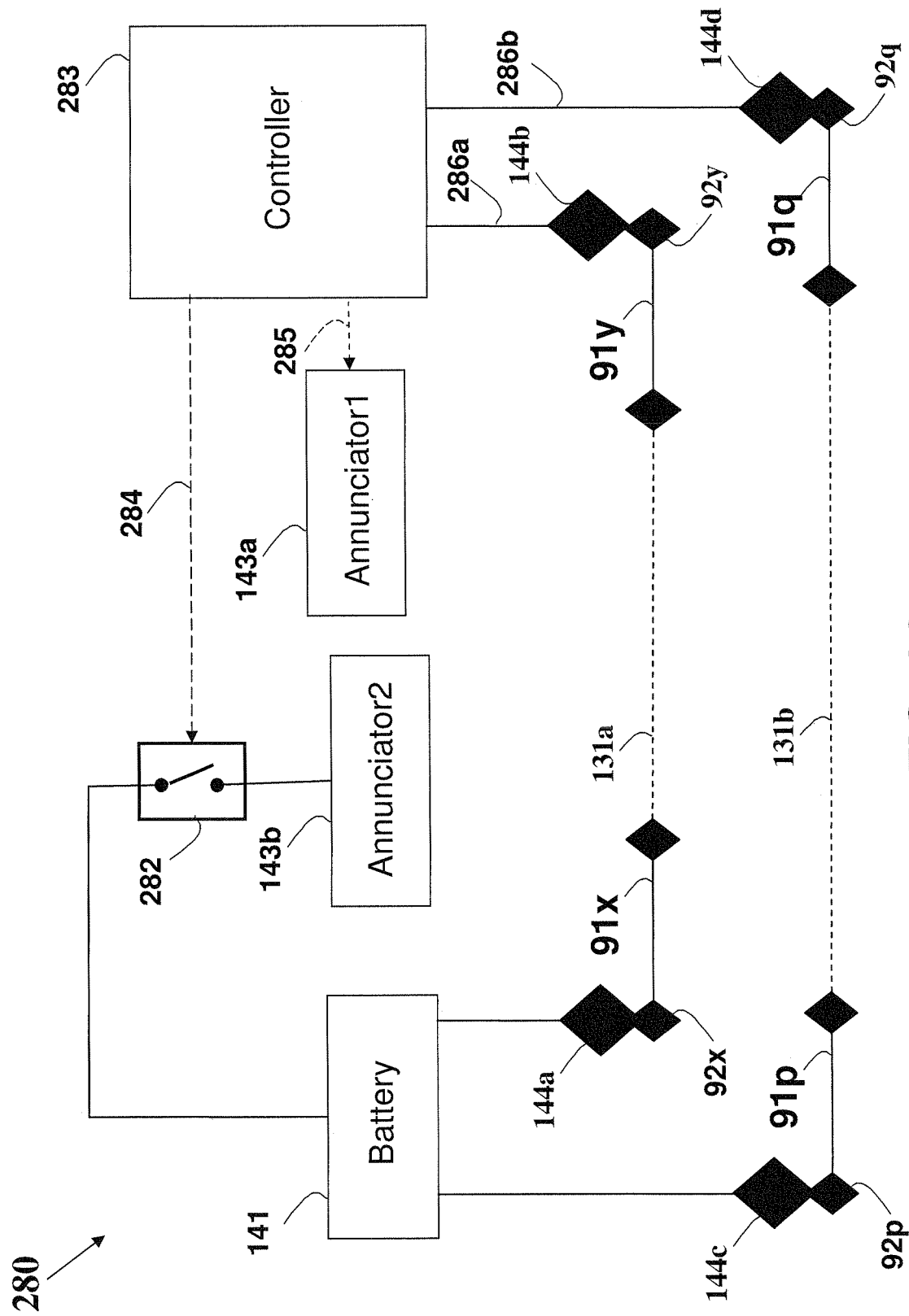
FIG. 28 illustrates the electrical schematic diagram of a puzzle with a controller according to an aspect of the invention.

In order to allow for improved logic functionality and for better handling multiple annunciators and various sensors, a controlling functionality may be added. A non-limiting example of a controller 283 for controlling and managing the various sensors and annunciators is shown in electrical schematic diagram 280 in FIG. 28. The controller 283 is powered preferably from the power source (e.g., battery 141). The controller 283 senses the status of the conductive paths via connections 286*a* and 286*b*, respectively coupled to paths 131*a* and 131*b* of the assembled puzzle. In the case of a completed conductive path (e.g., from the battery via pads 144*a* and 92*x*, path 131*a*, and pads 92*y* and 144*b*), a voltage is sensed in the respective controller input (e.g., via connection 286). The controller 283 is further controlling and managing the various annunciators coupled to it. Annunciator2 143*b* is shown to be powered via controlled switch 282, coupled to be connected by the controller 283 via control port 284. Controlled switch 282 may be a mechanical relay or a solid-state relay, an optocoupler or any other controlled switches known in the art. The controller 283 uses control port 284 for selectively energizing and de-energizing the annunciator2 143*b* via the switch 282. For a non-limiting example, in the case wherein the annunciator2 143*b* is a LED (or any other illuminating device), the controller 283 may turn the light on or off via the control port 284. Similarly, a flashing light can be obtained by periodically providing the power to the LED by the controller 283. Similarly, in the case wherein annunciator2 143*b* is a buzzer, the continuity, duty-cycle and time of operation can be controlled by the controller 283. In some cases controlling a device is not made via switching its power but rather by a control port, preferably digital, provided by the device. Controller 283 is shown in schematic diagram 280 to control such an annunciator1 143*a* via a control connection 285.

The controller 283 circuitry (e.g., integrated circuit (IC) and related devices) may be located in the puzzle frame or as part of a puzzle piece, and may be based on discrete logic or an integrated device, such as a processor, microprocessor or microcomputer, and may include a general-purpose device or may be a special purpose processing device, such as an ASIC, PAL, PLA, PLD, Field Programmable Gate Array (FPGA), Gate Array, or other customized or programmable device. In the case of a programmable device as well as in other implementations, a memory is required. The controller 283 commonly includes a memory that may include a static RAM (Random Access Memory), dynamic RAM, flash memory, ROM (Read Only Memory), or any other data storage medium. The memory may include data, programs, and/or instructions and any other software or firmware executable by the processor. The control logic can be implemented in hardware or in software, such as firmware stored in the memory. The controller 283 controls and monitors the device operation, such as initialization, configuration, interface and commands. The term "processor" is meant to include any integrated circuit or other electronic device (or collection of devices) capable of performing an operation on at least one instruction including, without limitation, reduced instruction set core (RISC) processors, CISC microprocessors, microcontroller units (MCUs), CISC-based central processing units (CPUs), and digital signal processors (DSPs). The hardware of such devices may be integrated onto a single substrate (e.g., silicon "die"), or distributed among two or more substrates. Furthermore, various functional aspects of the processor may be implemented solely as software or firmware associated with the processor.

Figure 12A:
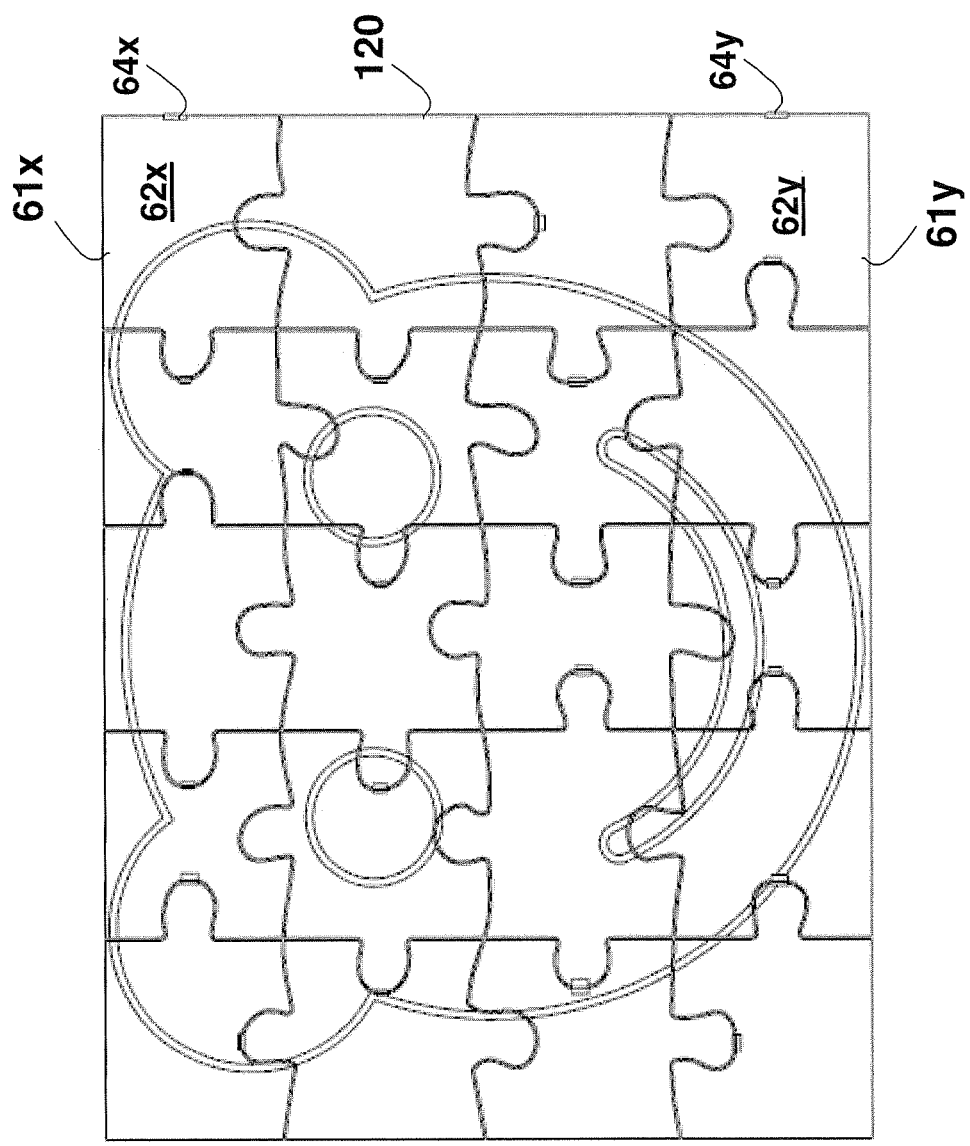
FIG. 12a depicts a front view of a fully assembled puzzle pieces according to an aspect of the invention.
Figure 12B:
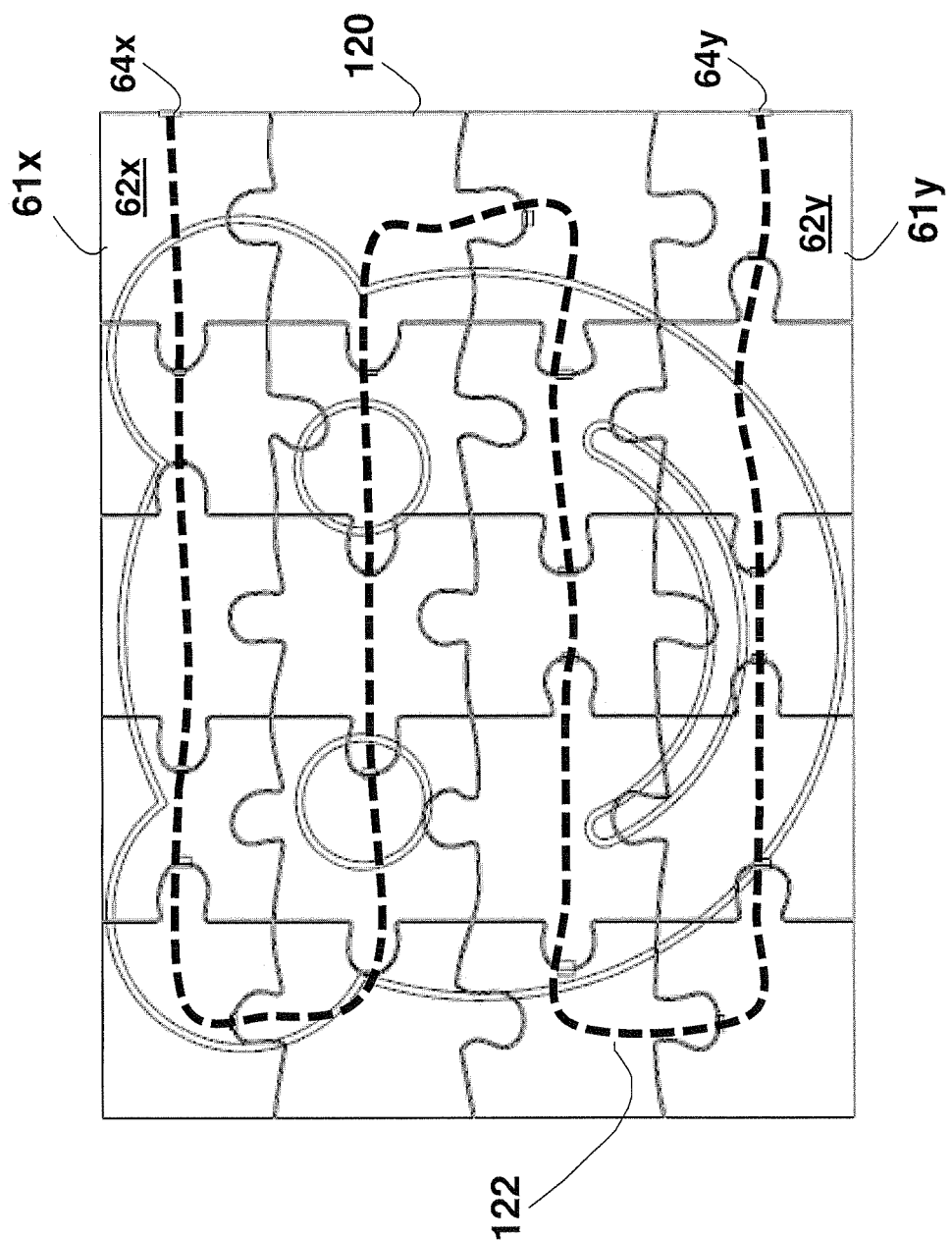
FIG. 12b depicts the electricity conductive path of a fully assembled puzzle pieces according to an aspect of the invention.

In one embodiment, a semiconductor light source such as a Light-Emitting-Diode (LED) is used, having small form factor and high efficiency. However, any type of visible electric light emitter such as a flashlight, a liquid crystal display, an incandescent lamp and compact fluorescent lamps can be used. While FIG. 12 shows two such light sources 123a and 123b, it is apparent that a single one can be used, as well as three or more such light sources.

In one embodiment the annunciator 143 is a visual signaling device. In one non-limiting example, the device illuminates a visible light, such as a Light-Emitting-Diode (LED). However, any type of visible electric light emitter such as a flashlight, an incandescent lamp and compact fluorescent lamps can be used. Multiple light emitters may be used, and the illumination may be steady, blinking or flashing. Further, the illumination can be directed for lighting a surface, such as a surface including an image or a picture. Further, a single single-state visual indicator may be used to provide multiple indications, for example by using different colors (of the same visual indicator), different intensity levels, variable duty-cycle and so forth.

In one embodiment, the light is used for illumination of all or part of the assembled puzzle revealed image or picture or part of the puzzle frame. Examples of illuminated games are disclosed in U.S. Patent Application 2008/0083149 to Zebersky entitled: "Jigsaw Puzzle Display Frame" and in U.S. Pat. No. 4,323,243 to Hanson et al. entitled: "Electrical Board Game Device", which are all incorporated in their entirety for all purposes as if fully set forth herein.

The visual signaling may be associated with the puzzle picture theme or shape. Such conceptual relationship may include, as a non-limiting example, the brightness of the light emitters, appearance, location, type, color and steadiness that are influenced by the puzzle theme, providing a surprising and illustrative result. For a non-limiting example, the puzzle picture (or shape) may include an illuminating sky body such as the sun, the moon or a star. In the case of a sun, a bright yellow light emitter is located at the sun center (or in a location illuminated the sun portion in the picture), mimicking the sun yellow and bright light. Similarly, a white lighting device can be placed at the moon location in the picture, and blinking soft white light will be used at the star location. In another example, the puzzle picture (or shape) includes a fire or a burning, such as candles on a birthday cake, wherein a yellow light emitter may be used to illustrate the fire of the candles. In another non-limiting example, the puzzle picture (or shape) includes stationary man-made light sources, such as a lighthouse and a street-lamp, wherein the illumination device will be placed in the light source in the image. Further, the puzzle picture (or shape) may include a picture of mobile man-made light source such as the front flashlight in a locomotive, the lamps of a vehicle and the emergency lights of an emergency vehicle such as a police car, an ambulance or a fire-engine truck. A light emitter, preferably mimicking the same color as in reality, will be placed at the lighting places in the puzzle picture. Emergency lights will be preferably blinking mimicking the real life blinking of such lights. In yet another non-limiting example, the puzzle picture (or shape) includes the image of a face, either of a real or animated animal (e.g., teddy bear), or of a human being (real or animated). In this case, blinking light emitters can be placed in the location of the face eyes, providing the feeling of the figure being 'winking'.

In one embodiment, the annunciator 143 is an audible signaling device, emitting audible sounds that can be heard (having frequency components in the 20-20,000 Hz band). In one non-limiting example, the device is a buzzer (or beeper), a chime, a whistler or a ringer. Buzzers are known in the art and are either electromechanical or ceramic-based piezoelectric sounders which make a high-pitch noise. The sounder may emit a single or multiple tones, and can be in continuous or intermittent operation. In another non-limiting example, the sounder simulates the voice of a human being or generates music, typically by using electronic circuit having a memory for storing the sounds (e.g., music, song, voice message, etc.), a digital to analog converter to reconstruct the electrical representation of the sound and an audio amplifier for driving a loudspeaker, which is an electroacoustical transducer that converts an electrical signal to sound. An example of a greeting card providing music and mechanical movement is disclosed in U.S. Patent Application 2007/0256337 to Segan entitled: "User Interactive Greeting Card", which is incorporated in its entirety for all purposes as if fully set forth herein.

The audible signaling may be associated with the puzzle picture theme or shape. For a non-limiting example, the sounder appearance, as well as the sound volume, type and steadiness may be influenced by the puzzle theme, providing a surprising and illustrative result. For example, the puzzle picture (or shape) may include household appliance associated with a specific sound such as the ringing of a telephone set, the buzzer of the entrance bell or the bell sound or a microwave oven. Other non-limiting examples are a horn of an automobile, the rattling 'chik-chuk' sound of a train and a siren of an emergency vehicle such as a police car, an ambulance or a fire-engine truck. In such a case, the sounder will preferably generate a sound which simulates or is similar to the real sound associated with the puzzle picture theme, e.g., a telephone ringing for a telephone set and a siren sound for a police car. In another non-limiting example, the puzzle picture (or shape) include an animal, and the sounder produces the characteristic sound of the animal, such as barking for a dog, yowling for a cat and twittering of a bird.

In one non-limiting example, the sound generated is music or song. The elements of the music such as pitch (which governs melody and harmony), rhythm (and its associated concepts tempo, meter, and articulation), dynamics, and the sonic qualities of timbre and texture, may be associated with the puzzle picture or shape theme. For a non-limiting example, if a musical instrument shown in the picture, the music generated by that instrument will be played, e.g., drumming sound of drums and playing of a flute or guitar.

In one non-limiting example, a song or a melody of a song are played by the annunciator. Preferably, the song (or its melody) is associated with the puzzle shape or picture theme. For example, the puzzle theme can be related to the calendar such as season or a holiday. For example, a theme of winter season showing rain or snow will be associated with a song about rain (such as "rain, rain") or about snowing, while spring-related theme may play the 'Spring Song'. Similarly, a theme of Christmas may be associated with Christmas-related songs such as 'Santa Claus is Coming to Town' or 'Jingle Bells'. In another non-limiting example, the theme includes an animal, and the song played is corresponding to the specific animal, such as the song 'Mary had a Little Lamb' for a theme showing a lamb, the song 'Swan Lake' for a swan or 'B-I-N-G-O' for a dog theme. In the case the theme relates to a specific location or a specific geography location or region (such as a continent, island, river, region, famous places, country, city, etc.), a corresponding song may be played. For example, if the puzzle shows a map of a country (e.g., United States) or the puzzle is shaped as the map of a country or a continent, a popular song related to the country or its national anthem (e.g., "The Star-Spangled Banner" for the U.S.) may be played, thus helping in improving children learning about the world and geography. Some examples of geography-related puzzles are disclosed in U.S. Pat. No. 6,425,581 to Barrett entitled: "Map Puzzle Game" and U.S. Patent Application 2008/0224396 to Cocis et al. entitled: "Jigsaw Educational Game", which are all incorporated in their entirety for all purposes as if fully set forth herein.

Other famous places may include the song 'London Bridge' for a theme of London or a bridge. In the case the theme relates to a specific activity (e.g., birthday party), the song or melody may correspond to the occasion (e.g., 'Happy Birthday' song) Similarly, a theme relating to household appliance (e.g., a telephone set) will be associated with a relevant related song (e.g., 'Mr. Telephone Man'). In the case the image (or shape) relates to a television or cinema character (e.g. 'Sponge Bob' and 'Spiderman'), the song may be associated with the respective movie or television show opening melody or song. The same goes for transportation, space and other common children or adult themes.

In one non-limiting example according to the invention, a human voice talking is played by the annunciator. The sound may be a syllable, a word, a phrase, a sentence, a short story or a long story, and can based on speech synthesis or pre-recorded. Male or female voice can be used, being young or old. The text sounded is preferably associated with the puzzle shape or picture theme. For example, a name of the theme of the puzzle can be heard, such as 'dog', 'truck' and 'mountain'. Further, the story heard may be related to the theme, or can describe the items shown in the image. In another example, general encouraging, thanking or praising phrases can be made such as 'good work', 'excellent' and 'congratulations'. Further, a greeting such as Happy Christmas can be played for a Christmas-related theme.

A voice, melody or song sounder typically comprises a memory storing a digital representation of the pre-recorder or synthesized voice or music, a digital to analog (D/A) converter for creating an analog signal, a speaker and a driver for feeding the speaker. An annunciator which includes a sounder may be based on Holtek HT3834 CMOS VLSI Integrated Circuit (IC) named '36 Melody Music Generator' available from Holtek Semiconductor Inc., headquartered in Hsinchu, Taiwan, and described with application circuits in a data sheet Rev. 1.00 dated Nov. 2, 2006, which is incorporated in their entirety for all purposes as if fully set forth herein. Similarly, the sounder may be based on EPSON 7910 series 'Multi-Melody IC' available from Seiko-Epson Corporation, Electronic Devices Marketing Division located in Tokyo, Japan, and described with application circuits in a data sheet PF226-04 dated 1998, which is incorporated in their entirety for all purposes as if fully set forth herein. A human voice synthesizer may be based on Magnevation SpeakJet chip available from Magnevation LLC and described in 'Natural Speech & Complex Sound Synthesizer' described in User's Manual Revision 1.0 Jul. 27, 2004, which is incorporated in their entirety for all purposes as if fully set forth herein. Alternatively, the annunciator can be based on UM3481 available from Bowin Electronic Company of Fo-Tan, NT, Hong-Kong, described in the data-sheet 'UM3481 Series-UM3481A A Multi-Instrument Melody Generator' REV.6-03 which is incorporated in its entirety for all purposes as if fully set forth herein.

Some examples of prior-art toys that include generation of an audio signal are disclosed in U.S. Pat. No. 4,496,149 to Schwartzberg entitled: "Game Apparatus Utilizing Controllable Audio Signals" and in U.S. Pat. No. 4,796,891 to Milner entitled: "Musical Puzzle Using Sliding Tiles", and toys with means for synthesizing human voice are disclosed in U.S. Pat. No. 6,527,611 to Cummings entitled: "Place and Find Toy", and in U.S. Pat. No. 4,840,602 to Rose entitled: "Talking Doll Responsive to External Signal", which are all incorporated in their entirety for all purposes as if fully set forth herein.

In one non-limiting example according to the invention, the annunciator is a smoke generation unit, mimicking the generation of a real life smoking such as a smoke of a real train. Preferably, such implementation may relate to a puzzle theme of a train having a smoking locomotive or a fire. Some examples of smoke generation units are disclosed in U.S. Pat. No. 6,280,278 to Wells entitled: "Smoke Generation System for Model Top Applications" and U.S. Pat. No. 7,297,045 to Pierson et al. entitled: "Smart Smoke Unit", which are all incorporated in their entirety for all purposes as if fully set forth herein.

In the case wherein multiple annunciators are used, such as exampled in FIG. 24 above, each of the annunciators may be according to the above implementations. Further, the annunciators may be identical or distinct from each other. In one non-limiting example, the annunciators are of the same type, such as being visual or audible indication type. Alternatively, the annunciators are of the different type, such as one being visual type and the other being audible indication types.

While the invention has been exampled above with regard to a conductive path made by assembly of puzzle or toy pieces carrying a DC voltage or current from a DC source to an annunciator, the invention equally applies to the case of carrying other electrical signals in either direction, such as AC power or analog or digital signals.

While the invention has been exampled above with regard to a rectangular shaped puzzle (and frame), it will be appreciated that the invention equally applies to any shape of the completed puzzle and any shape of a puzzle frame. For a non-limiting example, heart, circular, elliptical or square shapes may be used. Further, any other shapes may be used, including shapes associated with the puzzle picture theme, including jigsaw puzzles wherein solving the puzzle relates to assembling a pre-defined shape rather than a picture. Other puzzles may use both picture and shape as the puzzle theme. For a non-limiting example, the assembled puzzle shape relating to a country or a continent may be based on the map of that geographical location or region, as exampled in U.S. Patent Application 2008/0224396 to Cocis et al. entitled: "Jigsaw Educational Game" and U.S. Pat. No.

6,425,581 to Barrett entitled: "Map Puzzle Game", which are all incorporated in their entirety for all purposes as if fully set forth herein.

While the embodiments above exampled an annunciator providing visual or audible signaling, it will be appreciated that the invention equally applies to annunciator adapted to perform other functions, such as physical movement or other motive functions (e.g. pop-up figure). For example, the annunciator may include motors, winches, fans, reciprocating elements, extending or retracting, and energy conversion elements. In addition, heaters or coolers may be used. Each of the actuator or movement appearance, location, color, type, shape and functionality may be conceptually related to the puzzle theme (image or shape). Further, the annunciator may include an indicator for indicating free-form, shape, form, amorphous, abstract, conceptual, representational, organic, biomorphic, partially geometric, conventional, unconventional, multi-sided, natural, figurative, recognizable concept, geometric, amorphous, abstract, organic, virtual, irregular, regular, biomorphic, conventional, unconventional, symmetric, asymmetric, man-made, composite, geometric, letter, number, code, and symbol. Furthermore, the indicator may be indicating associated information such as indicia, indicator, theme indicator, turn indicator, timing indicator, game piece indicator, emission indicator, emission device, playing area indicator, scoring indicator, and procedure indicator. The manner of play may be for diversified ages; diversified abilities; diversified approaches; specified age; specified ability; specified approach; creative; artistic; music-oriented; puzzle; recreational; educational; therapeutic; stage-oriented; level-oriented; family-oriented; age-appropriate; selective; thematic; turn indicated; timing indicated; scoring indicated; hierarchical; sequential; matching; choice; according to players, direction, playing order, number of players, teams; procedure indicated; having emission; introductory; junior, standard; intermediate; advanced; professional; numerical; alphabetical; identifying, positioning; pre-determined; improvisational; exchangeable; sharing; rotating, variable; same, different, switch, story, and customize-able. Further, the system may include (as part of a puzzle piece or as part of the puzzle frame) sensors that will be part of the formed electrical circuit, such as photocells, voltage or current detectors, pressure detectors or motion detector and manually, magnetic or automatically operated switches. Each of the sensor appearance, location, color, type, shape and functionality may be conceptually related to the puzzle theme (image or shape). FIGS. 25*a-b* example the sensor being the mechanically actuated switch 152, having characteristics shown as associated with the image theme, as the switch 152 is shaped and located associated with the animal image nose.

Figure 29:
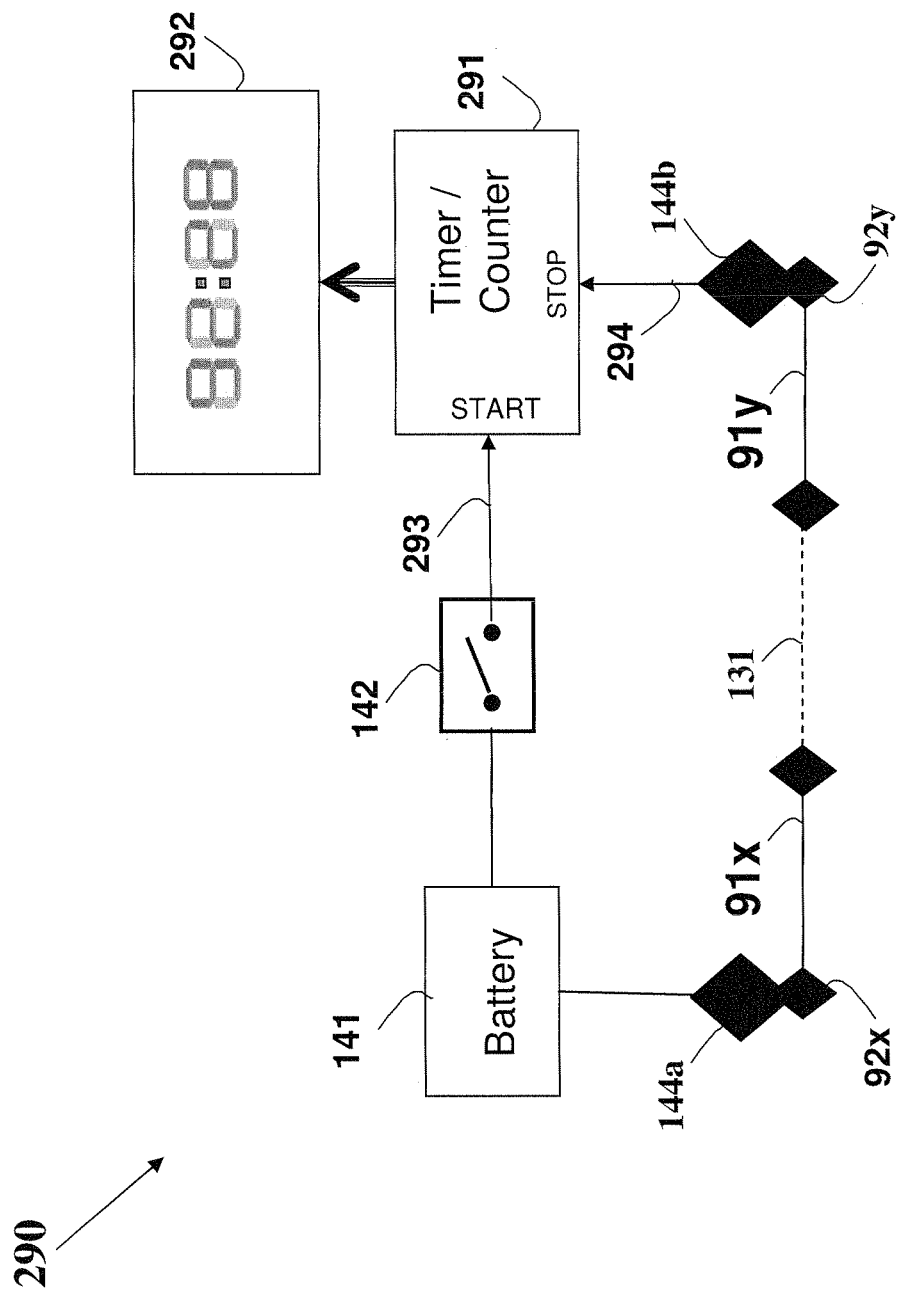
FIG. 29 illustrates the electrical schematic diagram of a puzzle with a timer and time display according to an aspect of the invention.
Figure 30:
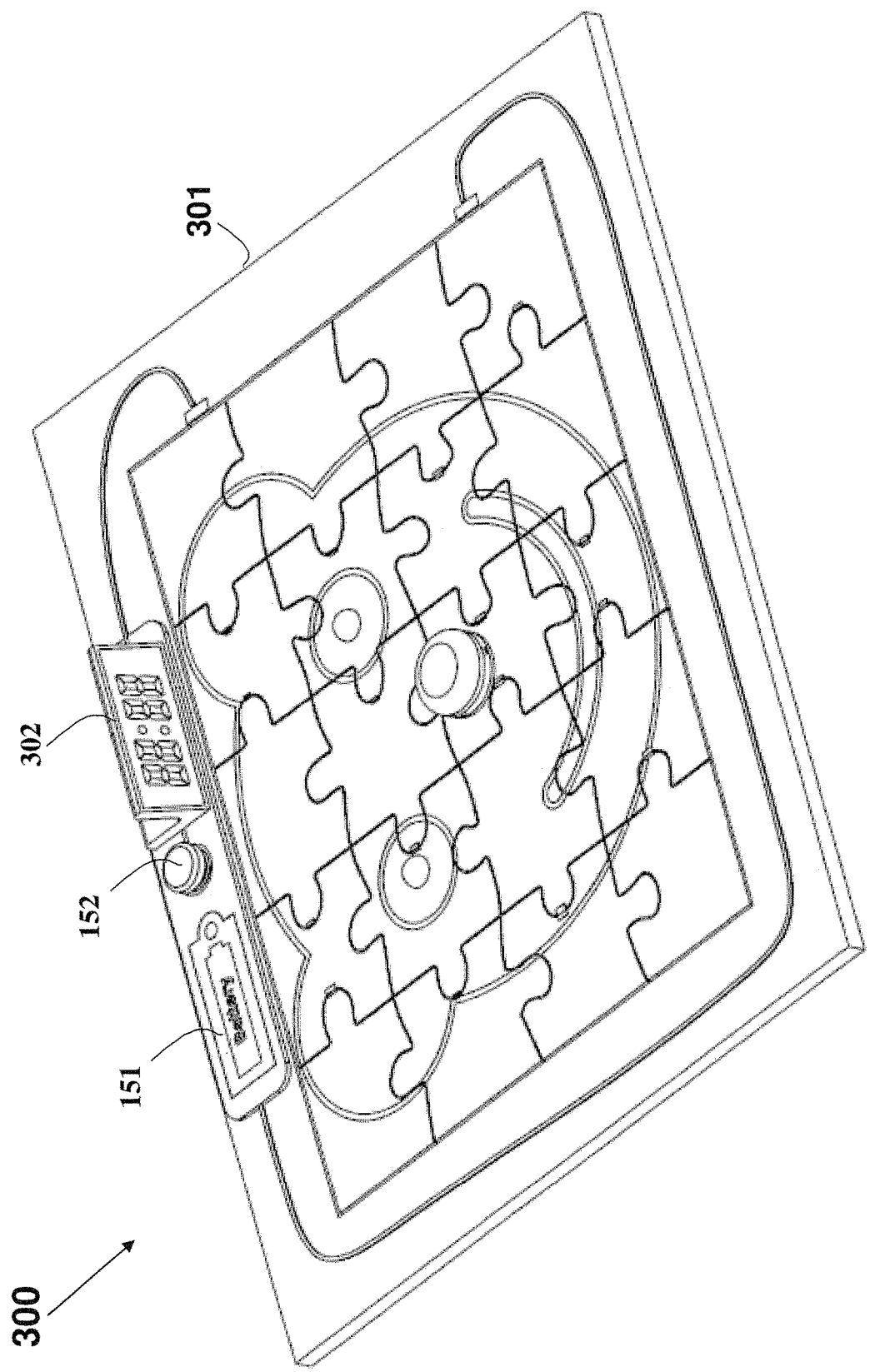
FIG. 30 depicts a perspective view of a populated puzzle frame with a timer and time display according to an aspect of the invention.

In one embodiment, the annunciator includes a time measuring and displaying means. Such timing means can be in addition to any one or more of the annunciators described above. Time measuring allows one or more players to engage in competition or contest against themselves or against other players. In one non-limiting example, the timing means are used to measure the duration of time required to assemble a puzzle. Such system allows a player to practice in order to lower its score (=the time required to assemble the puzzle), or as means for competition wherein each contestant is aiming to get a lower score. A schematic electrical diagram of a puzzle set 290 including timing interval measuring is shown in FIG. 29. An electrical (or electro-mechanical) timer 291 is used to count the elapsed time, and the measured time is shown in display 292, which can include a liquid crystal screen (similar to a common stopwatch). The measured time can be counted and displayed using numerals representative of a clock, in sub-seconds, seconds, minutes, hours and any combination thereof. Upon starting the assembly, switch 142 is activated, and via connection 293 to port 'start' reset and start the time counting by timer 291, while showing the elapsed time. Upon completing ('solving') the puzzle, the conductive path 131 provides a signal over connection 294 to the 'stop' port of the timer 291, thus signaling it to stop the time counting, and freeze the measured time on the display 292. Hence, the period required for the puzzle assembly is shown on the display 292, serving as the score for this assembly session. The time display may be digital (showing numbers) or analog (showing clock hand or hands). Alternately, a countdown timer may be used, measuring the remaining time from a preset period of time, thus providing a pre-set given duration for solving the puzzle, allowing players to complete its turn in a pre-established time period. The display is thus used for indicating a decrementing timer for counting down and for visually showing the time remaining for the player to solve the puzzle. In the case that the given period of time has lapsed and the puzzle is not yet solved, an annunciator may be operated to notify the player of failure to complete the puzzle in the defined period. For a non-limiting example, visible or audible means may be used for indicating when a player has run out of time. A pictorial view 300 shows an exemplary completed puzzle 301 with a timing measurement means. The LED 153 shown in FIGS. 15*a-b* is replaced with a timer module 302, including the functions of timer 291 and display 292. An example of a game providing time measurement is disclosed in U.S. Pat. No. 6,478,583 to Standiford et al. entitled: "Time Monitoring Portable Game System", which is incorporated in its entirety for all purposes as if fully set forth herein. Alternatively, the timing means supplied as part of the game is not electrically, or is not operated by the conductive path, such as hourglass and wind-up timer. In such a case, the audible or visual means provided to the player upon completing the puzzle will trigger manual operation by the player of the timing means provided. An electrical timer can be based on LS 1356 IC available from Bowin Electronic Company of Fo Tan, NT, Hong Kong, described in the data-sheet LSI-LS 1356 '4 Digit Time with Colon Default' Version 1.2 (24 Nov. 2003), which is incorporated in its entirety for all purposes as if fully set forth herein.

Figure 31A:
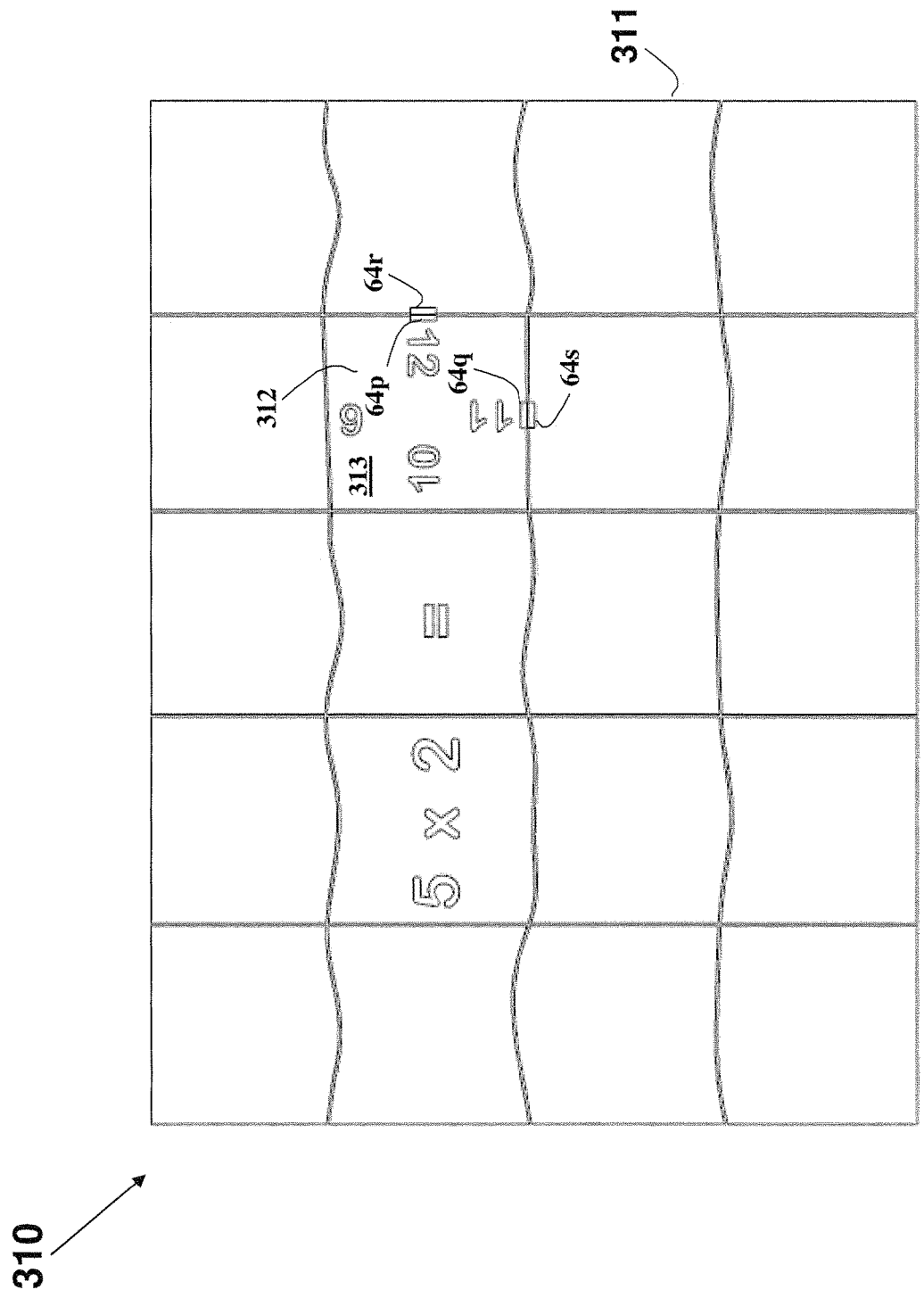
FIG. 31a depicts a front view of an assembled puzzle according to an aspect of the invention.

As described above and typically in jigsaw puzzles, there is a single way to solve the puzzle, wherein all the puzzle pieces are in a single proper position relating to each other (and relating to the puzzle frame, if appropriate). In one embodiment, one or more of the puzzle pieces can be physically assembled in a plurality of ways. In one non-limiting example, only one of the possible assembly possibilities is proper, and only upon assembling the puzzle piece in the proper way, the conductive path is formed to energize or to activate the annunciator. FIG. 31*a* shows a front view 310 of an assembled puzzle 311 including a puzzle piece 312. The puzzle piece 312 is square shaped, hence can be assembled into the puzzle 311 rotated in four different ways, and has a front face 313 having on its surface a portion of the puzzle picture. Only a single way out of the four options may be considered as a proper solution and coherent with the whole puzzle picture or theme. In the example shown in FIG. 31*a*, a mathematical problem of "5×2=" is shown. In addition to positioning the puzzle piece 312 properly to show the correct problem solution as "5×2=10", the puzzle piece 312 may be assembled to show wrong solutions such as "5×2=9", "5×2=11" and "5×2=12", and the mechanical construction allows for all four possible positions.

Figure 31B:
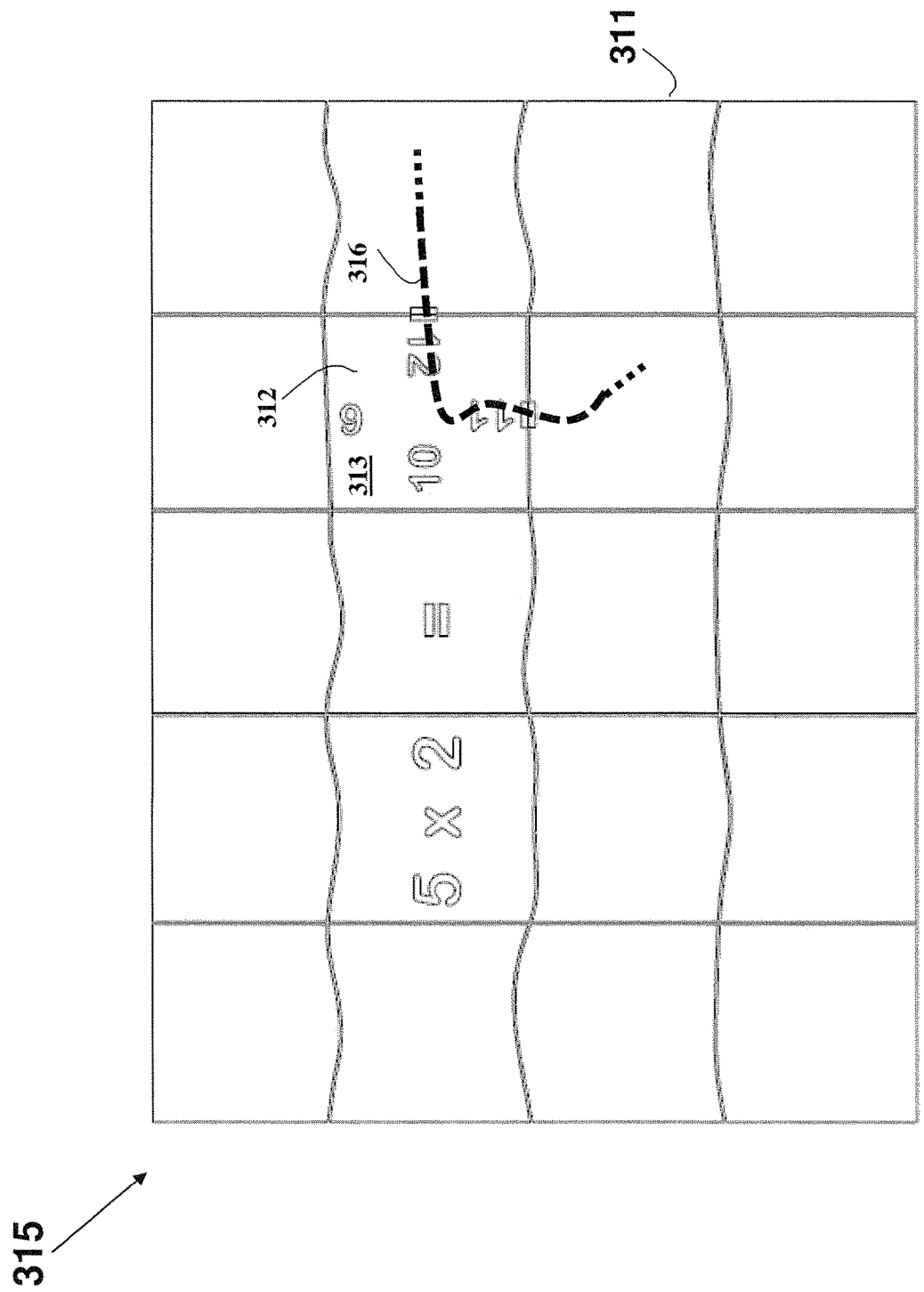
FIG. 31b depicts the electricity conductive path of an assembled puzzle according to an aspect of the invention.
Figure 32B:
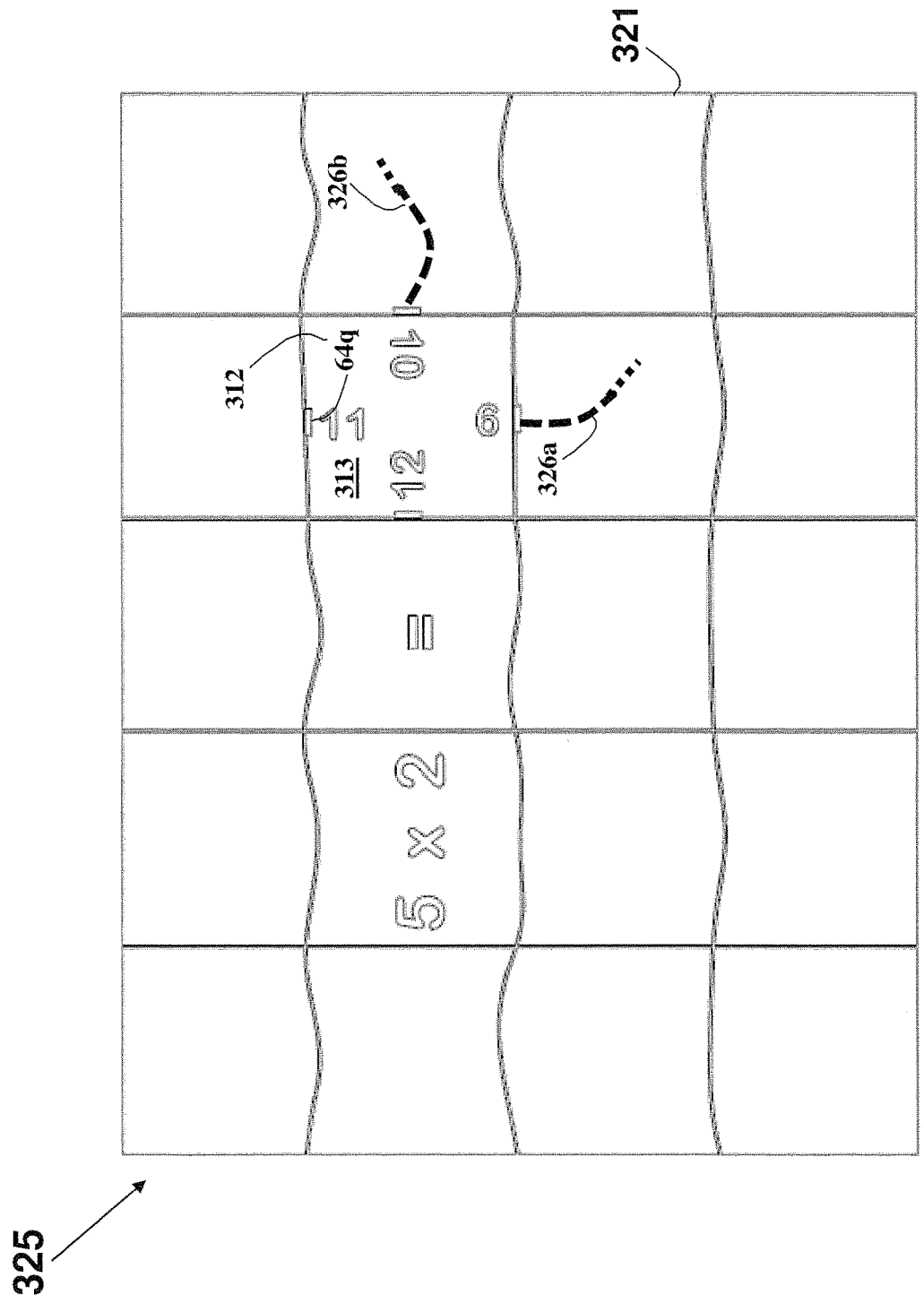
FIG. 32b depicts the electricity conductive path of an assembled puzzle according to an aspect of the invention.

As shown in FIG. 31a, the puzzle piece 312 includes two electrically connected conductive pads 64p and 64q attached thereto as described above, and positioned in two adjacent sides out of the four sides of the puzzle piece 312. The puzzle pieces surrounding puzzle piece 312 provide two mating conductive pads 64s and 64r. As shown in the FIG. 31a, only upon placing the puzzle piece 312 in the proper manner (to display the correct answer "5×2=10"), the pads 64p and 64q in the puzzle piece 312 register to mate with the respective surrounding puzzle pieces conductive pads 64r and 64s, thus forming a continuous conductive path through the puzzle piece 312. The resulting conductive path 316 through the puzzle piece 312 is shown in view 315 in FIG. 31b. FIG. 32a shows a front view 320 of the assembled puzzle 321 wherein puzzle piece 312 has been assembled improperly rotated 180 degrees to show an incorrect answer "5×2=12". In this case, the conductive pads 64p and 64q on the puzzle piece 312 sides do not mate in conductive pads 64r and 64s, and thus electrical contact is not made. Hence, the continuous conductive path cannot be made through the puzzle piece 312, as shown in view 325 in FIG. 32b, depicting two isolated and conductive paths 326a and 326b, which are not connected to form a continuous conductive path as shown in FIG. 31b. In this way, another level of complexity is added to the puzzle assembly, requiring not only a proper mechanical assembling of the puzzle pieces, but also correct positioning (e.g., proper rotating) of one, few or all of the puzzle pieces of the puzzle.

While FIG. 31a above describes a square shaped puzzle piece 312 providing four possibilities of assembly, it is apparent that any equilateral polygon may be used, such as a triangle or a pentagon. A triangle will provide three, and pentagon provides five, rotation possibilities. Similarly, non-equilateral shapes may be used such as a rectangular and an isosceles or an oblique triangle, as well as elliptical and heart shapes. Furthermore, a circle shaped puzzle piece, providing infinite positioning possibilities.

Figure 33:
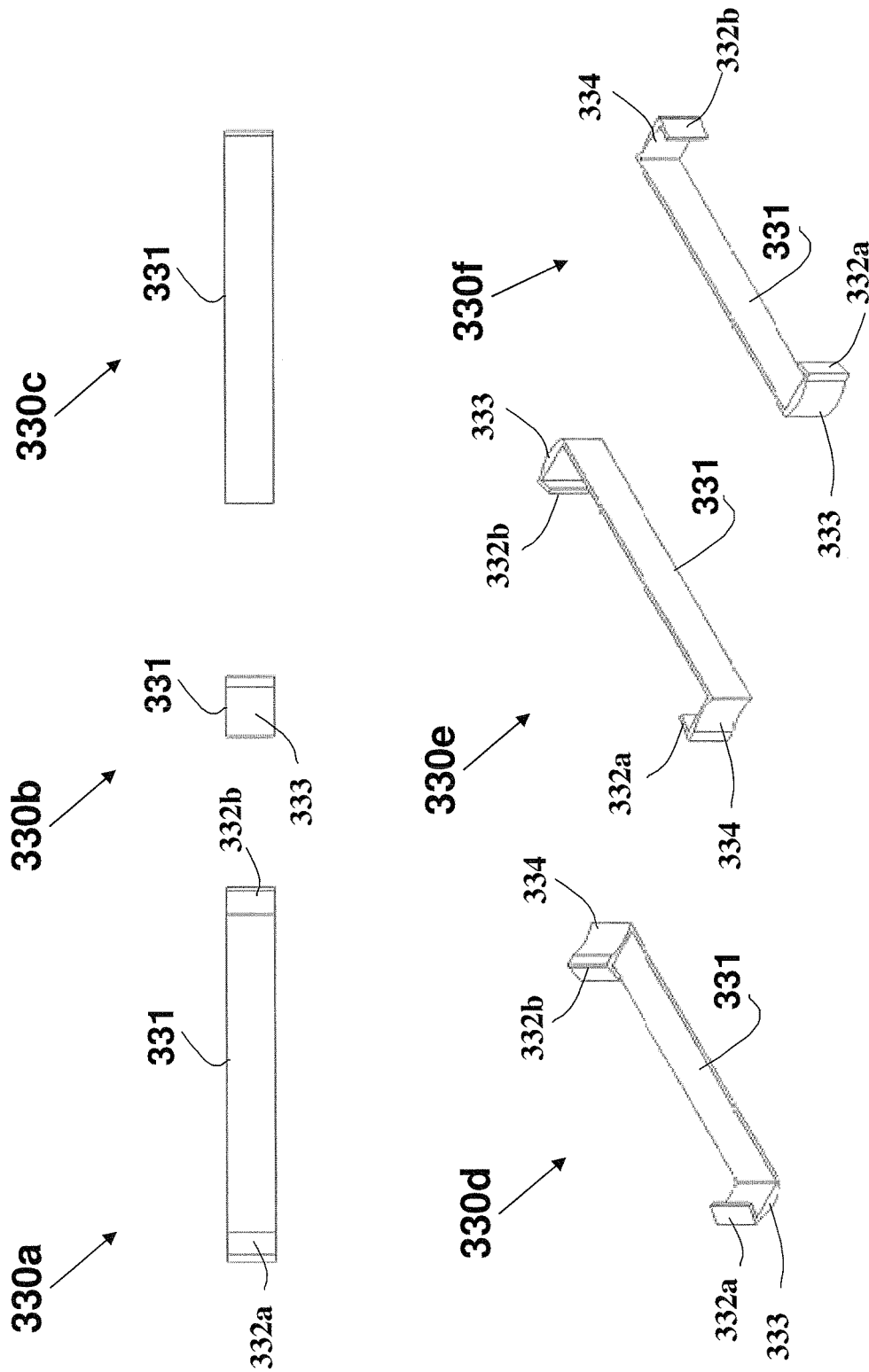
FIG. 33 depicts various views of a clip according to an aspect of the invention.

In one embodiment, a conductive clip is used as the conductive path of a puzzle piece. FIG. 33 shows various views of a clip 331. View 330a is a front view, view 330b is a side view, view 330c is a rear view, views 330d and 330f are perspective front views and view 330e is a perspective rear view of the clip 331. The clip 331 is substantially a 'U' shaped conductive strip (e.g., metallic strip), which can be flexible, rigid or semi-rigid. The bottom of the 'U' shape is an elongated strip, ended in both sides by walls 333 and 334, substantially perpendicular to the elongated basis of the 'U'. The side walls are ended with flanges 332a and 332b respectively vertically bended towards the elongated part from the sides 333 and 334, forming a type of a hook. Side wall 333 is protruding from the vertical away from the elongated part, and side wall 334 is indented from the vertical towards the elongated part in a matching way to the protrusion. Hence, two identical or similar clips 331 can be mating and providing good conductivity while their mating sides are attached.

Figure 1B:
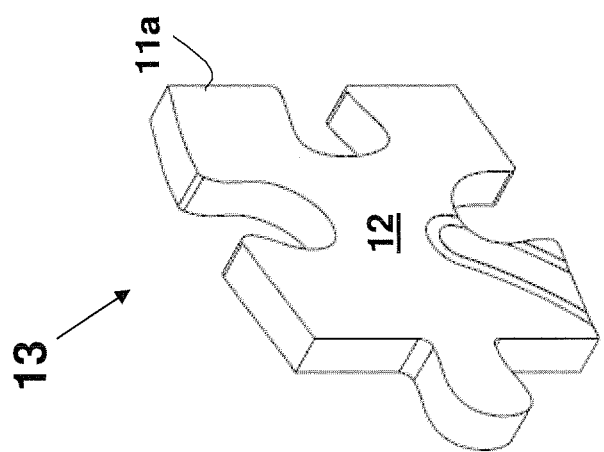
FIG. 1b depicts a perspective front view of a prior-art puzzle piece.
Figure 1A:
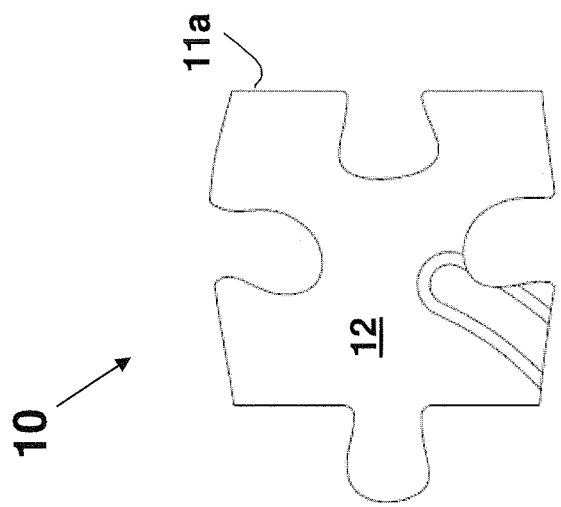
FIG. 1a depicts a front view of a prior-art puzzle piece.
Figure 2:
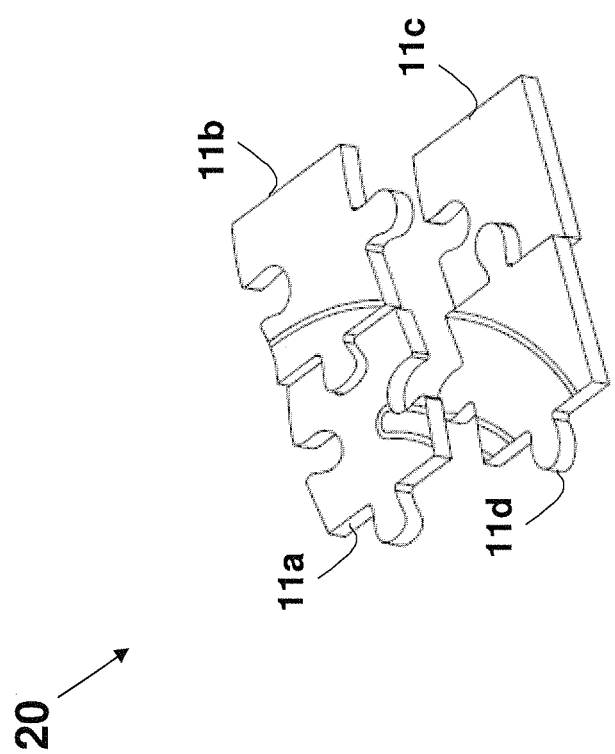
FIG. 2 depicts a perspective view of engaging few prior-art puzzle pieces.
Figure 3:
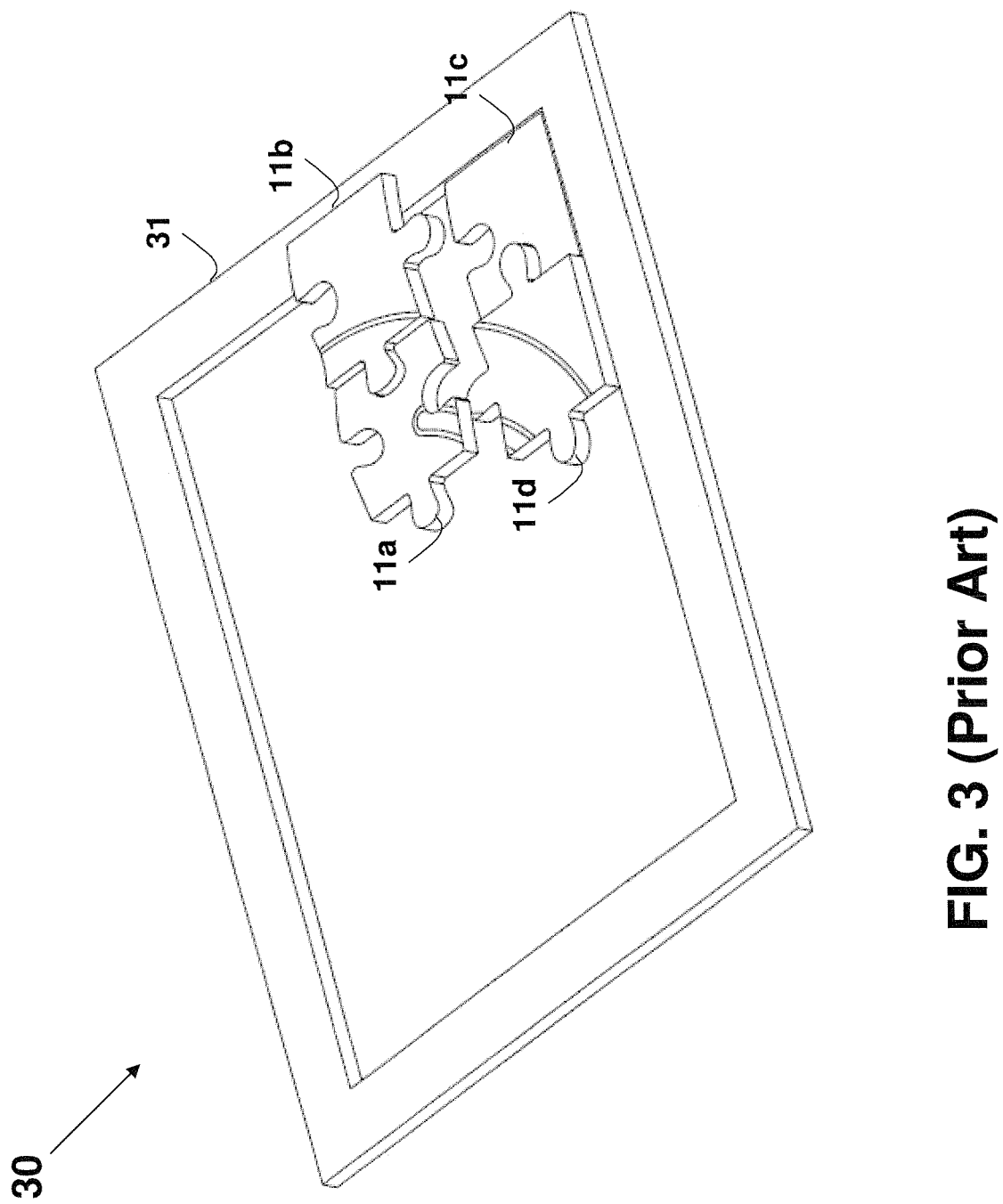
FIG. 3 depicts a perspective view of engaging few puzzle pieces on a puzzle frame.
Figure 4A:
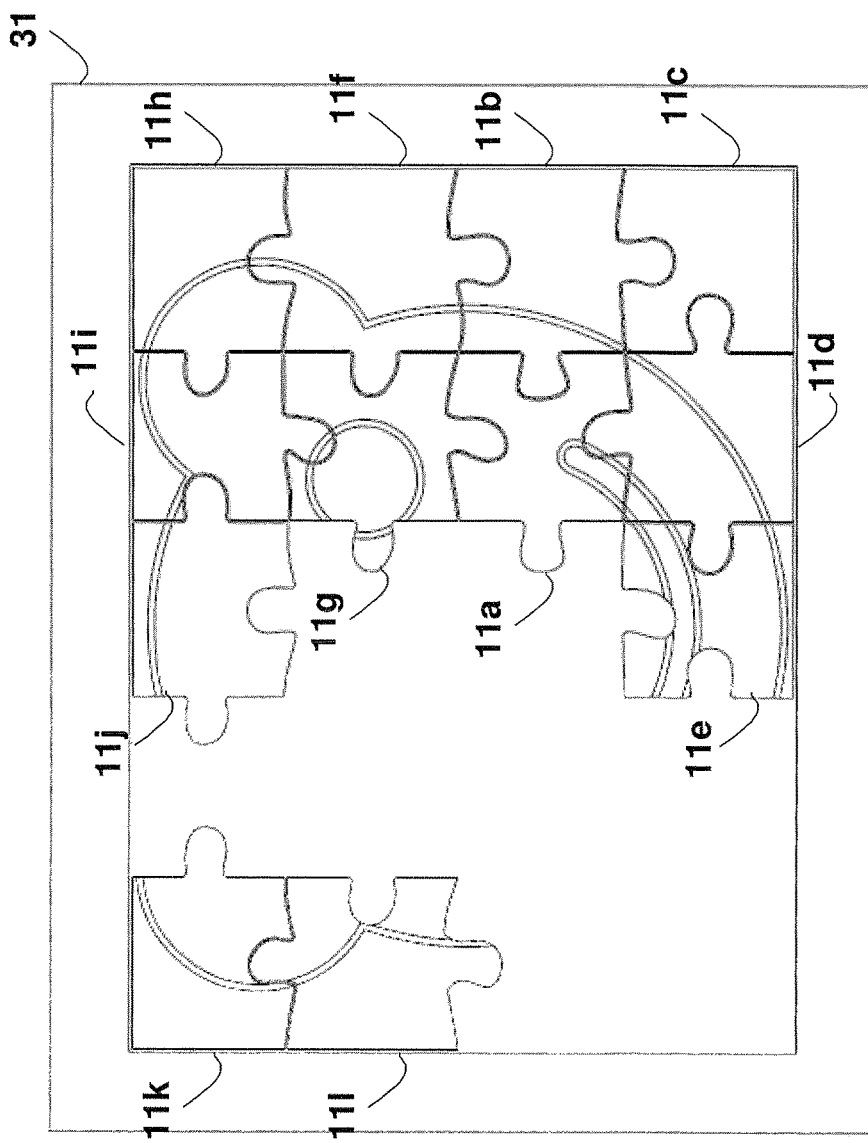
FIG. 4a depicts a front view of engaging few puzzle pieces on a puzzle frame.
Figure 4B:
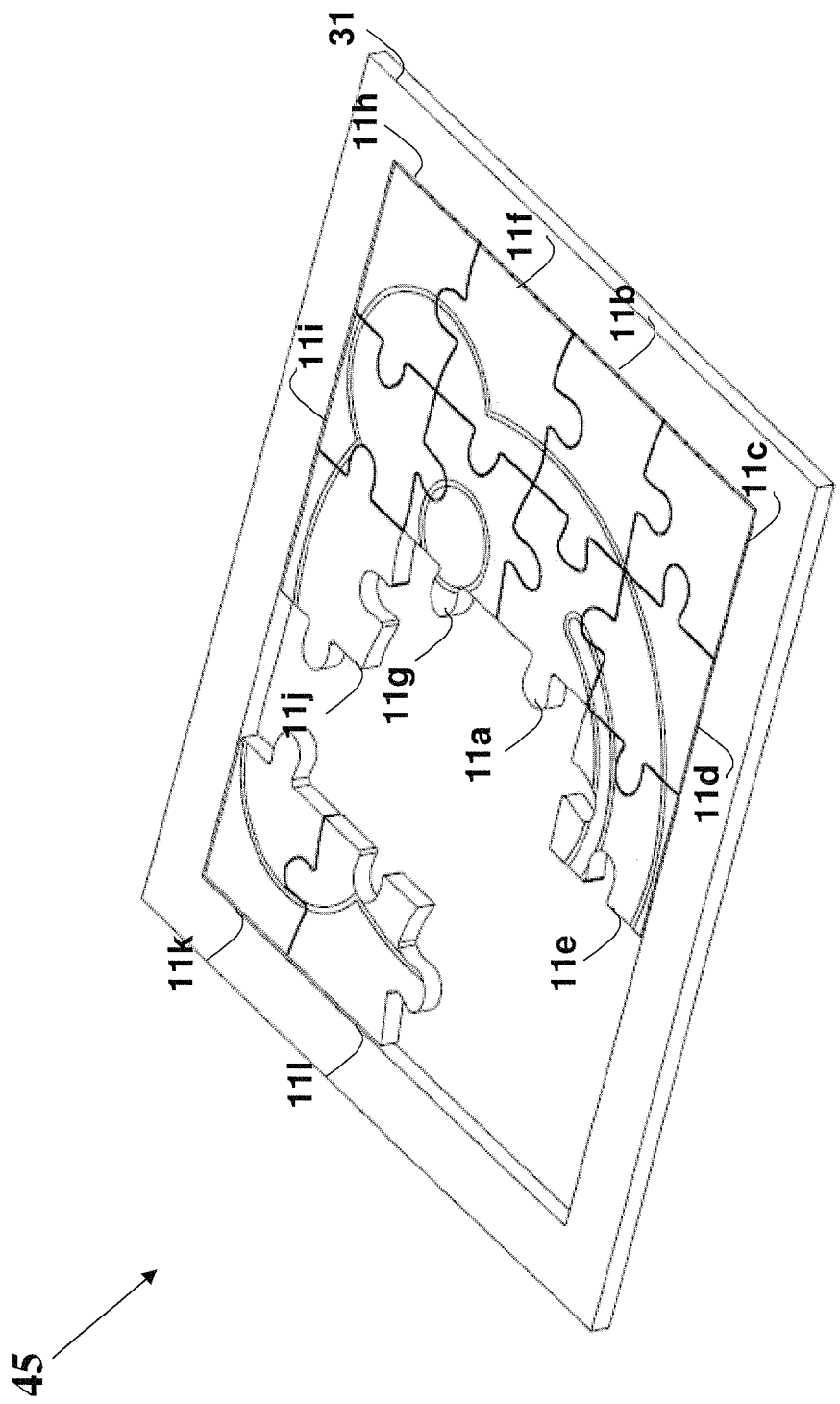
FIG. 4b depicts a perspective front view of engaging few puzzle pieces on a puzzle frame.
Figure 5A:
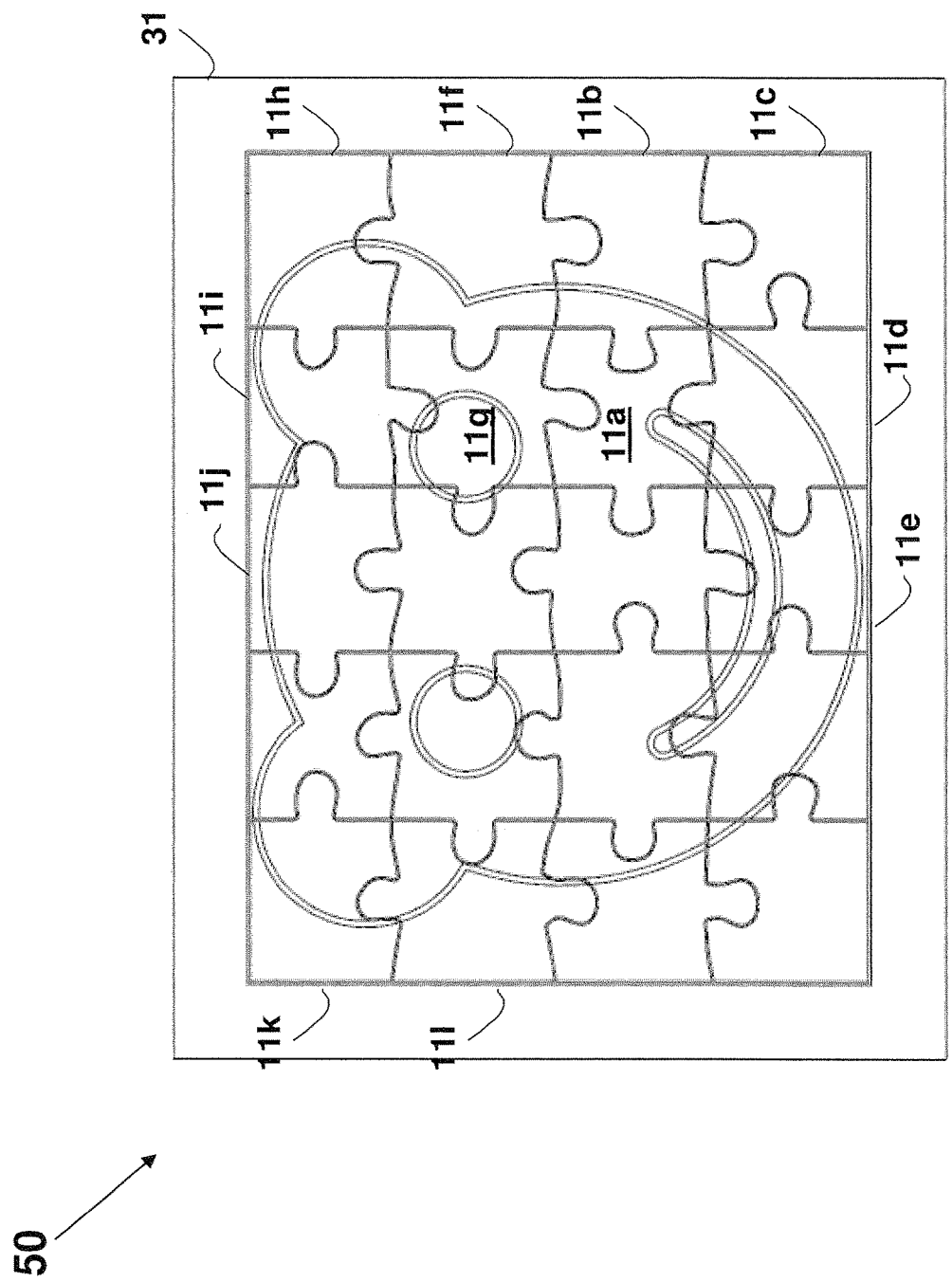
FIG. 5a depicts a front view of a completed puzzle.
Figure 5B:
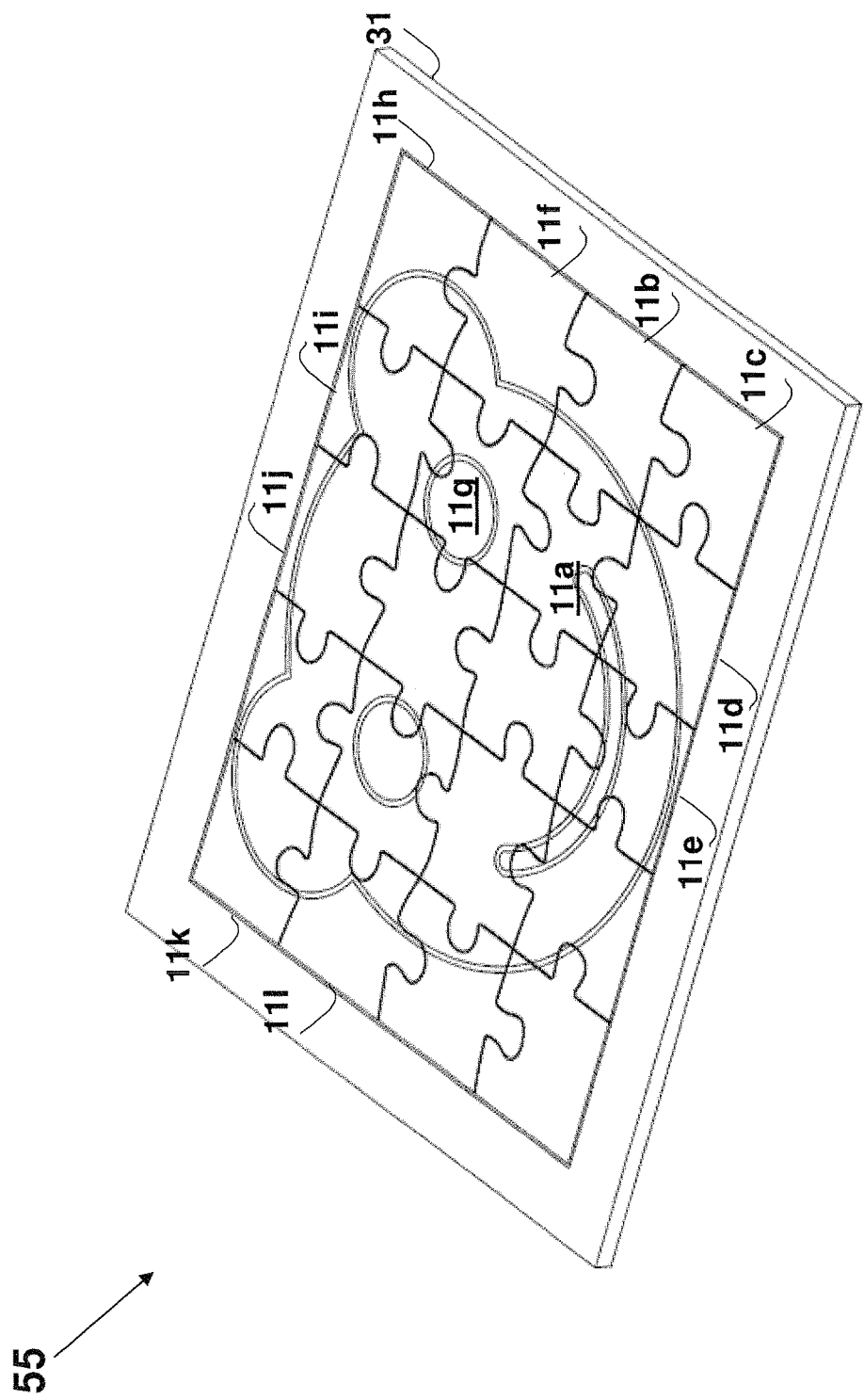
FIG. 5b depicts a perspective front view of a completed puzzle.
Figure 34:
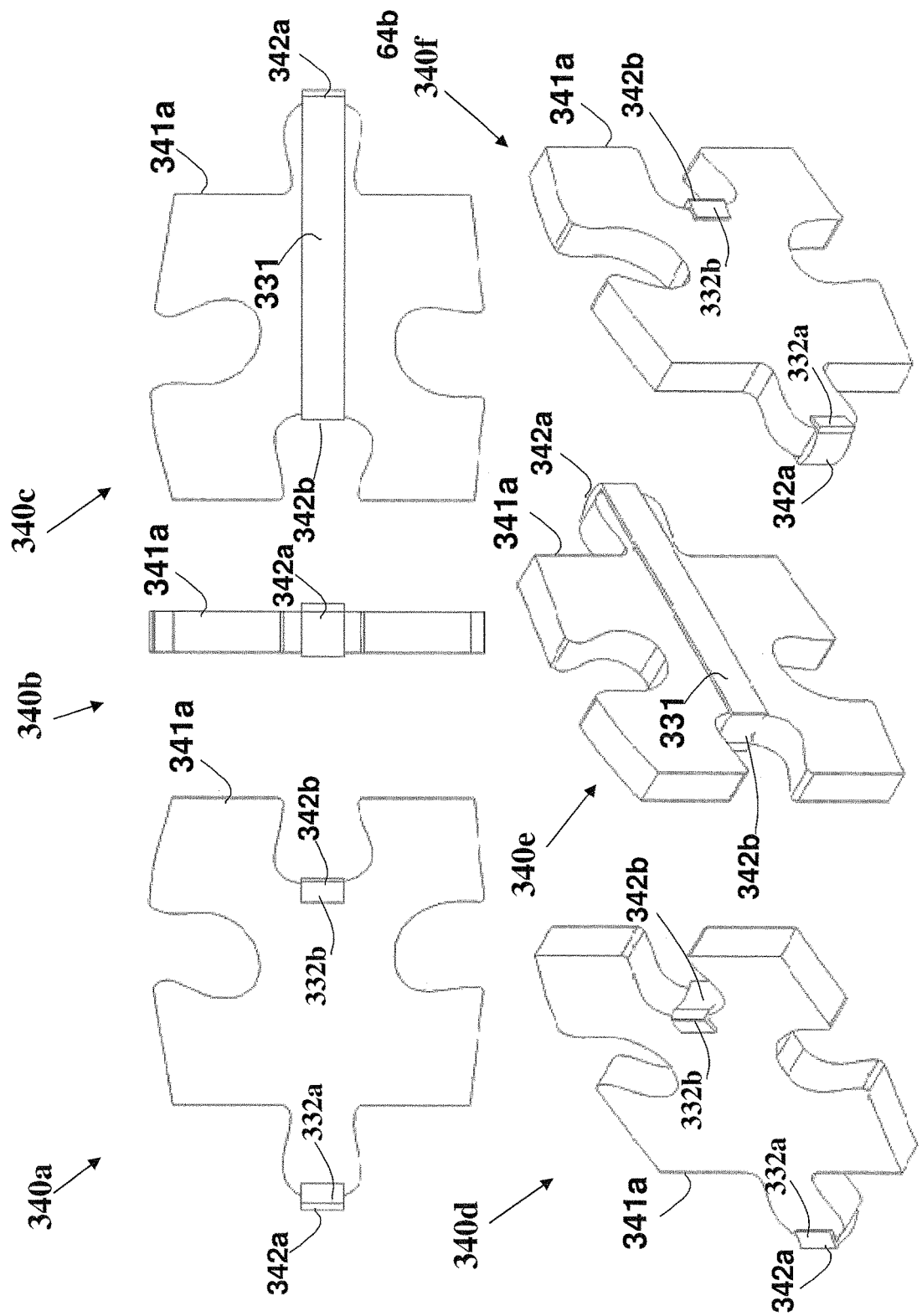
FIG. 34 depicts various views of a puzzle piece with a clip according to an aspect of the invention.

FIG. 34 shows a puzzle piece (such as puzzle piece 11a shown in FIG. 1a-c above) adapted to be conductive by mounting clip 331 onto the puzzle piece, forming a conductive puzzle piece 341a. Such mounting may be done during the production phase, allowing for regular production of puzzle pieces, and adding the step of attaching the clip onto the puzzle pieces. Alternatively, the clips may be provided as a kit, for installation in the field by the player, allowing a consumer to buy the kit and convert a regular puzzle into a conductive-based one as described above. View 340a is a front view, view 340b is a side view, view 340c is a rear view, view 340e is a perspective rear view and views 340d and 340f are front views of the puzzle piece 341a. Clip 331 is easily installed and attached over the puzzle piece using the hooks 332a and 332b, while the clip 331 sides are forming the conductive pads 342a and 342b, electrically connected via the elongated part of the clip 331.

Figure 35A:
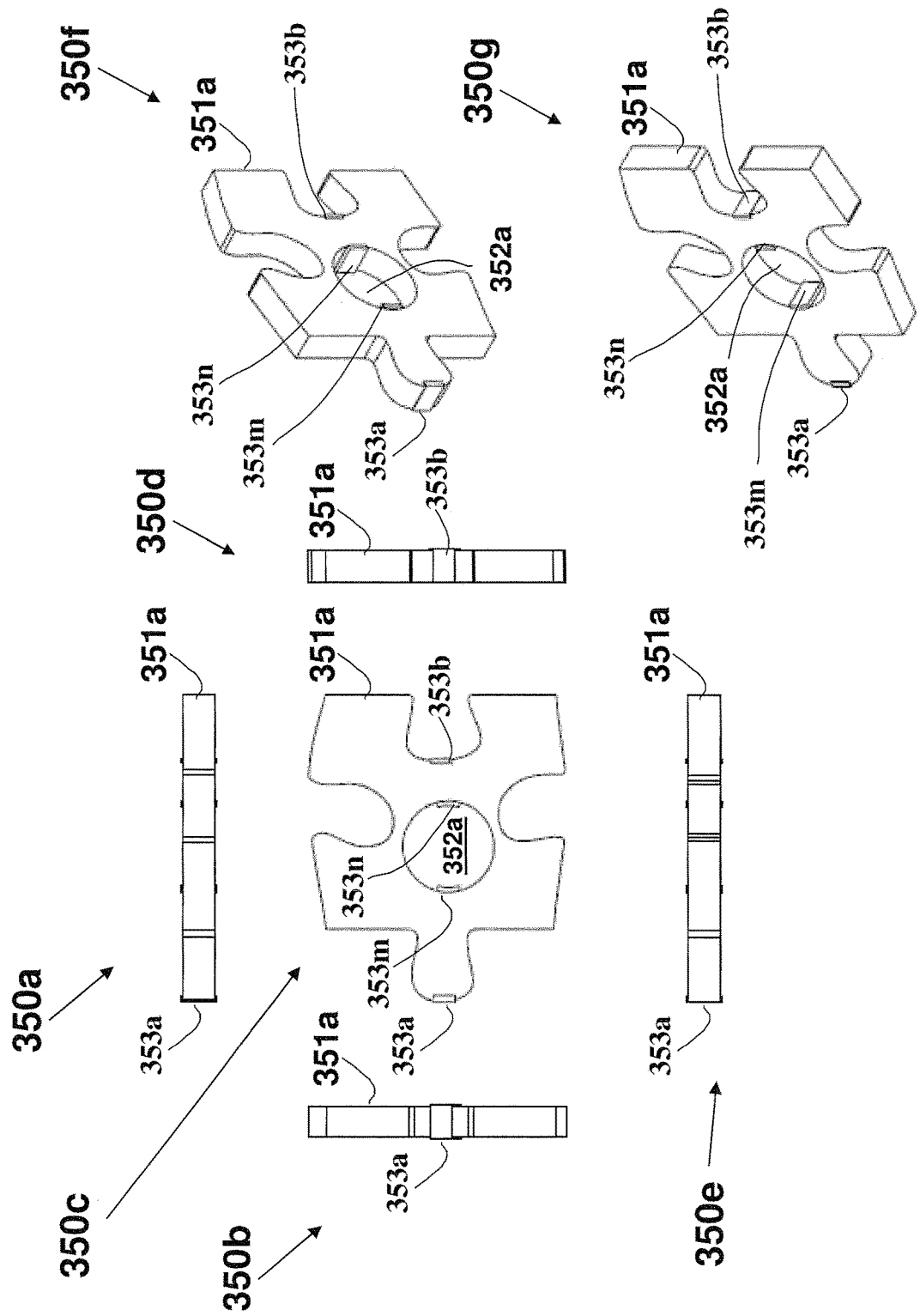
FIG. 35a depicts various views of a puzzle piece with a hole according to an aspect of the invention.
Figure 35B:
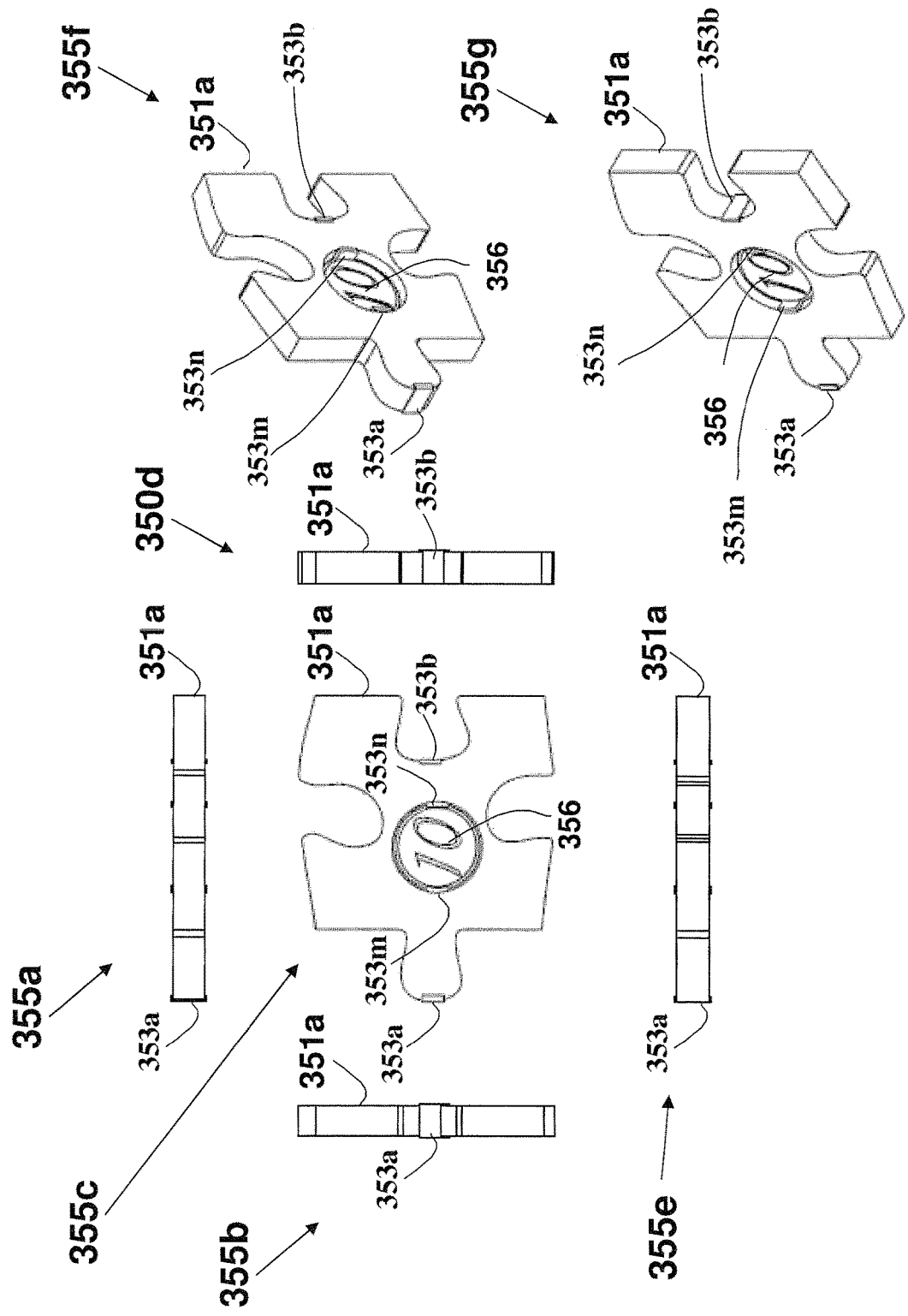
FIG. 35b depicts various views of a puzzle piece with a coin in a hole according to an aspect of the invention.

In one embodiment, the puzzle may include a non-puzzle-related every-day item, such as a coin or a key. The item may be an integral part of the conductive path. Various views of an exemplary puzzle piece 351a are shown in FIGS. 35a and 35b, wherein FIG. 35a shows the puzzle piece 351a with a hole (or a recess) 352a, and FIG. 35b shows a coin 356 mounted in the hole 352a. View 350c is a front view, views 350a, 350b, 350d and 350e are side views and views 350f and 350g are respectively perspective front and rear views of the puzzle piece 351a. The puzzle piece 351a includes the hole 352a inside the puzzle piece. In addition to the two electricity conductive pads 353a and 353b (e.g., metallic pads) mounted on the side surface of the puzzle piece 351a, two conductive pads 353m and 353n are shown on the walls of the hole 352a. Conductive pads 353a and 353b are respectively electrically connected to conductive pads 353m and 353n, using a conductor, a wire or any other electricity conductive material as described above. Upon inserting a coin 356 into the cavity of the hole (or recess) 352a, the conductive pads 353m and 353n are electrically connected via the metallic coin 356, hence allowing a conductive path between conductive pads 353a and 353b on the perimeter of the puzzle piece 351a. It is apparent that more than one such puzzle piece may be used in a puzzle assembly, allowing for using multiple coins as part of the puzzle and as part of a conductive path. Shapes other than round or disk-shaped may be used, and the cavity inside the puzzle piece may be accordingly providing for other shapes, geometrical or otherwise. Other non-limiting examples of everyday items that are metallic or otherwise conductive may be equally used, such as keys. The coin type may be associated with the puzzle theme, such as a puzzle showing a specific country may be using a coin that is used as currency in that country. Further, the face value, the positioning, the portrait and the picture of the coin may also be a part of the puzzle picture or shape.

Figure 35C:
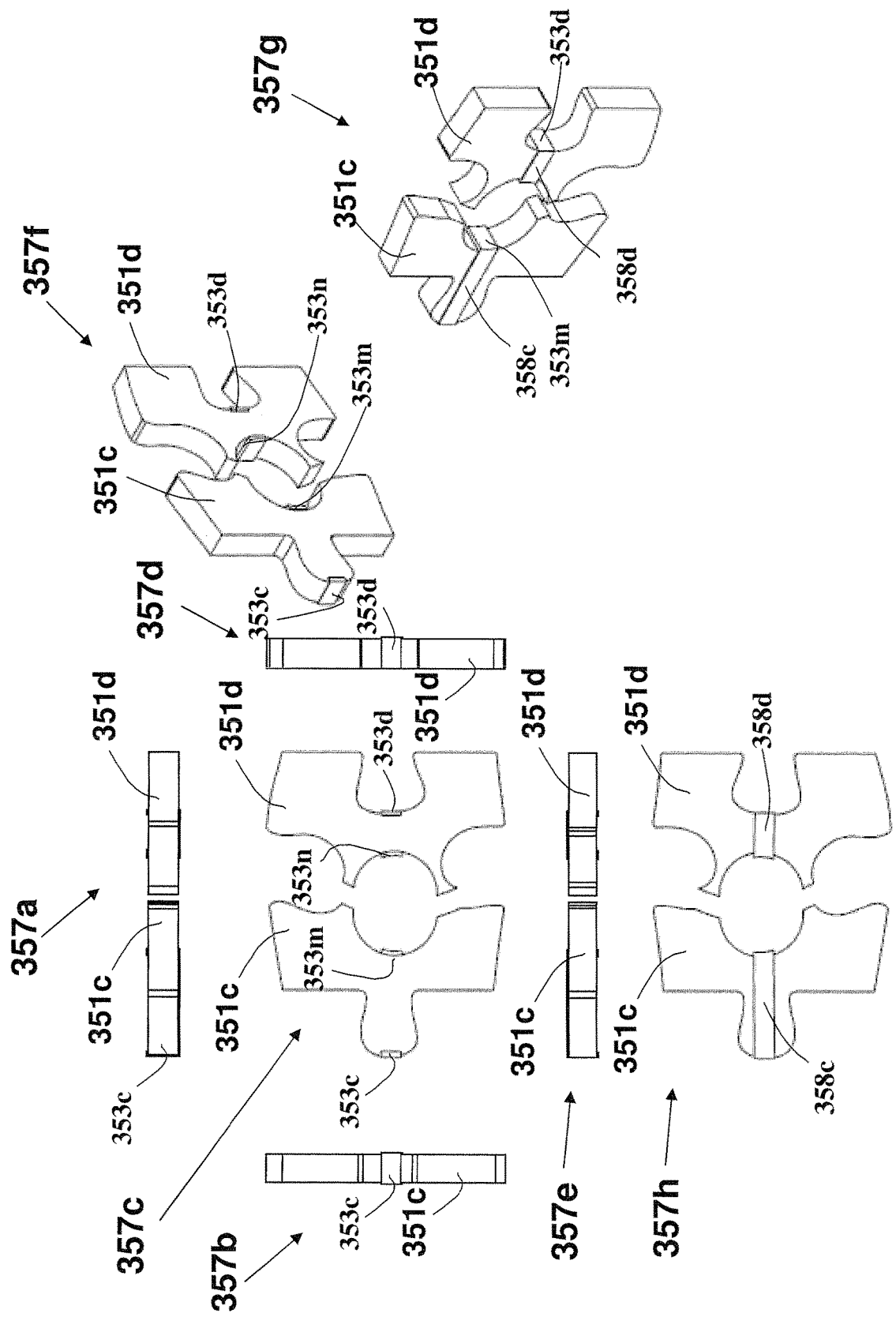
FIG. 35c depicts various views of two puzzle pieces according to an aspect of the invention.
Figure 35D:
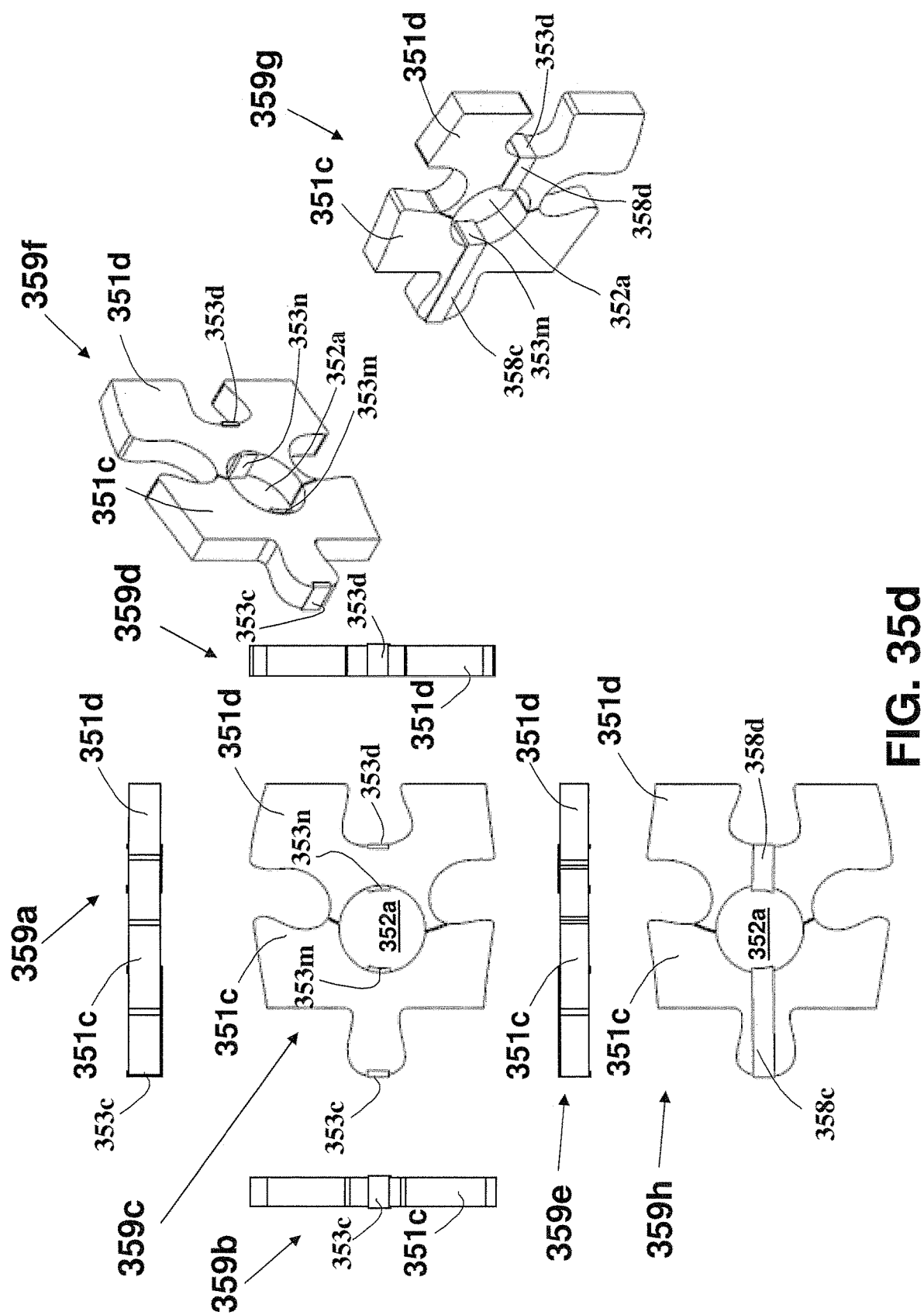
FIG. 35d depicts various views of two puzzle piece forming a coin cavity according to an aspect of the invention.

In an alternative embodiment, multiple puzzle pieces may be shaped to form a coin cavity in a puzzle assembly. Such a non-limiting example is shown in FIGS. 35c and 35d, depicting two puzzle pieces 351c and 351d. View 357c is a front view, views 357a, 357b, 357d and 357e are side views, view 357h is a rear view and views 357f and 357g are respectively perspective front and rear views of the puzzle pieces 351c and 351d located adjacent to each other. The puzzle piece 351c includes conductive pads 353c and 353m, connected via conductive strip 358c, and shaped to have a side which is part of a circle. Similarly, the puzzle piece 351e includes conductive pads 353d and 353n, connected via conductive strip 358d and shaped to have a side with another part of the circle. Upon attaching the puzzle pieces 351c and 351d properly, the resulting shape is shown in FIG. 35d. FIG. 35d shows view 359c is a front view, views 359a, 359b, 359d and 359e are side views, view 359h is a rear view and views 359f and 359g are respectively perspective front and rear views of the puzzle pieces 351c and 351d properly attached to each other. The parts of the circle embedded in each of the puzzle pieces 351c and 351d mate to form a complete round cavity 352a, suitable for inserting a coin thereto as described above with regards to FIGS. 35a and 35b. Similarly, the hole-shape can be formed by three or more puzzle pieces attached and located to form the cavity.

Figure 36:
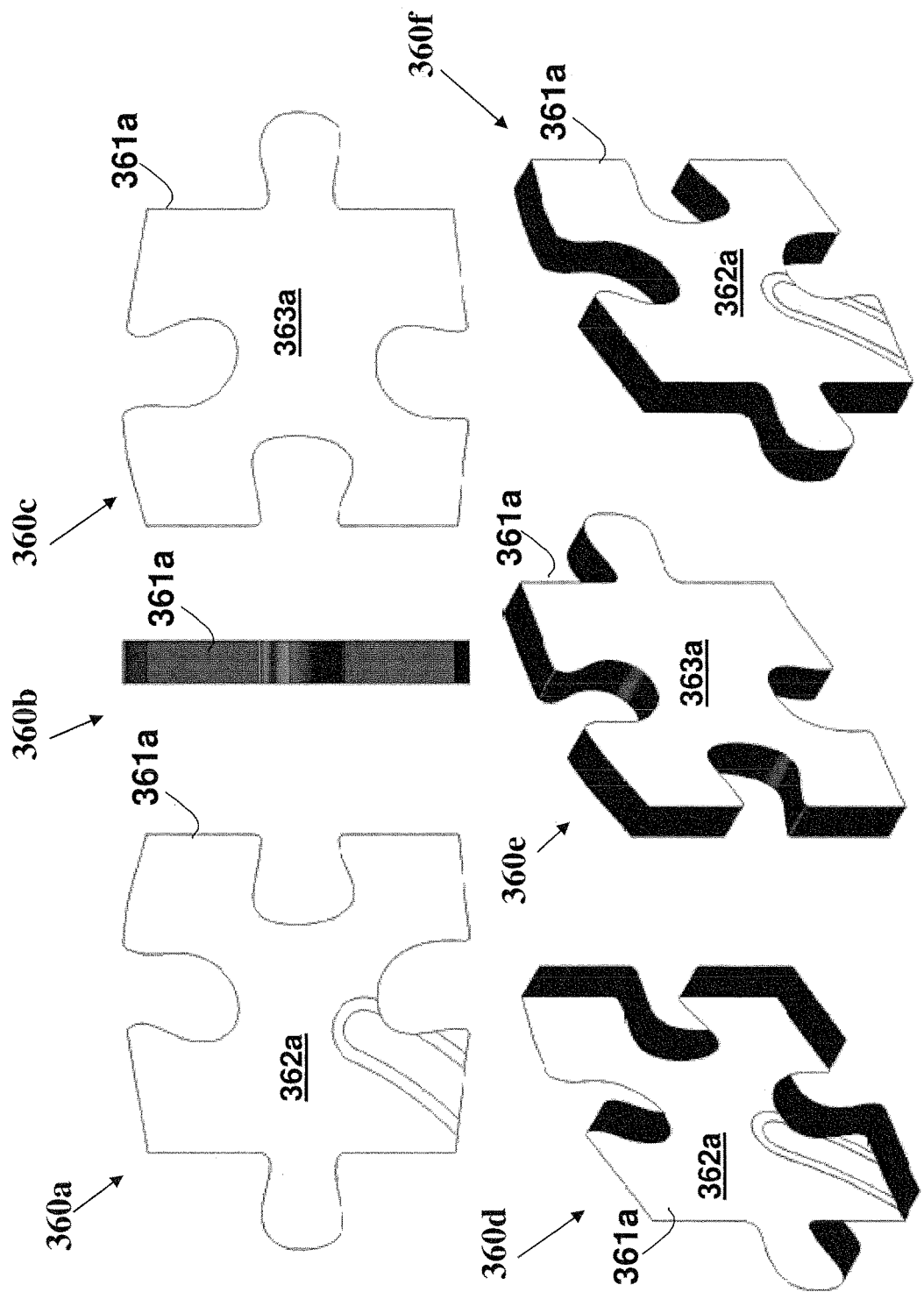
FIG. 36 depicts various views of a puzzle piece according to an aspect of the invention.

In one embodiment shown in FIGS. 36-37, the conductive path makes use of all side surfaces of part or all of the puzzle pieces. Various views of an exemplary puzzle piece 361a are shown n FIG. 36. View 360a is a front view, view 360b is a side view and view 360c is a rear view of the puzzle piece 361a. Similarly, views 360d and 360f are perspective front views and view 360e is a perspective rear view of the puzzle piece 361a. The puzzle piece 361a includes a front surface 362a showing part of the puzzle picture, and a rear surface 363a to be laid on the puzzle frame or on any assembly surface. The surrounding side surface of the puzzle piece 361a is conductive, illustrated by the black color in FIG. 36. The puzzle piece 361a can be in whole or in part made of a conductive material such as metal, or can be made of a non-conductive material. In the latter case, the side surface can be coated with a conductive material such as conductive adhesive or conductive paint or ink. Similarly, a flexible conductive strip (e.g., flexible metal sheet) may be mechanically fastened or glued to the outer side surface of puzzle piece 361a to provide the conductivity. Upon attaching the puzzle pieces, the mating conductive side surfaces are in contact thus forming the conductive path throughout part (or all) of the assembled puzzle.

Figure 37A:
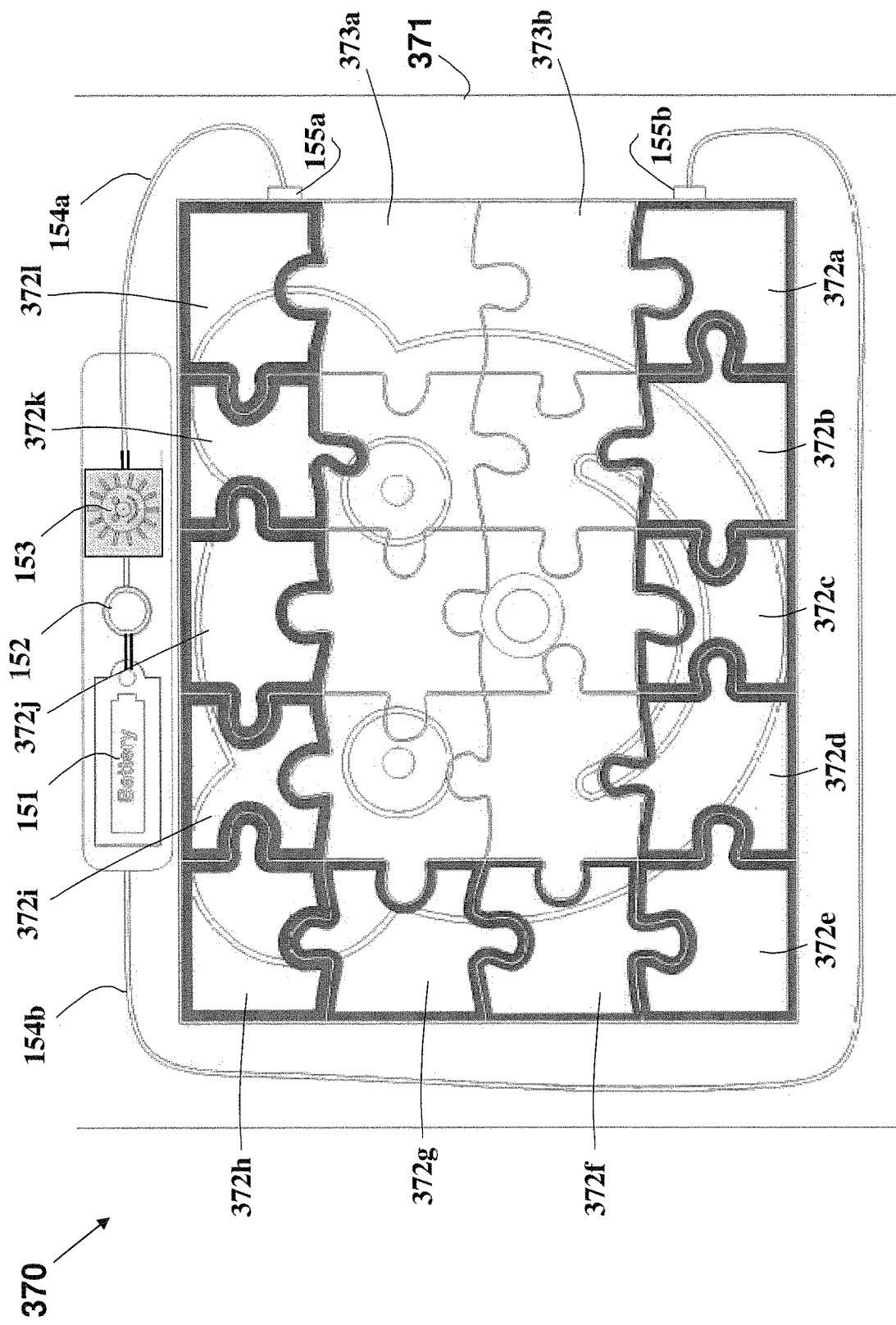
FIG. 37a depicts a front view of a completed puzzle in a frame according to an aspect of the invention.
Figure 37B:
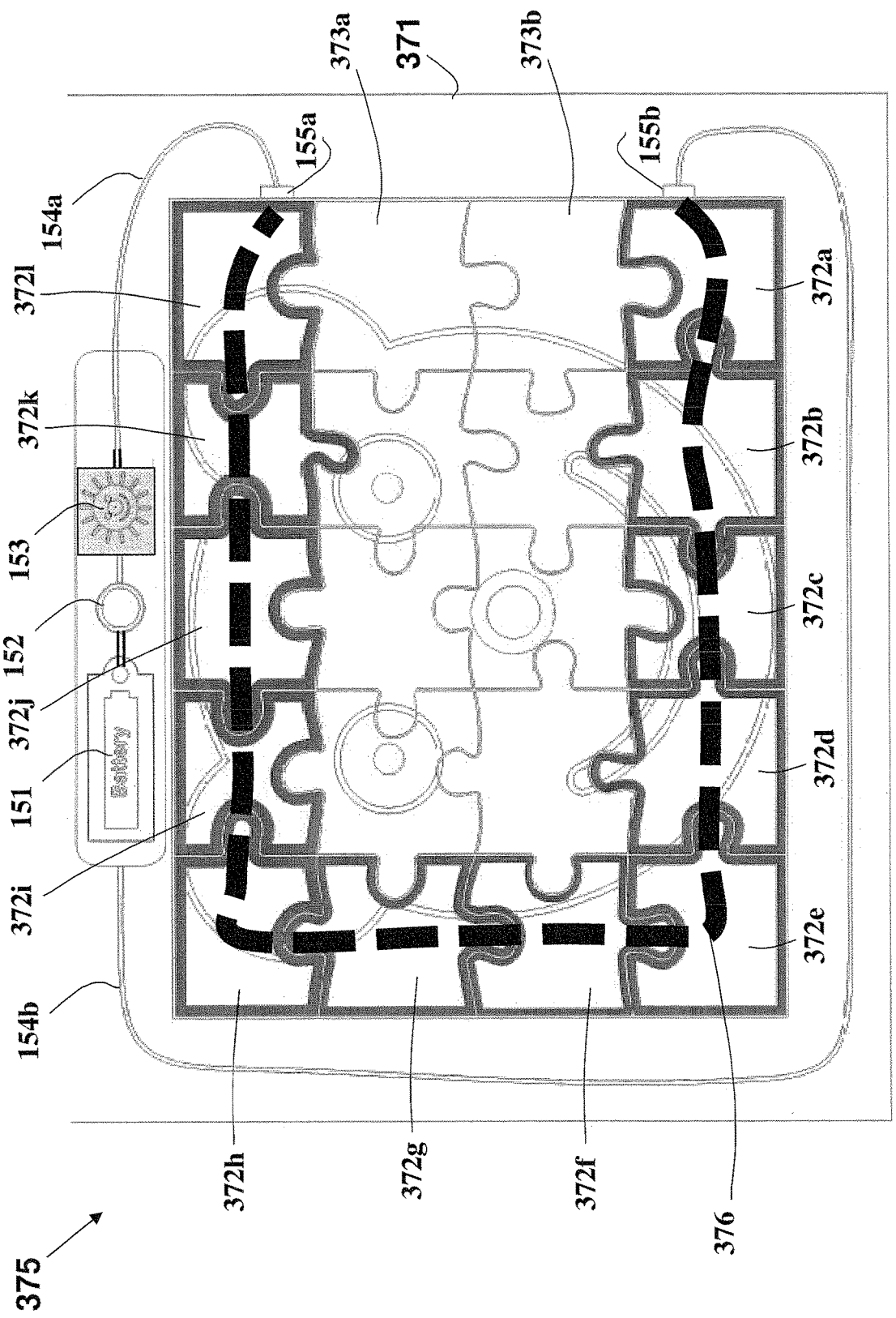
FIG. 37b depicts the electricity conductive path of an assembled puzzle according to an aspect of the invention.

A non-limiting example of an assembled puzzle 371 using whole side conductive puzzle pieces is shown in front view 370 in FIG. 37a. The puzzle frame 371 shown is the same as the puzzle frame described in FIG. 17 above. Puzzle pieces 372a-1 (forming the puzzle periphery) all have a whole side surface conductivity as described for puzzle piece 361a in FIG. 36, as illustrated by the thick black perimeter line of the puzzle pieces in FIG. 37a participating in the conductive path. Some of the puzzle pieces comprising the assembled puzzle, such as puzzle pieces 373a and 373b and others in the puzzle center, are not conductive and thus are not part of the conductive path. As shown in view 375 in FIG. 37b, the assembled puzzle shown provides a conductive path 376 extending from frame pad 155b, via the puzzle pieces 372a through 372l (via their respective contacting sides), which are in contact with frame 371 pad 155a.

While the embodiments above exampled the using of a single-sided two-dimensional (2-D) jigsaw puzzle wherein the picture is only over a single surface of the puzzle pieces, it will be appreciated that double-sided puzzles having two images may equally be used, one on each side of the puzzle pieces, and thus can be solved from either side.

While the embodiments have been exampled above with regard to two-dimensional (2-D) jigsaw puzzle, wherein the puzzle is solved to form a planar picture, it will be appreciated that the three-dimensional puzzle (3-D) may equally be used, wherein the final form is a three-dimensional shape. Some examples of 3-D puzzles involve a globe shaped puzzle having a spherical shape. Other examples of 3-D puzzles are disclosed in U.S. Patent Application 2009/0127785 to Kishon entitled: "Puzzle", U.S. Pat. No. 6,692,001 to Romano entitled: "Multi-Layered Decorative Puzzle Apparatus", U.S. Pat. No. 6,237,914 to Saltanov et al. entitled: "Multi dimensional Puzzle", U.S. Pat. No. 2,493,697 to Raczkowski entitled: "Profile Building Puzzle", U.S. Patent Application 2009/0127785 to Kishon entitled: "Puzzle" and U.S. Pat. No. 4,874,176 to Auerbach entitled: "Three-Dimensional Puzzle", which are all incorporated in their entirety for all purposes as if fully set forth herein. Further, in the case of 3-D puzzles which are comprised of stacked layers wherein each layer is a 2-D puzzle, the invention can apply to a single layer, few layers or to the whole puzzle. It will be appreciated to those skilled in the art that the puzzle frame, the puzzle pieces or any game set parts may be made of paper (card-board), wood (stain sheets), synthetic resins (soft and hard material), synthetic material, stone materials, woven or non-woven fabrics, cork, metals, leather, glass, plastic, cast metal, cast plaster, case stone, paper-mache or other materials and may have a design imprinted on its exposed surface or surfaces or may have a surface sheet of imprinted design applied to its exposed surface or surfaces. The parts may be individually molded pieces, assembled of separate pieces fitted and adhered together, or cut from a precast larger piece. Further, the parts may be solid or hollow.

While the embodiments have been exampled above with regard to a jigsaw puzzle wherein a plurality of planar puzzle pieces that can be assembled together into a planar jigsaw puzzle, it will be appreciated that other embodiments equally apply, such as any game set involving assembling (and disassembling) of parts into an array (which may be enclosed in a frame structure), wherein the parts are sized and configured to fit one with another (e.g., by interlocking, friction fit or using shaped lugs and cut-outs) for solving, wherein the parts are each having an electrical property, such as allowing for electrically announcing the proper solving of the game. Particularly, the invention may apply to any building block toy set or similar construction systems that employ pieces that can be assembled together to form larger toys or systems, and wherein the game primary purpose is the recreation or amusement by assembling or disassembling the game. As a non-limiting example, the game set may comprise a plurality of inter-engaged game pieces, each game piece having one or more indentations and one or more protrusions, wherein the game is solved by the game pieces can be assembled together in a single way using mating indentations and protrusions into a one pre-defined structure, and wherein each of said game pieces comprises two or more conductive pads attached thereto, such that when properly assembled together the pads of engaged game pieces are in contact such that the assembly of the plurality of the game pieces form a continuous conductive path. As described above, the conductive path formed upon proper solving of the game allows electrical current to flow from the battery (or any other power source) via said conductive path to the annunciator for activating thereof. The game pieces shape and the shape of the pre-defined structure resulting after proper assembly of the game pieces may be amorphous, abstract, organic, conceptual, virtual, irregular, regular, figurative, biomorphic, geometric, partially geometric, conventional, unconventional, symmetric and/or asymmetric. Similarly, in the case that the pieces are assembled to form a picture or image, the design can be abstract, symbolic, conceptual, virtual, realistic, relating to fantasy or dreams, and/or representational. Further, the game and the game pieces can be designed and fabricated to fit any age and ability. Furthermore, the game and the manner of play may be creative, artistic, recreational, educational, therapeutic, stage-oriented, level-oriented, family-oriented, age-appropriate and/or thematic, and can be with theme, turn, timing, playing area, scoring, emission, hierarchical, matching, optional, selective, pre-selected, directed and/or sequential. A game piece can be fabricated of natural, man-made, composite and/or recycled material, such as paper, fabric, metal, wood, stone, rubber, foam, reciprocal and/or plastic. Further, a game piece may have any suitably rigid, flexible, bendable, multi-sided, electronic, digital, magnetic, stationary, moving, mechanical, reciprocal, sensory-related section, including a mechanism such as activation point, button and switch.

All publications, patents, and patent applications cited in this specification are herein incorporated by reference as if each individual publication, patent, or patent application were specifically and individually indicated to be incorporated by reference and set forth in its entirety herein.

Throughout the description and claims of this specification, the word "comprise" and variations of that word such as "comprises" and "comprising", are not intended to exclude other additives, components, integers or steps.

Those of skill in the art will understand that the various illustrative logical blocks, modules and circuits described in connection with the embodiments disclosed herein may be implemented in any number of ways including electronic hardware, computer software, or combinations of both. The various illustrative components, blocks, modules and circuits have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application.

Although exemplary embodiments of the present invention have been described, this should not be construed to limit the scope of the appended claims. Those skilled in the art will understand that modifications may be made to the described embodiments. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

It will be appreciated that the aforementioned features and advantages are presented solely by way of example. Accordingly, the foregoing should not be construed or interpreted to constitute, in any way, an exhaustive enumeration of features and advantages of embodiments of the present invention.

The present invention may be embodied in other specific forms without departing from its spirit or essential characteristics. The described embodiments are to be considered in all respects as illustrative and not restrictive. The scope of the invention is, therefore, indicated by the appended claims rather than by the foregoing description. All changes that come within the meaning and range of equivalency of the claims are to be embraced within their scope.

What is claimed is:

1. A set for electrically connecting and mechanically attaching devices, the set comprising:
    first, second and third devices, each of said devices being mechanically attachable by a mechanical attachment and electrically connectable to at least one other device, wherein: said first device is a frame connectable to a power source;
    said second device comprises a first electrical component;
    said third device comprises a second electrical component;
    said devices comprises a magnet and said devices are mechanically attachable using said magnets; the mechanical attachment of said devices effects an electrical connection between said mechanically attached devices; and
    upon mechanically attaching said first device to said second device, and said second device to said third device in a proper position, the proper position determined based upon a set associated with the second and third devices, an electrical circuit is formed such that the second electrical component is powered from the power source and controlled by the first electrical component.

2. The set according to claim 1, wherein the power source comprises one of ore of a battery, a switch, or an annunciator.

3. The set according to claim 2, wherein the battery is a primary type or a rechargeable type.

4. The set according to claim 1, wherein said first electrical component is an electrical switch, wherein when the electrical circuit is formed, upon activating said switch, a current is passed from the power source to said first electrical component or to said second electrical component, and wherein a location of the electrical switch is positioned based upon the shape of the second device.

5. The set according to claim 4, wherein said switch is a single pole, single throw switch.

6. The set according to claim 1, wherein said second electrical component is a first annunciator for announcing using visual or audible signaling.

7. The set according to claim 6, wherein said first annunciator comprises a visual signaling device.

8. The set according to claim 7, wherein said visual signaling device is a visible light emitter, wherein the visual signaling device is styled in accordance with a theme of the set.

9. The set according to claim 8, wherein said visible light emitter is a semiconductor device, an incandescent lamp, or fluorescent lamp, and is adapted for a steady illumination and or blinking.

10. The set according to claim 6, wherein said first annunciator comprises an audible signaling device emitting a sound.

11. The set according to claim 10, wherein said audible signaling device comprises an electromechanical or piezoelectric sounder.

12. The set according to claim 11, wherein said audible signaling device comprises a buzzer, a chime, or a ringer.

13. The set according to claim 10, wherein said audible signaling device comprises a loudspeaker and a digital to analog converter coupled to said loudspeaker.

14. The set according to claim 10, wherein said audible signaling device is operative to generate a single tone or multiple tones.

15. The set according to claim 10, wherein the sound emitted from said audible signaling device is a characteristic sound of one of:
    a household appliance;
    a vehicle;
    an emergency vehicle;
    an animal; or
    a musical instrument.

16. The set according to claim 10, wherein the sound emitted from said audible signaling device is a song or a melody.

17. The set according to claim 10, wherein the sound emitted from said audible signaling device simulates a talking human voice.

18. The set according to claim 17, wherein the sound is a syllable, a word, a phrase, a sentence, a short story, or a long story.

19. The set according to claim 1, wherein the power source is a AC/DC adapter containing a step-down transformer and an AC to DC converter.

20. The set according to claim 1, further comprising an electrical switch and an annunciator, wherein the switch and the annunciator may be located independently on either the puzzle frame or the second or third devices.

\* \* \* \* \*